United States Patent
Liu et al.

(10) Patent No.: US 12,088,666 B2
(45) Date of Patent: Sep. 10, 2024

(54) METHOD AND SYSTEM FOR DELIVERY OF DIGITAL CONTENT

(71) Applicant: Providence IP, LLC, Wilmington, DE (US)

(72) Inventors: Frank Liu, Houston, TX (US); Lawrence Pace Doherty, Houston, TX (US)

(73) Assignee: Providence IP, LLC, Wilmington, DE (US)

( * ) Notice: Subject to any disclaimer, the term of this patent is extended or adjusted under 35 U.S.C. 154(b) by 0 days.

(21) Appl. No.: 17/314,724

(22) Filed: May 7, 2021

(65) Prior Publication Data

US 2022/0046092 A1    Feb. 10, 2022

Related U.S. Application Data

(63) Continuation of application No. 15/152,393, filed on May 11, 2016, now Pat. No. 11,003,725.
(Continued)

(51) Int. Cl.
*G06F 16/9535* (2019.01)
*G06F 16/22* (2019.01)
(Continued)

(52) U.S. Cl.
CPC ...... *H04L 67/1097* (2013.01); *G06F 16/2282* (2019.01); *G06F 16/9535* (2019.01);
(Continued)

(58) Field of Classification Search
CPC . G06F 16/9535; G06F 16/2282; G06Q 50/01; G06T 11/206; H04L 12/66;
(Continued)

(56) References Cited

U.S. PATENT DOCUMENTS 6,144,773 A     11/2000 Kolarov et al.
6,629,136 B1 *   9/2003 Naidoo ................... H04L 67/52
                                              719/329
(Continued)

OTHER PUBLICATIONS

Wollan, Incorporating Heuristically Generated Search Patterns in Search and Rescue, https://www.aiai.ed.ac.uk/project/ix/documents/2004/2004-msc-wollan-sar-patterns.pdf, pp. 22-43, 2004 (Year: 2004).*
(Continued)

*Primary Examiner* — Matthew J Ellis
(74) *Attorney, Agent, or Firm* — Campbell Stephenson LLP

(57) ABSTRACT

A method, system, and computer-program product for identification of digital content using a meta-content identifier construct are disclosed. The method includes obtaining a meta-content identifier construct (where the meta-content identifier construct comprises information), identifying one or more digital content constructs, determining one or more parameters, and producing one or more results by retrieving digital content using the one or more digital content constructs. The one or more digital content constructs are identified, at least in part, using at least a portion of the information. The retrieving comprises filtering the digital content, and the filtering uses the one or more parameters.

20 Claims, 30 Drawing Sheets

Related U.S. Application Data

(60) Provisional application No. 62/159,652, filed on May 11, 2015.

(51) Int. Cl.
| | |
|---|---|
| *G06Q 50/00* | (2012.01) |
| *G06T 11/20* | (2006.01) |
| *H04L 12/66* | (2006.01) |
| *H04L 67/02* | (2022.01) |
| *H04L 67/1097* | (2022.01) |
| *H04L 67/306* | (2022.01) |
| *H04L 67/52* | (2022.01) |
| *H04L 67/75* | (2022.01) |
| *H04W 4/12* | (2009.01) |

(52) U.S. Cl.
CPC ............ *G06Q 50/01* (2013.01); *G06T 11/206* (2013.01); *H04L 12/66* (2013.01); *H04L 67/02* (2013.01); *H04L 67/306* (2013.01); *H04L 67/52* (2022.05); *H04L 67/75* (2022.05); *H04W 4/12* (2013.01)

(58) Field of Classification Search
CPC ......... H04L 67/52; H04L 67/75; H04L 67/66; H04L 67/02; H04L 67/306; H04W 4/12
See application file for complete search history.

(56) References Cited

U.S. PATENT DOCUMENTS

| | | | |
|---|---|---|---|
| 2002/0163515 A1 | 11/2002 | Sowizral et al. | |
| 2004/0215737 A1* | 10/2004 | Della Pasqua ........ | H04L 67/306 709/207 |
| 2005/0096950 A1 | 5/2005 | Caplan | |
| 2005/0108071 A1 | 5/2005 | Jain | |
| 2005/0248570 A1 | 11/2005 | Stelly | |
| 2006/0259249 A1 | 11/2006 | Sampath et al. | |
| 2007/0087756 A1 | 4/2007 | Hoffberg | |
| 2007/0198365 A1 | 8/2007 | Dutta | |
| 2009/0184965 A1 | 7/2009 | Loginov | |
| 2010/0040296 A1 | 2/2010 | Ma | |
| 2010/0045673 A1 | 2/2010 | Mayo et al. | |
| 2010/0063788 A1 | 3/2010 | Brown et al. | |
| 2011/0087350 A1 | 4/2011 | Fogel | |
| 2011/0125702 A1 | 5/2011 | Gorur Narayana Srinivasa | |
| 2011/0250903 A1 | 10/2011 | Huang et al. | |
| 2011/0256881 A1 | 10/2011 | Huang et al. | |
| 2011/0270646 A1 | 11/2011 | Prasanna | |
| 2011/0282865 A1 | 11/2011 | Talwar et al. | |
| 2012/0001963 A1 | 1/2012 | Hinnen | |
| 2012/0010919 A1 | 1/2012 | Aswal | |
| 2012/0035984 A1 | 2/2012 | Gorur Narayana Srinivasa | |
| 2012/0223951 A1 | 9/2012 | Dunn et al. | |
| 2013/0326445 A1 | 12/2013 | Brink | |
| 2014/0012619 A1 | 1/2014 | Natarajan et al. | |
| 2014/0184597 A1 | 7/2014 | Clarberg | |
| 2014/0333482 A1 | 11/2014 | Singh et al. | |
| 2014/0349674 A1 | 11/2014 | Colby et al. | |
| 2015/0006637 A1* | 1/2015 | Kangas ............. | H04N 21/4788 709/204 |
| 2015/0099481 A1* | 4/2015 | Maitre .................... | H04W 4/90 455/404.2 |
| 2015/0100586 A1 | 4/2015 | Caruso | |
| 2015/0172396 A1* | 6/2015 | Longo ..................... | H04L 67/52 709/204 |
| 2015/0227588 A1* | 8/2015 | Shapira ............... | G06F 16/9535 707/722 |
| 2015/0230054 A1 | 8/2015 | Myllymaki et al. | |
| 2015/0324397 A1 | 11/2015 | Bhatia | |
| 2015/0339432 A1 | 11/2015 | Nance | |
| 2016/0174031 A1 | 6/2016 | Smith et al. | |
| 2016/0283518 A1* | 9/2016 | Taranenko ............. | G06F 16/29 |
| 2018/0022029 A1 | 1/2018 | Morovic et al. | |

OTHER PUBLICATIONS

Jan. 10, 2012—Computing projections of resultant polytopes. Christos Konaxis. Joint work with I.Z. Em iris. V. Fisikopoulos, and L. Penaranda.

* cited by examiner

METHOD AND SYSTEM FOR DELIVERY OF DIGITAL CONTENT

CROSS REFERENCES TO RELATED APPLICATIONS

This application is a continuation application to U.S. application Ser. No. 15/152,393, entitled "METHOD AND SYSTEM FOR IDENTIFICATION OF DIGITAL CONTENT USING A META-CONTENT IDENTIFIER CONSTRUCT," filed on May 11, 2016, which claims priority to U.S. Provisional Patent Application No. 62/159,652 entitled "METHOD AND SYSTEM FOR ANALYSIS AND USE OF AGGREGATED SOCIAL MEDIA INFORMATION," filed on May 11, 2015, and have Frank Liu and Lawrence Pace Doherty as inventors. The foregoing applications are hereby incorporated by reference herein, in their entirety and for all purposes.

FIELD OF THE INVENTION

The present invention relates to social media, and, more particularly, to a method and system for identification of digital content using a meta-content identifier construct.

BACKGROUND

As digital sources of information have become increasingly important in the business, academic, and personal computing arenas, particularly in the realm of mobile devices, improved mechanisms for quickly and efficiently organizing and analyzing such information have also become increasingly important. Such is particularly true of social media content. There is typically an inordinate number of postings to online social media websites (e.g., FACEBOOK, TWITTER, INSTAGRAM, and others), owing to the millions of users of such websites and their seemingly constant use thereof. The tremendous volume of such postings, then, has the effect of swamping any desired information in a deluge of what is effectively noise. As a result, methods and systems capable of making sense of this flood of information are desirable.

SUMMARY OF THE INVENTION

In one embodiment, a method, system, and computer-program product for identification of digital content using a meta-content identifier construct are disclosed. Such a method includes, for example, obtaining a meta-content identifier construct (where the meta-content identifier construct comprises information), identifying one or more digital content constructs, determining one or more parameters, and producing one or more results by retrieving digital content using the one or more digital content constructs. The one or more digital content constructs are identified, at least in part, using at least a portion of the information. The retrieving comprises filtering the digital content, and the filtering uses the one or more parameters.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from concepts such as those disclosed herein and their broader aspects. Other aspects, inventive features, and advantages of systems according to the concepts disclosed herein will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention which is defined in the claims following the description.

Introduction

Systems such as those described herein provide methods and apparatus for the analysis and distribution of digital content (e.g., social media information).

Example Social Media Network Architecture

Figure 1:
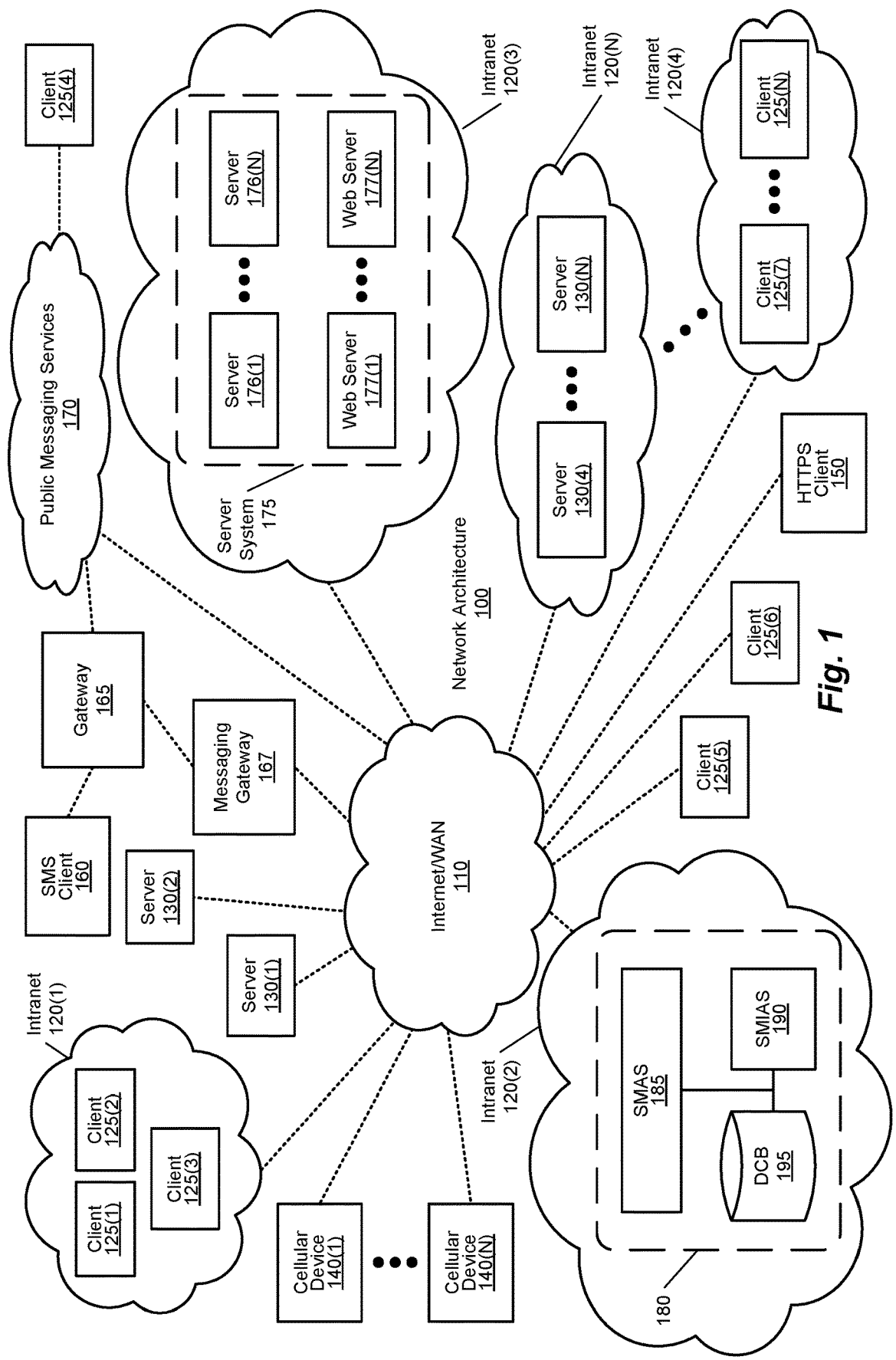
FIG. 1 is a block diagram illustrating an example of a network architecture, according to embodiments of methods and systems such as those disclosed herein.

FIG. 1 is a block diagram illustrating an example of a communications network architecture, which is depicted in FIG. 1 as a network architecture 100. Network architecture 100 includes a server system according to one embodiment. Network architecture 100 includes an internetwork (depicted in FIG. 1 as an internet/wide area network (WAN) 110), which is configured to couple a number of intranets to one another (depicted in FIG. 1 as intranets 120(1)-(N)). Intranets 120(1)-(N), in turn, can include a number of components, such as one or more clients (depicted in FIG. 1 as clients 125(1)-(N)) and/or servers (depicted in FIG. 1 as servers 130(1)-(N)). Clients 125(1)-(N) and/or servers 130(1)-(N) can, for example, be implemented using computer systems such as those described in connection with FIGS. 28 and 29. Internet/WAN 110 thus communicatively couples intranets 120(1)-(N) to one another, thereby allowing clients 125(1)-(N) and servers 130(1)-(N) to communicate with one another (and can, in certain embodiments, provide for the servers of intranets 120(2) and 120(N), for example, to operate as cloud-based server systems). As is depicted in FIG. 1, clients 125(1)-(N) can be communicatively coupled to one another and to servers 130(1)-(N) as part of one of intranets 120(1)-(N), or directly via internet/WAN 110. Similarly, servers 130(1)-(N) can be coupled via intranet/WAN 110 via a direct connection to intranet/WAN 110, or as part of one of intranets 120(1)-(N).

Network architecture 100 also provides for communication via intranet/WAN 110 using one or more other devices. Such devices can include, for example, a cellular device 140 (e.g., a general packet radio service (GPRS) client (e.g., a "smart phone"), a "tablet" computer, or other such mobile device), a secure web client (depicted in FIG. 1 as a secure hypertext transfer protocol client 150), and a basic cellular phone (e.g., using standard texting or other communication protocols, and depicted in FIG. 1 as a simple messaging service (SMS) client 160). HTTPS client 150 can be, for example, a laptop computer using the HTTP Secure (HTTPS) protocol. Support for GPRS clients, SMS clients, HTTP clients, and the like thereby provide users with communication functionality according to an embodiment in a mobile environment. As is also depicted in FIG. 1, SMS client 160 can communicate via internet/WAN 110 via several channels. SMS client 160 can communicate directly, for example, with a gateway 165, which, in turn, communicates with internet/WAN 110 via a messaging gateway 167, for example. Alternatively, SMS client 160 can, via gateway 165, communicate with internet/WAN 110 via public messaging services 170 to which gateway 165 is connected. As is also depicted in FIG. 1, a client 125(4) is also able to communicate via internet/WAN 110 by way of public communication services 170.

In order to support various communications such as those depicted in FIG. 1, as well as other communications according to various embodiments, intranet 120(3) includes a server system 175, as well as (optionally) providing for a number of clients (not shown) internal to intranet 120(3). Server system 175 can support, for example, one or more social media services. To this end, server system 175 includes a number of elements that allow server system 175 to provide such functionality, as well as supporting various communications, cloud-based services, enterprise services, and so on. Among these elements are a number of serves (depicted in FIG. 1 as servers 176(1)-(N)). Examples of such servers include servers such as web servers (depicted in FIG. 1 as web servers 177(1)-(N)), and which can be implemented in hardware and/or software). Servers such as servers 176(1)-(N) and/or web servers 177(1)-(N) provide functionality that can be used to support, for example, social media web sites by supporting functionality such as user-generated content, usability, and interoperability. Server system 175 can thus provide such functionality (generically referred to herein as social media web sites, which maintain what is referred to herein as social media information), and in so doing, allow users to interact and collaborate with one another in a social media discourse as creators of user-generated content in a virtual community, examples of which include social networking sites, blogs, wikis, video sharing web sites, hosted services, web applications, and other such social media services.

Also included in network architecture 100 is a social media information aggregation and analysis system 180, which appears in FIG. 1 within intranet 120(2). Social media aggregation and analysis system 180, in turn, includes a social media aggregation system 185 (SMAS 185; which, in fact, can be implemented using one or more servers), a social media information access system 190 (SMIAS 190; which, in fact, can be implemented using one or more servers), and digital content databases (DCDB) 195. Generally, social media aggregation system 185 aggregates social media information from one or more social media sources (e.g., as might be provided, for example, by one or more social media web sites implemented by servers 176(1)-(N) and web servers 177(1)-(N) of server system 175). Social media aggregation system 185 can then store the aggregated social media information in digital content databases 185, for example. Social media information access system 190, in turn, can then provide access to the social media information stored in digital content databases 195 to users employing clients 125(1)-(N), cellular devices such as cellular device 140, web clients such as HTTPS client 150, SMS client 160, and other such communication mechanisms.

As will be appreciated in light of the present disclosure, however, social media aggregation system 185 and social media information access system 190 can be communicatively coupled to one another such that social media aggregation system 185 (or an equivalent mechanism) provides the aggregated social media information directly to social media information access system 190 (or, alternatively, social media information access system 190 acquires the aggregated social media information directly from social media aggregation system 185), without (or before) storing the social media information in digital content databases 185. The functions provided and operations performed by social media aggregation system 185, social media information access system 190, and digital content databases 195, as well as examples of their constituent components, are described in greater detail in connection with FIG. 2, below.

As will be appreciated in light of the present disclosure, various of the elements of FIG. 1 (and, in fact, any methods and systems such as those described herein) can be designed to include hardware and/or software configured to facilitate functionalities that effect operations according to the concepts disclosed herein, among other possible such components and mechanisms, in communication with one another (e.g., directly, via various application programming interfaces (APIs) and/or other such interfaces, and/or other such mechanisms and/or constructs). Further, it will be appreciated that, in light of the present disclosure, the variable identifier "N" is used in several instances in various of the figures herein to more simply designate the final element of a series of related or similar elements (e.g., intranets 120(1)-(N), clients 125(1)-(N), and servers 130(1)-(N)). The repeated use of such variable identifiers is not meant to imply a correlation between the sizes of such series of elements. The use of variable identifiers of this sort in no way is intended to (and does not) require that each series of elements have the same number of elements as another series delimited by the same variable identifier. Rather, in each instance of use, variables thus identified may represent the same or a different value than other instances of the same variable identifier.

As will be appreciated in light of the present disclosure, processes according to concepts embodied by systems such as those described herein include one or more operations, which may be performed in any appropriate order. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable storage media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user using, for example, a computer system such as computer system 2800. Thus, the above described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module, for example.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable storage media. The computer readable storage media may be permanently, removably or remotely coupled to the computer system. The computer readable storage media may non-exclusively include, for example, any number of the following: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; volatile storage media including registers, buffers or caches, main memory, RAM, and the like; and other such computer-readable storage media. In a UNIX-based embodiment, the software modules may be embodied in a file which may be a device, a terminal, a local or remote file, or other such devices. Other new and various types of computer-readable storage media may be used to store the software modules discussed herein.

Figure 2:
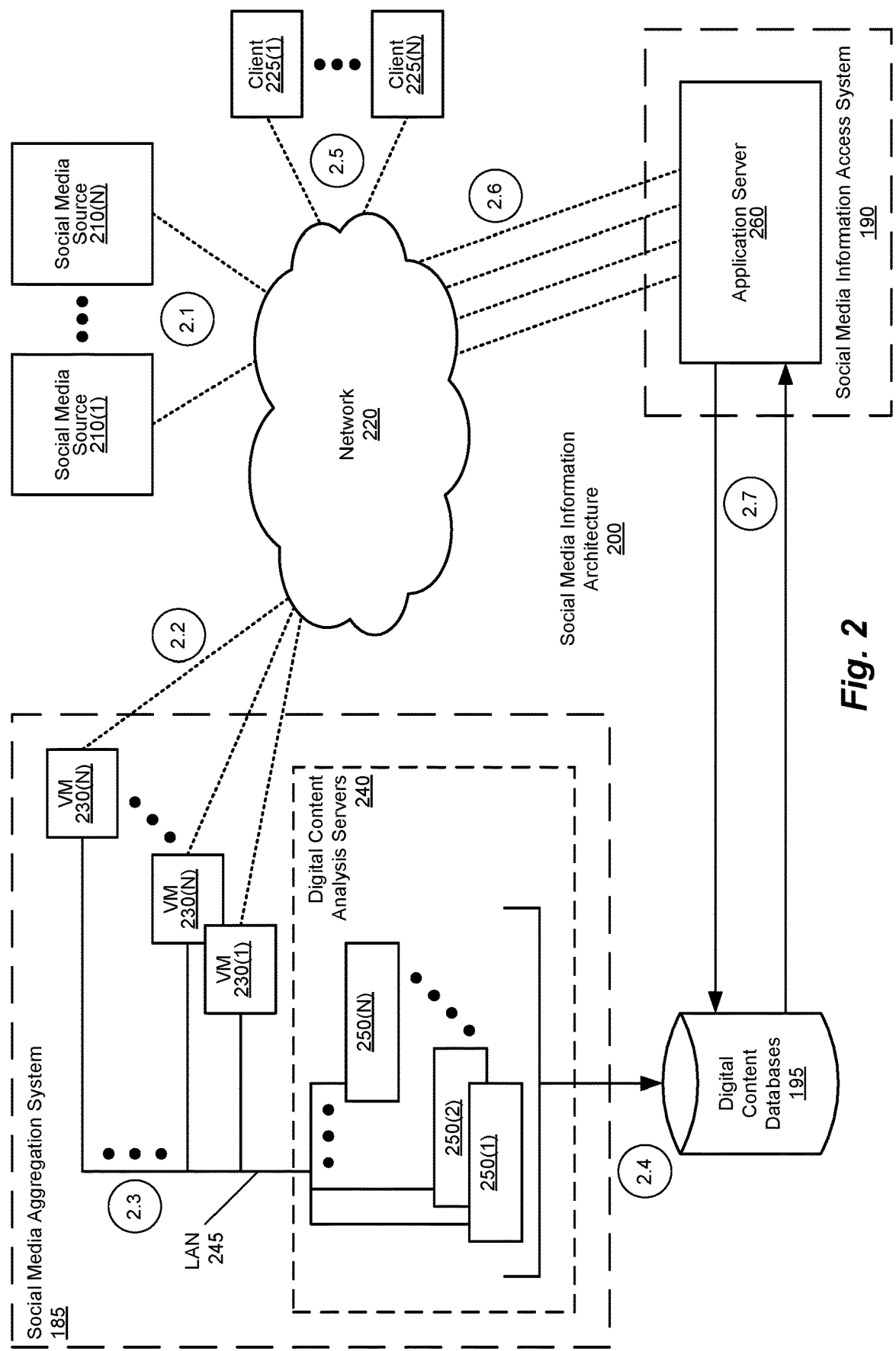
FIG. 2 is a block diagram depicting an example of an architecture for the aggregation, analysis and use of social media information, according to embodiments of methods and systems such as those disclosed herein.

An Example Architecture for Aggregation, Analysis and Use of Social Media Information FIG. 2 is a block diagram depicting an example of an architecture for the aggregation, analysis and use of social media information, according to embodiments of methods and systems such as those disclosed herein. Such an architecture, referred to herein as a social media aggregation architecture 200, aggregates social media information from one or more social media sources (depicted in FIG. 2 as social media sources 210(1)-(N); which can be, for example, social media sources such as those maintained by social media providers) via a network 220. A user of the social media services provided by social media sources 210(1)-(N) access social media sources 210(1)-(N) via network 220, using a client such as those depicted in FIG. 1 (and depicted in FIG. 2 as clients 225(1)-(N)). In certain embodiments, client 225(1)-(N) employ software applications to access, contribute to, modify, and otherwise interact with the social media information maintained and provided by social media sources 210(1)-(N). However, as noted earlier, the social media information maintained by social media sources 210(1)-(N) can be voluminous in nature and thus social media information architecture 200, in certain embodiments, provides a social media aggregation system (e.g., social media aggregation system 185), a social media information access system (e.g., social media information access system 190), and various digital content databases (e.g., digital content database 195).

In certain embodiments, then, social media information is aggregated by a social media aggregation system, such as social media aggregation system 185, which then stores/maintains the aggregated social media information in one or more digital content databases (e.g., digital content databases 195). Alternatively, social media aggregation architecture 200 also provides for the aggregation of such social media information by other avenues, for example, by way of a social media distribution system within a given social media (or other) provider's server systems (not shown, for the sake of simplicity). In the example depicted in FIG. 2, social media aggregation system 185 obtains social media information from one or more of social media sources 210(1)-(N) via network 220, and processes that social media information, aggregating the social media information received and storing the aggregated social media information in one or more of digital content databases 195. In order to acquire and aggregate social media information, social media aggregation system 185 employs a number of components that perform one or more functions to this end. Thus, in certain embodiments, social media aggregation system 185 includes a number of virtual machines (depicted in FIG. 2 as virtual machines 230(1)-(N)), which obtain social media information from social media sources 210(1)-(N) in a manner such as that described subsequently. As will be appreciated in light of the present disclosure, the use of multiple virtual machines provides the ability to dedicate one or more of such virtual machines (ones of virtual machines 230(1)-(N)) to the task of social media aggregation from one or more of social media sources 210(1)-(N). In so doing, such virtual machines can be provisioned and deprovisioned as may be necessary in view of social media sources being added to (or removed from) those from which social media information is to be/being aggregated. Further, such virtual machines can be provisioned and deprovisioned as may be necessary in view of the amount of social media information to be/being aggregated from one or more such social media sources, allowing social media aggregation system 185 to dynamically adapt to changing volumes of social media information produced by social media sources 210(1)-(N). In so doing, such dynamic provisioning and deprovisioning of virtual machines 230(1)-(N) provide social media aggregation system 185 with the ability to dynamically respond to changing flows of social media information, and so efficiently use the computing and storage resources of social media aggregation system 185.

Having obtained social media information from social media sources 210(1)-(N), virtual machines 230(1)-(N) provide this social media information to one or more digital content analysis servers (depicted in FIG. 2 as digital content analysis servers 240) via a local area network (LAN) 245 (or other comparable mechanism). Digital content analysis servers 240 can include one or more production servers 250(1)-(N). Production servers 250(1)-(N) receive aggregated social media information from virtual machines 230(1)-(N) via LAN 245, and perform processing on the social media information thus aggregated. As will be appreciated in light of the present disclosure, digital content analysis servers 240 (e.g., ones of production servers 250(1)-(N)) can be dynamically assigned to perform digital content analysis on social media information aggregated by (and provided to production servers 250(1)-(N) by) ones of virtual machines 230 (1)-(N). In so doing, such dynamic assignment (and re-assignment) of production servers 250(1)-(N) provide social media aggregation system 185 with the ability to dynamically respond to changing flows of social media information, and so efficiently use the computing and storage resources of social media aggregation system 185. Advantageous aspects of social media aggregation system 185 that facilitate such efficient usage of computational and storage resources include not only the virtual nature of virtual machines 230(1)-(N), but also flexibility in processing that can be devoted to the aggregation and analysis of social media information that communications between virtual machines 230(1)-(N) and production servers 250(1)-(N) that is provided by LAN 245 (e.g., by allowing the virtual machines provisioned to aggregate social media information to easily communicate the social media information thus aggregated to the assigned production servers, and to do so in a dynamic fashion, as the flows of social media information change over time).

After processing the aggregated social media information, digital content analysis servers 240 store the processed social media information in digital content databases 195. Once this aggregated and processed social media information is stored in digital content databases 195, users employing clients 225(1)-(N) can access the aggregated social media information in digital content databases 195 via social media information access system 190, which the users access via network 220, for example. In certain embodiments, users employ one or more applications implemented on clients 225(1)-(N), which access social media information access system 190 via network 220, and more specifically employ clients 225(1)-(N) and network 220 to access an application server 260, which provides applications implemented on clients 225(1)-(N) with access to digital content databases 195 and the aggregated and processed social media information maintained therein.

In operation, a social media aggregation architecture such as social media aggregation architecture 200 aggregates, processes, and analyzes social media information from social media providers by, for example, performing the following operations. Virtual machines 230(1)-(N) of social media aggregation system 185 acquire social media information from social media sources 210(1)-(N) (2.1) via network 220 (2.2). Such functionality can be provided by linking to multiple social media platforms with callback addresses, which allows social media aggregation system 185 to receive the desired social media information. A description of an example of such mechanisms is described in connection with FIGS. 4 and 5.

Once (or when) virtual machines 230(1)-(N) receive the desired social media information, virtual machines 230(1)-(N) provide this social media information to digital content analysis servers 240 via LAN 245 (2.3). Digital content analysis servers 240 then process this social media information, collecting, organizing, and filtering the social media information in order to facilitate quick, efficient access thereto. A description of an example of such processing is described in connection with FIGS. 6, 7A, and 7B. Digital content analysis servers 240 then store the processed social media information in one or more of digital content databases 195.

Once the social media information has been processed by social media aggregation system 185 and stored in digital content databases 195, the social media information is available to be accessed by users. To do so, users access application server 260 of social media information access system 190, via network 220 (2.5 and 2.6). In turn, application server 260 accesses the processed social media information in one or more of digital content databases 195, and returns the desired social media information to the user via network 220 (2.7). As will be appreciated in light of the present disclosure, implementing a social media aggregation system using multiple virtual machines (e.g., virtual machines 230(1)-(N)) provides a number of benefits, including parallel acquisition of social media information, multiple network addresses, simplification of the software modules on each VM (which reduces computational and other resource requirements), and other such benefits. Further, the use of a map-reduce approach in certain embodiments can significantly improve performance and reduce resource requirements with respect to the computing systems used to implement social media aggregation system 185 and social media information access system 190. Further, information architecture used to implement digital content databases 195 can also provide significant performance gains and reduce resource requirements, when compared to other approaches that will be appreciated in light of the present disclosure. Also capable of improving performance of social media aggregation architecture 200 is its use of distributed techniques. As will also be appreciated in light of the present disclosure, the networks described herein include the Internet, as well as any cellular and/or other networks that may be involved in the generation, aggregation, and/or use of social media information and/or other digital content.

Figure 3:
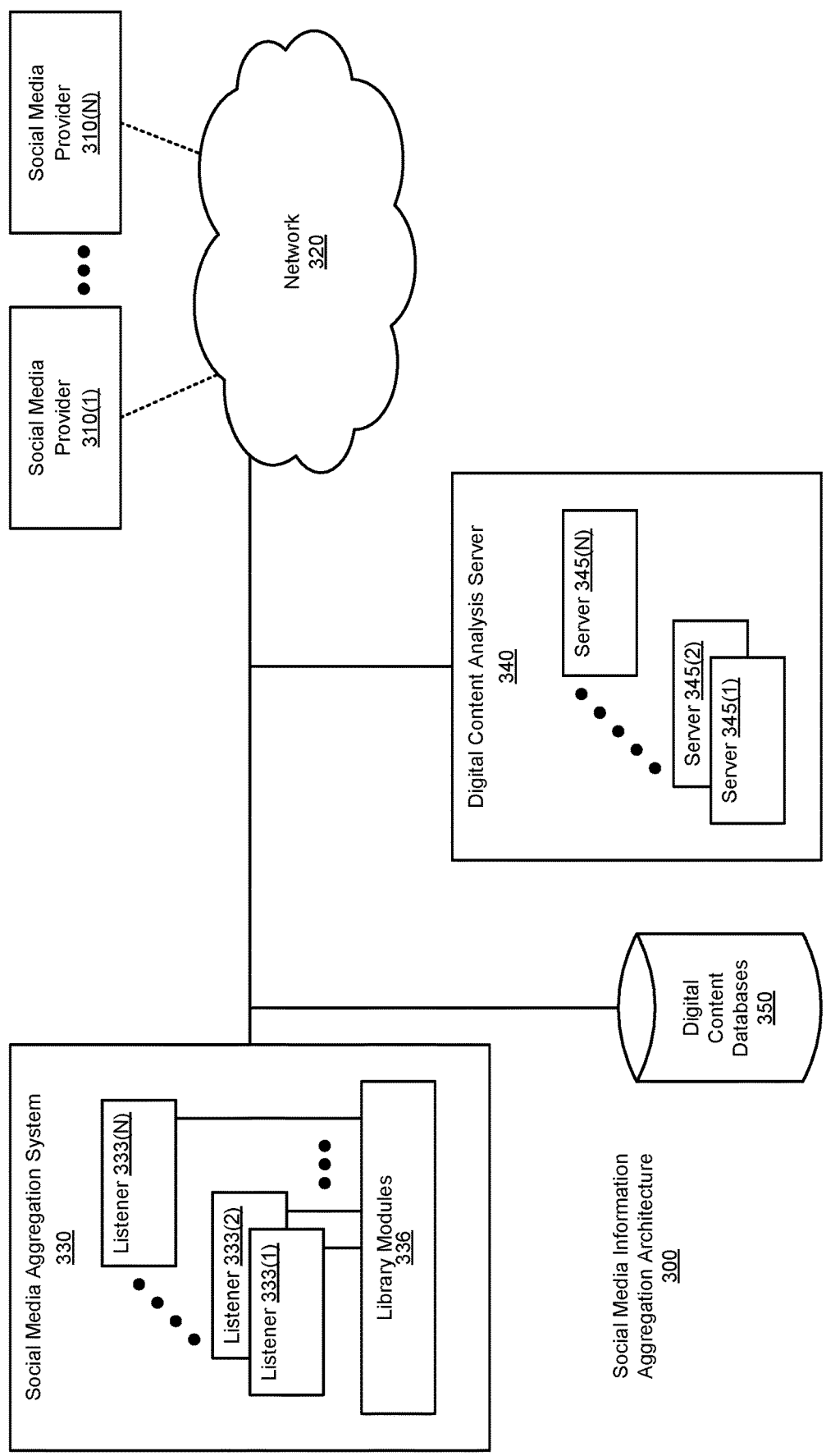
FIG. 3 is a block diagram depicting an example of an architecture for the aggregation of social media information, according to embodiments of methods and systems such as those disclosed herein.

FIG. 3 is a block diagram depicting an example of an architecture for the aggregation of social media information, according to embodiments of methods and systems such as those disclosed herein. FIG. 3 illustrates a social media information aggregation architecture 300, in a manner comparable to that depicted in FIGS. 1 and 2, in which a number of social media providers (depicted in FIG. 3 as social media providers 310(1)-(N)) can be accessed via a network 320 by users and systems such as those depicted herein, in order to acquire, aggregate, and process social media information maintained by social media providers 310(1)-(N). In order to effect such operations, social media information aggregation architecture 300 also includes a social media aggregation system 330. Social media aggregation system 330 includes a number of automated operational modules (referred to herein as AOMs; or more informally as "bots"). Such bots appear in FIG. 3 as part of social media aggregation system 330, as listeners 333(1)-(N), which are supported by one or more library modules (depicted in FIG. 3 as library modules 336). Listeners 333(1)-(N), using functions provided by library modules 336, register with the various social media providers (social media providers 310(1)-(N)). In so doing, listeners 333(1)-(N) are notified by various ones of social media providers 310(1)-(N), upon updated social media information being available there from. As social media information is received by social media aggregation system 330 (and/or upon its receipt by social media aggregation system 330), social media aggregation system 330 provides the aggregated social media information to a digital content analysis server 340. Digital content analysis server 340 includes a number of analysis servers depicted in FIG. 3 as servers 345(1)-(N)), which analyze the aggregated social media information for storage in one or more digital content databases (depicted in FIG. 3 as digital content databases 350).

In operation, elements of information aggregation architecture 300 perform functions in the manner of those described previously. In so doing, a bot "listener" (e.g., library module or SDK (software development kit) component) creates a callback address at which to receive social media information based, for example, on a username, hashtag, or geographic region to receive new posts in real-time from social media provider platforms (e.g., INSTAGRAM, TWITTER, FACEBOOK, and the like). Such callback operations can be effected using public application programming interfaces (APIs) for the social media information sources of interest, which allows social media aggregation system 330 to receive certain specified information from the given social media information source(s). Preferably, in so doing, the type(s) of information of interest to be received are defined, which can be, for example, a specific hashtag's posts, a specific username's posts, or a specific radius of a circular geographic region (e.g., defined with latitude and longitude coordinates). Each different type of specified information can be handled by a different bot. For example, there can be a bot for hashtags, for usernames, and for geographic regions. In certain embodiments, once a template of a bot has been created, multiple duplicates of the bot can be generated, in order to receive more information (which goes to the use of multiple bots to improve performance).

Once there is a new post that meets the specified requirement(s) (e.g., specific geographic region, hashtag, and/or username), the social media provider's social media services notifies the appropriate listener, which acquires the new social media information and provides this information for processing and storage in one or more of the digital content databases. Such communications can be conducted using a standardized format (e.g., a JSON format (JavaScript Object Notation, a lightweight data-interchange format)).

In certain embodiments, once the new social media information has been acquired, the social media information thus obtained is processed by business intelligence processes that transform the raw social media information into data that is meaningful for purposes of provision of such processed social media information to users. This processed social media information is then stored in the appropriate tables in one or more of the digital content databases. This process can be performed more efficiently by performing a mapping operation to identify the various potential polygon rectangles in which the social media event in question may fall (e.g., cities, neighborhoods, and places, as described subsequently in connection with FIGS. 6, 7A, and 7B, for example) and then do a reduce function to determine which polygons in which the given social media event's actual location (e.g., as defined by the social media event's latitude and longitude) might fall (i.e., intersect with).

Figure 4:
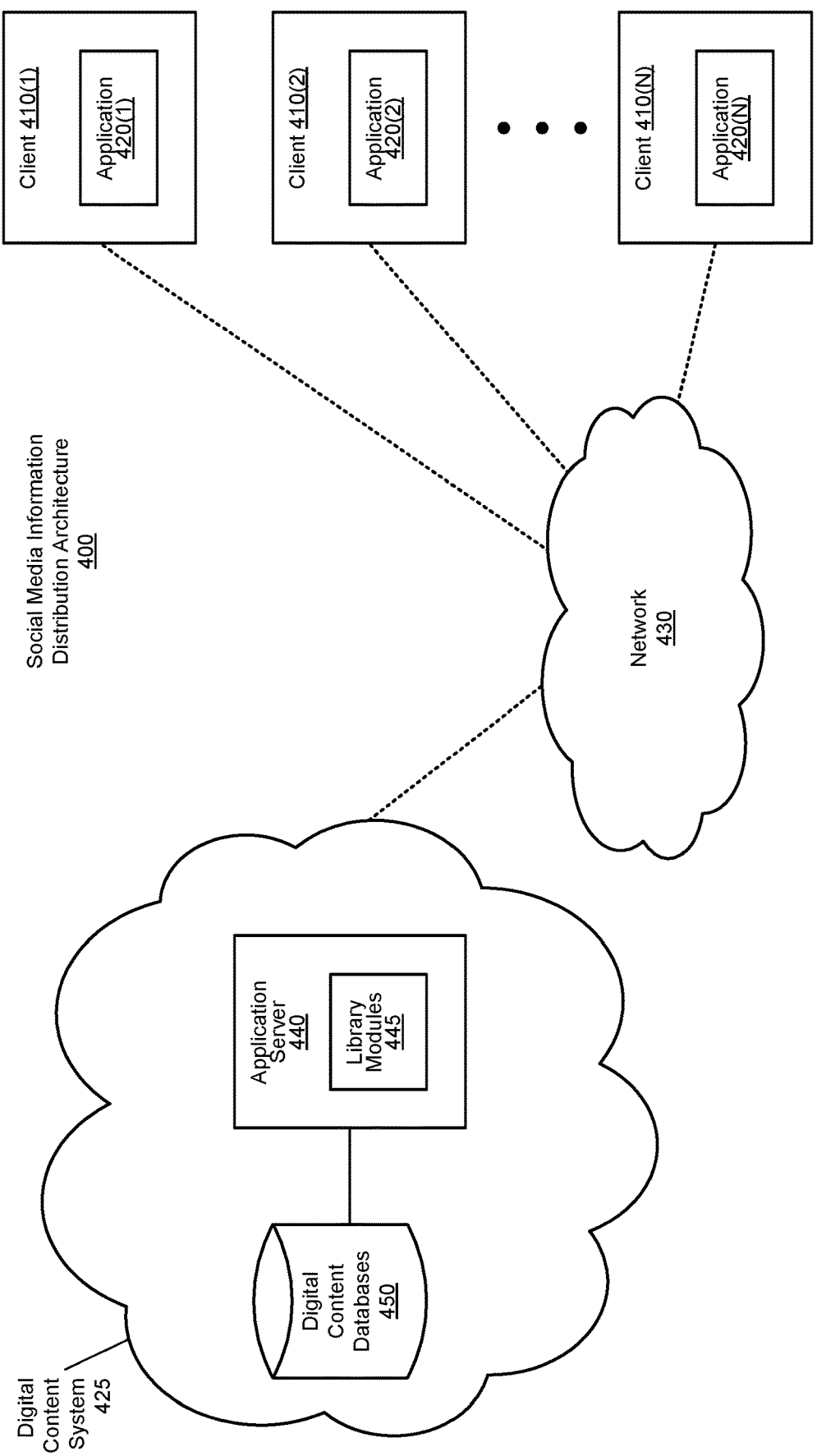
FIG. 4 is a block diagram depicting an example of an architecture for the distribution of social media information, according to embodiments of methods and systems such as those disclosed herein.

FIG. 4 is a block diagram depicting an example of an architecture for the distribution of social media information, according to the embodiments of the methods and systems such as those disclosed herein. FIG. 3 illustrates a social media information distribution architecture 400, in a manner comparable to that depicted in FIGS. 1, 2, and 3. Social media information distribution architecture 400 includes one or more clients (depicted in FIG. 4 as clients 410 (1)-(N)), one or more of which have installed thereon a social media information application (depicted in FIG. 4 as applications 420 (1)-(N)). Social media information distribution architecture 400 also includes a digital content system 425. In social media information distribution architecture 400, clients 410 (1)-(N) are coupled to digital content system 425 via a network 430. As will be appreciated in light of the present disclosure, network 430 is a simplification of the mechanisms by which applications 420(1)-(N) are able to access the services provided by digital content system 425, and will typically include an array of other components, such as those described in connection with FIG. 1, including intranet/LAN 110, public messaging services 170, cellular telephone services, and the like, for example. In turn, digital content system 425 includes an application server 440 (including, for example, library modules such as library modules 445) and one or more digital content databases (depicted in FIG. 4 as digital content databases 450). As noted elsewhere herein, digital content databases 450 and the social media information are preferably organized in a manner that lends itself to relatively fast, efficient retrieval of the (aggregated and processed) social media information, for provision to the users of clients 410(1)-(N) by way of applications 420 (1)-(N).

Example code for processing social media information follows.

```
// This is the beginning of the code
// The bot receives information in JSON format from
// the SDK that talks to the Social Media APIs
// This information is converted into these formats
// for insertion into the databases in the digital contents databases
///
PROCEDURE SP_social_new
    (
        @idnumber                    BIGINT OUTPUT,
        @idfrom                      INT,
        @user_name                   VARCHAR(180),
        @user_id                     VARCHAR(50),
        @user_full_name              VARCHAR(180),
        @user_picture                VARCHAR(512),
        @socialid                    VARCHAR(512),
        @created_time                DATETIME,
        @post_notes                  VARCHAR(MAX},
        @post_url                    VARCHAR(512},
        @post_picture                VARCHAR(512),
        @post_p1cture_high           VARCHAR(512),
        @post_video_low_bandwidth    VARCHAR(512),
        @post_video_low_resolution   VARCHAR(512),
        @post_like                   BIGINT,
```

-continued

```
        @post_comment          BIGINT,
        @latitude              DECIMAL(12, 8),
        @longitude             DECIMAL(12, 8),
        @idfollow              INT,
        @tags                  XML
    )
AS
DECLARE @mhours INT
SET @mhours = ( SELECT DATEDTEE(hh, @created_time, GETUTCDATE( )))
// Define whether the post is within 72 hours
// If it is within 72 hours, continue with the script. If it is not within 72 hours, discard the
post.
IF @mhours <= 72
    BEGIN
    DECLARE @polygonpoint GEOGRAPHY
    DECLARE @id1 BIGINT
    DECLARE @id2 BIGINT
    DECLARE @id3 BIGINT
    SET@polygonpoint = geography::Point(@latitude, @longitude, 4326)
    // If the post comes with a latitude, longitude coordinates,
    // look for the appropriate "feedplace" (the geospatial volume in which the post belongs)
    // which can be described more intuitively as cities, neighborhoods, and places
    // This is not storing the post, just identifying where it should be contained.
    //
    IF @latitude < > 0
        BEGIN
            SET @id1 = ISNULL (( SELECT idnumber FROM feedplaces1
                WHERE @latitude BETWEEN ps AND pn
                    AND @longitude BETWEEN pw AND pe
                    AND polygon.STIntersects(@polygonpoint) = 1), 0)
            SET @id2 = ISNULL(( SELECT idnumber FROM feedplaces2
                WHERE @latitude BETWEEN ps AND pn
                    AND @longitude BETWEEN pw AND pe
                    AND polygon.STIntersects(@polygonpoint) = 1), 0)
            SET @id3 = ISNULL(( SELECT idnumber FROM feedplaces3
                WHERE @latitude BETWEEN ps AND pn
                    AND @longitude BETWEEN pw AND pe
                    AND polygon.STIntersectS(@polygonpoint) = 1), 0)
            // Employ real-time counter that calculates the number of posts
            // within each of the feed places (e.g., fp1, fp2, fp3)
            // per day of the week, and also per hour, so that a historical
            // database of average geographical post density can be stored.
            // This script comes after the previous paragraph, because it
            // provides information as to which geographic region to update.
            UPDATE metricfp1 SET ntoday = ntoday + 1
                WHERE idfeedplaces1 = @id1 AND
                    nday = DATEPART(dw, @created_time) AND
                    nhour = DATEPART(hh, @created_time) AND nlock = 0
            UPDATE metricfp2 SET ntoday =ntoday + 1
                WHERE idfeedplaces2 = @id2 AND
                    nday = DATEPART(dw, @created_time) AND
                    nhour = DATEPART(hh, @created_time) AND nlock = 0
            UPDATE metricfp3 SET ntoday = ntoday + 1
                WHERE idfeedplaces3 = @id3 AND
                    nday = DATEPART(dw, @created_time) AND
                    nhour = DATEPART(hh, @created_time) AND nlock = 0
        END
    ELSE
        BEGIN
            SET @id1 = 0
            SET @id2 = 0
            SET @id3 = 0
        END
// This step stores the social post into our database which is defined by the categories we set
    out in slide 1.
// Also, it stores it based on what we defined as their feed places 1,2, and 3 categories that we
    identified in slide 2.
INSERT INTO socialpost ( id, idfrom, creadate, modidate, user_id, post_notes, post_url,
    post_picture, post_picture_hiqh, post_video_low_bandwidth, post_video_low_resolution,
    post_like, post_comment, latitude, longitude, idfollow, polygonpoint, idfeedplaces1,
    idfeedplaces2, idfeedplaces3)
VALUES (@socialid, @idfrom, @created_time, GETDATE( ), @user_id, @post_notes, @post_url,
    @post_picture, @post_picture_high, @post_video_low_bandwidth, @post_video_low_resolution,
    @post_like, @post_comment, @latitude, @longitude, @idfollow, @polygonpoint, @id1, @id2,
    @id3)
SET @idnumber = SCOPE_IDENTITY( )
IF @latitude < > 0
    // This script is defining a square for us to check
    // whether or not there is intersection with the events
```

// that are currently in our database based on a 25m radius.
// This radius can easily be changed, at any time.
BEGIN
   DECLARE @radius      DECIMAL (12, B)
   DECLARE @pn         DECIMAL (12, 8)
   DECLARE @ps         DECIMAL (12, B)
   DECLARE @pm        DECIMAL (12, R)
   DECLARE @pe         DECIMAL (12, 8)
   SET @radius = 25
   DECLARE @lat         DECIMAL (12, 8)
   DECLARE @lng        DECIMAL (12, 8)
   DECLARE @earthradius  INT
   DECLARE @distance     DECIMAL (12, 8)
   DECLARE @brng        DECIMAL (12, 8)
   DECLARE @tmpLat      DECIMAL (12, 8)
   DECLARE @tmpLng     DECIMAL (12, 8)
SET @lat =  @latitude * PI / 180
SET @lng = @longitude * PI / 180
SET @earthkadius = 6371010
SET @distance = @radius / @earthradius
SET @brng =90 * PI( ) / 180
SET @tmpLat =ASIN(SIN(@lat) * COS(@distance) + COS(@lat) * SIN(@distance) * COS(@brng))
SET @tmpLng =( ( @lng + ATN2(SIN(@brng) * SIN(@distance) * COS(@lat), COS(@distance) −
SIN(@lat) * SIN(@tmpLat) ) * 180 / PI( )
SET @tmpLat = @tmpLat * 180 / PI( )
SET @pe = @tmpLng
SET @brng =180 * PI( ) / 180
SET @tmpLat = ASIN(SIN(@lat) * COS(@distance) + COS(@lat) * SIN(@distance) * COS(@brng))
SET @tmpLng = ( ( @lng + ATN2(SIN(@brng) * SIN(@distance) * COS(@lat), COS(@distance) −
SIN(@lat) * SIN(@tmpLat) ) * 180 / PI( )
SET @tmpLat = @tmpLat * 180 / PI( )
SET @ps = @tmpLat
SET @brng =270 * PI( ) / 180
SET @tmpLat = ASIN(SIN(@lat) * COS(@distance) + COS(@lat) * SIN(@distance) * COS(@brng))
SET @tmpLng = ( ( +169lng + ATN2(SIN(@brng) * SIN(@distance) * COS(@lat), COS(@distance) −
SIN(@lat) * SIN(@tmpLat) ) * 180 / PI( )
SET @tmpLat =@tmpLat * 180 / PI( )
SET @pw = @tmpLat
SET @brng = 360 * PI( ) / 180
SET @tmpLat = ASIN(SIN(@lat) * COS(@distance) + COS(@lat) * SIN(@distance) * COS(@brng))
SET +169tmpLng =( ( @lng + ATN2(SIN(@brng) * SIN(@distance) * COS(@lat), COS(@distance) −
SIN(@lat) * SIN(@tmpLat) ) * 180 / PI( )
SET @tmpLat =@tmpLat * 180 / PI( )
SET @pn = @tmpLat
// This step is to store the particular social post into a specific event
// within a one hour window before and after the event.
// This time can be altered, if desirted.
// First step is the map function which identifies the events in which
// the post can fall within based on its time.
//
// The second step is to reduce based on 3 factors.
// 1 - if event has a unique polygon, it stores based on
//     intersection with the post location.
// 2 - if the event is connected to a feed place 3: then we store based on the id3.
// 3 - if the event has no polygon and no feed p1ace3 association,
//     then we see if there is intersection with the square defined in section above
INSERT INTO socialevents1 (creadate, idsocialpost, idevents1 )
   SELECT @created_time, @idnumber, f1.idnumber
     FROM ( SELECT idnumber FROM events1
       WHERE ((@created_time BETWEEN     DATEADD(HOUR, −1, start_date)
                         AND         DATEADD(HOUR, 1, end_date) )
       AND (@latitude < > 0 AND @longitude < > 0)
       AND (
         ( polygonyn = 1 AND polygon.STIntersects(@polygonpoint) = 1 )
          OR ( latitude BETWEEN @ps AND @pn AND longitude BETWEEN @pw AND @pe )
          OR ( idfeedplaces3 > 0 AND idfeedplaces3 = @id3 )
       )
   ) AS f1
// This section stores the post into our post repository for the map (xsocialfeedmap),
// and defines which meta-content identifier constructs (MCICs)
// the post is linked to based on which idfeedplace
INSERT INTO xsocialfeedmap ( creadate, idsocialpost, idfeeduser, idmap, idfeedplaces,
idfrom )
   SELECT @created_time, @idnumber, f1.idfeeduser, f1.idmap, f1.idfeedplaces, @idfrom
     FROM ( SELECT b.idfeeduser, b.idmap, b.idfeedplaces
        FROM       feeduser AS a ,
           feeduserplaces AS b
        WHERE    a.idnumber = b.idfeeduser
          AND a.email < > 'server@server.com'

```
            AND (
                        b.idmap = 1 AND b.idfeedplaces = @id1
                    OR b.idmap = 2 AND b.idfeedplaces = @id2
                    OR b.idmap = 3 AND b.idfeedplaces = @id3
                    (
            )AS f1
    END
DECLARE @cntl INT
SELECT @cntl = COUNT(ParamValues.dat.query('tag').value('.', 'varchar(50)'))
// This section identifies whether or not there is a hashtag with the post.
FROM @tags.nodes('/table/dat') AS ParamValues ( dat )
IF @cntl > 0
    BEGIN
        // Once we identified that the post has a hashtag, we insert this post into our hashtag
            repository (socialtag).
        INSERT INTO socialtag ( idsocialpost, idfrom, user_id, creadate, latitude, longitude,
            polygonpoint, idfeedplaces1, idfeedphces2, idfeedplaces3, post_tag )
            SELECT @idnunbgr, @idfrom, @user_id, @created_time. @latitiude, @longitude,
            @polygonpoint,
                @id1, @id2, @id3, ParamValues.dat.query('tag').value('.', 'varchar(50)' )
            FROM @tags.nodes('/table/dat') AS ParamValues ( dat )
        // This section inserts the post into our repository for posts when users are browsing
        the list (xsocialfeedlist).
        // Posts can be categorized by 4 criteria:
        //
        // 1 - identifying whether these hashtags are linked to MCICs,
        //       and from there links the post to the specific MCIC
        // 2 - identifies which MCICs the userid (the content creator) is linked to,
        //       and links the post to the subsequent MCICs.
        // 3 - Based on which idfeed it is placed in, we insert the post based on that.
        // 4 - Based on which events we identify this post is associated with (Slide 3),
        //       link to specific MCICs in repository for list. (xsocialfeedlist)
        INSERT INTO xsocialfeedlist ( creadate, idsocialpost, idfeeduser, idfrom )
            SELECT @created_time, @idnumber, f1.idfeeduser, @idfrom
                FROM ( SELECT b.idfeeduser FROM feeduser AS a , feeduserplaces AS b
                    WHERE a.idnumher = b.idfeeduser AND a.email <> 'server@server.ccm'
                    AND (   b.idmap = 1 AND b.idfeedplaces = @id1
                        OR  b.idmap = 2 AND b.idfeedplaces = @id2
                        OR  b.idmap = 3 AND b.idfeedplaces = @id3 )
                UNION
                SELECT idfeeduser FROM feeduserfollow WHERE mtype = 1 AND idfrom = @idfrom AND
                user_id = @user_id
                UNION
                SELECT x1.idfeeduser FRQM events1 AS x1 , socialevents1 AS x2
                    WHERE x1.idnumber = x2.idevents1 AND x2.idsocialpost = @idnumber AND
                    x1.idfeeduser > 0
                UNION
                SELECT DISTINCT idfeeduser FROM feeduserfollow
                    WHERE mtype = 2 AND idfrom = @idfrom
                        AND name IN ( SELECT ParamValues.dat.query('tag').value('.',
                        'varchar(50)' )
                            FROM @tags.nodes('/table/dat') AS ParamValues ( dat ) )
        ) AS f1
    END
ELSE
    // This script is the same as the section above excluding category 1.
    BEGIN
        INSERT INTO xsocialfeedlist ( creadate, idsocialpost, idfeeduser, idfrom )
        SELECT @created_time, idnumber, f1.idfeeduser, @idfrom
        FROM ( SELECT b.idfeeduser FROM feeduser AS a , feeduserplaces AS b
            WHERE a.idnumber = b.idfeeduser AND a.emal1 < > 'server@server.com'
                AND ( b.idmap = 1 AND b.idfeedplaces = @id1
                    OR b.idmap = 2 AND b.idfeedplaces = @id2
                    OR b.idmap = 3 AND b.idfeedplaces = @id3 )
        UNION
        SELECT idfeeduser AND feeduserfollow WHERE mtype = 1 AND idfrom = @idfrom AND user_id =
        @user_id
        UNION
        SELECT x1.idfeeduser FROM events1 AS x1, socialevents1 AS x2 WHERE x1.idnumber =
        x2.idevents1
            AND x2.idsocialpost = @idnumber AND x1.idfeeduser > 0
) AS f1
END
```

The above examples take in aggregated social media information, and by analyzing and organizing this social media information, facilitate distribution of relevant social media information, social media event metrics, and other such information to users.

Examples of Database Tables in a Social Media Aggregation Environment

In one embodiment, a social media content management system includes one or more digital content databases, which, in turn, can be implemented by way of 16 database tables. In certain embodiments, these database tables are grouped into five table categories, and include the following table categories:

1) social media event (e.g., post) information tables;
2) user information tables;
3) place information tables;
4) event information tables; and
5) meta-content identifier construct (MCIC) information tables.

In certain embodiments, two types of databases can be employed, column-oriented databases and relational databases. A column-oriented DBMS is a database management system (DBMS) that stores data tables as sections of columns of data rather than as rows of data. In comparison, most relational DBMSs store data in rows. Column-oriented databases store data in columnar fashion (and thus are also referred to herein as column storage databases, or more simply column storage), and often provide faster access to large amounts of information. Such column-oriented DBMSs have advantages for data warehouses, customer relationship management (CRM) systems, and other ad hoc inquiry systems where aggregates are computed over large numbers of similar data items. However, column-oriented databases can present more complex issues when performing update operations, making such update operations more difficult and computationally expensive to perform. One way to avoid such complexities and overhead is to avoid performing such update operations by restricting write operations to only inserting new information into the given column-oriented database.

Alternatively, a relational database management system (RDBMS) is a database management system (DBMS) that is based on a relational model. RDBMSs are an attractive choice for the storage of information in new databases used for financial records, manufacturing and logistical information, personnel data, and other applications. Relational databases are fast when there are low amounts of information and can perform spatial (e.g., geographic) tasks efficiently, and update insert operations can be performed quickly and efficiently with relational databases. However, when the quantity of data becomes excessive, in relative terms, the performance of such databases can become sluggish. It is by using such alternative database architectures that methods and systems such as those described herein are able to optimize performance of social media content management systems such as those described herein.

Figure 5:
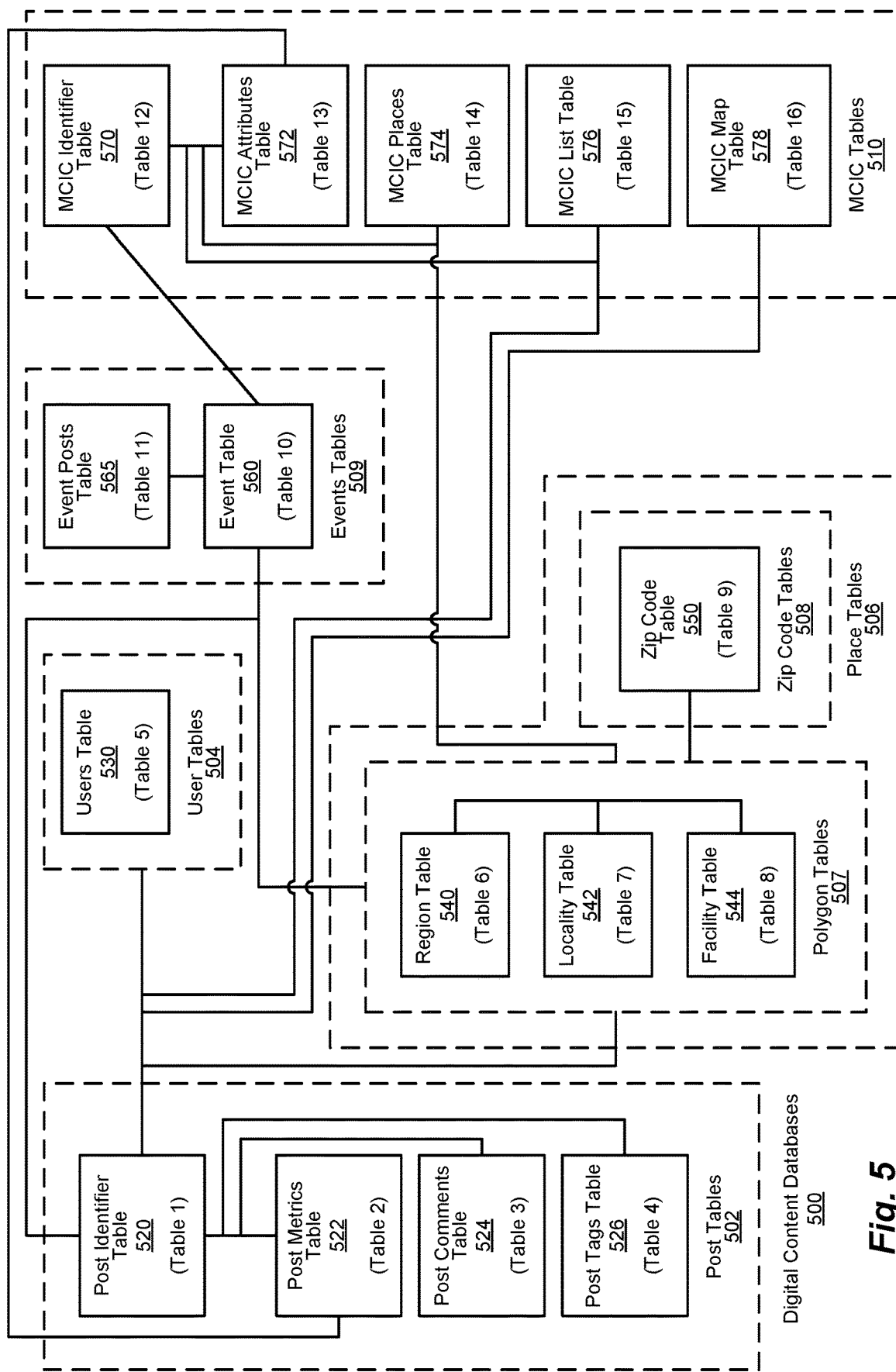
FIG. 5 is a block diagram depicting an example of an architecture for databases that can be used in the aggregation of social media information, according to embodiments of methods and systems such as those disclosed herein.

FIG. 5 is a block diagram depicting an example of an architecture for databases that can be used in the organization of social media information, according to embodiments of methods and systems such as those disclosed herein. As noted, in such an implementation, social media information and associated information can be organized, for example, in 16 database tables. As shown in FIG. 5, these database tables (depicted in FIG. 5, and referred to in the aggregate, as digital content databases 500) can include a variety of database tables, including, for example, post information tables 502, user information tables 504, place information tables 506 (including polygon tables 507 and zip code tables 508), event information tables 509, and MCIC information tables 510. Database tables 500 are related to one another by way a number of relationships, owing to relationships between various of the information maintained in each. As will be appreciated in light of the present disclosure, the structures of digital content databases 500 are such that social media information produced by a social media aggregation system such as social media aggregation system 185 and social media aggregation system 330 can be stored in an efficient and effective manner (in terms of factors such as storage speed, storage consumed, bandwidth needed, and other such aspects). The tables, described in detail subsequently, include:

a post identifier table (depicted in FIG. 5 as a post identifier table 520, and described below in connection with Table 1, below);

a post metrics table (depicted in FIG. 5 as a post metrics table 522, and described below in connection with Table 2, below);

a post comments table (depicted in FIG. 5 as a post comments table 524, and described below in connection with Table 3, below);

a post tags table (depicted in FIG. 5 as a post tags table 526, and described below in connection with Table 4, below);

a users table (depicted in FIG. 5 as a users table 530, and described below in connection with Table 5, below);

a region table (depicted in FIG. 5 as a region table 540 (for feedplace1, as noted in the program code previously presented), and described below in connection with Table 6, below);

a locality table (depicted in FIG. 5 as a locality table 542 (for feedplace2, as noted in the program code previously presented), and described below in connection with Table 7, below);

a facility table (depicted in FIG. 5 as a facility table 544 (for feedplace3, as noted in the program code previously presented), and described below in connection with Table 8, below);

a postal code table (depicted in FIG. 5 as a zip code table 550, and described below in connection with Table 9, below);

an event table (depicted in FIG. 5 as a event table 560, and described below in connection with Table 10, below);

an event posts table (depicted in FIG. 5 as a event posts table 565, and described below in connection with Table 11, below);

an MCIC identifier table (depicted in FIG. 5 as an MCIC identifier table 570, and described below in connection with Table 12, below);

an MCIC attributes table (depicted in FIG. 5 as an MCIC attributes table 572, and described below in connection with Table 13, below);

an MCIC places table (depicted in FIG. 5 as an MCIC places table 574, and described below in connection with Table 14, below);

an MCIC list table (depicted in FIG. 5 as an MCIC list table 576, and described below in connection with Table 15, below); and an MCIC map table (depicted in FIG. 5 as an MCIC map table 578, and described below in connection with Table 16, below).

Post Tables

TABLE 1

| Post identifier information (column storage) | | | | |
|---|---|---|---|---|
| postID | region | locality | facility | Post Information |
| 76890 | regionID | localityID | facilityID | |

Table 1 includes the post identifier (postID), which identifies the post (social media event) in question, and polygon information (e.g., information regarding region, locality, and facility (also referred to herein as feedplace1, feedplace2, and feedplace3)), which indicates the geographic area(s) in which the post occurred (with increasing specificity, in this example), examples of which are discussed in connection with tables 6, 7, and 8, below. As will be appreciated in light of the present disclosure, the geospatial identifiers in Table 1 provide a connection to each of their respective geospatial locations, as per tables 6, 7, and 8, below. This information includes polygon information and the postID of the post in order to allow the post and its location to be determined. Table 1 also includes post information regarding information conveyed by the post, which can include, for example, social media content such as (e.g., figures, photographs, video, animations, and/or the like), the geographic location from which the post originated (in terms of the post's latitude ("lat") and longitude ("long")), the time of the post, a description of the post, any associated URLs, which platform was used to create the post, and/or other relevant information. Column storage is used for Table 1 because, while this database table maintains large amounts of information (and being able to search that information quickly and efficiently is important), the entries are not typically modified (typically, new posts and information associated therewith are added, rather than existing posts being modified). In certain embodiments, in fact, no modifications to existing posts in this database table occur, and only new posts (and their associated information) are added thereto. Table 1 is, as with the other social media event information tables, indexed by the postID.

TABLE 2

| Social media event metrics (relational database) | | | |
|---|---|---|---|
| postID | # of likes | # of comments | # of tags |
| 83756 | 80 | 23 | 1 |

Table 2 includes the post identifier (which identifies the post in question), and metrics for the post identified by the post identifier. In the present example, such metrics include the number of likes for the given post, number of comments, and number of tags for each post. This database is preferably a relational database, as this database is updated frequently. Thus, for example, when information regarding an existing post (also referred to herein as a "duplicate post") is received, the information received is used to update the information maintained in Table 2 (e.g., when another user "likes" the post identified by postID 83756, the number of likes for postID 83756 is incremented by one, to 81). Table 2 is, as with the other social media event information tables, indexed by the postID. As will be appreciated in light of the present disclosure, a wide variety of analytical operations can be performed using social media event metrics such as those maintained in Table 2, providing the opportunity to analyze such information for trends and the like (e.g., for use in marketing).

TABLE 3

| Post comments (column storage) | | | |
|---|---|---|---|
| postID | Comment | Time | Username |
| 83245 | "I like this!" | 2:39 PM | @ user123 |

Table 3 maintains information regarding the comments for each post. In certain embodiments, the database for Table 3 is (typically) column storage, as the number of comments is typically quite large, and such comments are (typically) not subject to change, given that in such embodiments, once submitted, comments are only inserted (and not updated). Table 3 is, as with the other social media event information tables, indexed by the postID.

TABLE 4

| Post tags (column storage) | |
|---|---|
| Post ID | Tag |
| 7382 | #Houston |
| 7382 | #FunTimes |

Table 4 maintains information regarding the tags (e.g., "hashtags") for each post. Here again, in certain embodiments, the database for Table 4 is (typically) column storage, as the number of tags is typically quite large, and such tags are (typically) not subject to change, given that in such embodiments, once submitted, tags are only inserted (and not updated). Table 4 is, as with the other social media event information tables, indexed by the postID.

User Tables

TABLE 5

| User information database (Relational Database) | | | | |
|---|---|---|---|---|
| UserID | username | picture | lat/long | Time of last post |
| 47892 | @ user1234 | www.insta/123 | | |

Table 5 maintains information regarding the users identified during aggregation of social media information that is received from social media platforms, and maintains information regarding those users, certain of which can be based on the user's last post. Aside from some manner of identifying information (here, a UserID, e.g.), information maintained in Table 5 can include the user's username, their picture, their location (or dynamically, their present location; in terms of the user's latitude ("lat") and longitude ("long")), the time of their last post, profile information, and other such information. In certain embodiments, Table 5 is (typically) maintained in a relational database, as certain information regarding the user in question, such as the user's location, the time of their last post, and other such information, can (and, typically, will) change. Further still, it may be advantageous to allow other information regarding the user to change, such as the user's picture. As will be appreciated in light of the present disclosure, a user's information can be updated (e.g., if the user exists upon the occurrence of a social media event), or the user can be added (e.g., if the social media event is the user's first such social media event).

Place Tables

The following tables describe an embodiment in which a three-level hierarchy of geographic areas is employed (e.g., regions (e.g., a city), localities (e.g., a neighborhood), and facilities (e.g., places such as an event facility such as a stadium, building, arena, or other such facility)). As will be appreciated in light of the present disclosure, other hierarchies and a variety of levels of geographic areas (e.g., country, state, city, district, etc.) can be employed, and such alternatives are intended to come within the scope of the present disclosure.

Polygon Tables

TABLE 6

Region Table (Relational Database)

| PlaceID | Name | Zip Code Flag (0 or 1) | Polygon Coordinate |
|---------|------|------------------------|--------------------|
| 1 | Houston | 0 | lat long, lat long, etc. |

Table 6 is a region table that maintains information regarding the region (e.g., cities) in the digital content databases. This database is relational, and contains, for example, an identifier for the place (PlaceID), the name, and the coordinates for the region's polygon (e.g., in terms of latitude and longitude), as well as whether the city has zip codes or not. If the city has zip codes, then "Zip Code Flag" is set (e.g., to a value of 1), and otherwise, is cleared (e.g., to a value of 0). The polygon coordinates are the coordinates (e.g., in terms of geospatial coordinates such as latitude and longitude) that define the polygon that, in turn, defines the spatial (e.g., geographic) boundaries of the given geospatial area, volume, etc., for purposes of the methods and systems described herein. It is from these polygon coordinates that a determination can be made as to whether a social media event has occurred within the given boundaries. Further, such boundaries are also available for use in generating geometric shapes (e.g., areas, volumes, or other simplified n-dimensional spaces), which can be used to efficiently reduce the number of candidate social media events that need to be evaluated as to their occurrence within the given polygon (polyhedron, or other appropriate n-dimensional space), thus simplifying such determinations.

TABLE 7

Locality Table (Relational Database)

| PlaceID | Name | Region | Zip Code | Polygon |
|---------|------|--------|----------|---------|
| 128 | Manhattan | 03 | 1 | lat long, lat long, etc. |

Table 7 is a locality table that maintains information regarding the locality (e.g., neighborhoods) in the digital content databases. This database is relational, and contains, for example, the identifier of the locality (PlaceID), the locality's name, and the coordinates for the polygon of the locality's boundaries, for purposes of the methods and systems described herein (e.g., in terms of the latitude and longitude of each point in the facility's polygon), as well as whether the region in which the locality exists has zip codes or not. Unlike the last table, however, the locality table also shows which region (e.g., city) in which the locality is situated.

TABLE 8

Facility Table (Relational Database)

| PlaceID | Place Name | Region | Locality | Zip Code | Polygon |
|---------|------------|--------|----------|----------|---------|
| 08927 | McDonalds | 03 | 1247 | 1 | lat long, lat long, etc. |

Table 8 is a facility table that maintains information regarding the given facility (e.g., places) in the digital content databases. This database is relational, and contains, for example, an identifier of the facility (PlaceID), the facility's name (Place Name), and the coordinates for the polygon describing the facility's boundaries, for purposes of the methods and systems described herein (e.g., in terms of the latitude and longitude of each point in the facility's polygon), as well as whether the region in which the facility is situated has zip codes. The facility table also shows which region (e.g., city) and locality (e.g., neighborhood) in which the facility is located.

An example of a relational database paradigm that can be used to implement the polygon tables (Tables 6, 7, and 8) is a spatial database, or geodatabase, which is a database that is optimized to store and query data that represents objects defined in a geometric space. Such a spatial databases provides for the representation of simple geometric objects such as points, lines, and polygons, and can be used to represent more complex structures, such as topological coverage. More specifically, such databases can be implemented using an object-based spatial database, which is a spatial database that stores locations as objects. Such an object-based spatial model treats the world as surface littered with recognizable objects (e.g., cities, neighborhoods, venues, and so on) that exist independent of their locations. Such objects can be simple (e.g., polygons and lines) or more complex (e.g., cities), and the use of such a database paradigm allows for easier storage of additional object attributes, and more efficient operations thereon. Storing attributes with objects can also provide better result presentation and improved manipulation capabilities in a more efficient way.

Zip Code Table

TABLE 9

Zip codes (Relational Databases)

| ZipID | CensusInfo | coordinates |
|-------|------------|-------------|

Table 9 maintains information regarding zip codes. It is relational and contains identifier of the place, the basic census info, and the coordinates of the polygon that defines the area defined by the given zip code.

Event Tables

TABLE 10

Events (Relational Databases)

| event ID | lat long | time | MCICID | Region | Locality | Facility |
|----------|----------|------|--------|--------|----------|----------|

Table 10 maintains information regarding events in the database, and it is a relational database. This table contains the event identifier, the latitude/longitude of the event, basic information such as event organizers, URLs, ticket price(s), and other such information, as well as time, the MCIC(s)

associated with the event, and which the region, locality, and facility with which the is associated.

As will be appreciated in light of the present disclosure, information regarding one or more other features of interest regarding a given event can also be included in an events table such as Table 10 (e.g., by providing one or more columns for such information). Such information can include, for example, persons associated with the event (e.g., performers, staff, participants, or other such persons), physical items associated with the event (e.g., lighting equipment, sound equipment, transportation equipment, furniture, and/or all manner of other physical items), services associated with the event (e.g., catering services, event planning services, photography/videography services, advertising/marketing services, and/or other services), and so on. Further, items and/or services associated with an event can also be virtual (e.g., online streaming services, online marketing/advertising services, network communications, and so on). As will be appreciated, then, all manner of such features can be identified/tracked via association with a given event. Further still, such features can be associated with the event and/or one another by way of a given MCIC (or MCICs (e.g., in the case of a performer appearing at multiple events)). The use of MCICs also allows for tracking such features from event-to-event, place-to-place, and so on. For example, a feature identifier (by way, e.g., of a column in the event table, or a dedicated table) can be employed to connect a given performer's identifier to one or more events (e.g., thereby indicating the person/group performing at the given event) and thus linking them to one or more MCICs.

TABLE 11

Event Posts (Relational Databases)

| event ID | post ID |
|---|---|
| 21 | 88 |
| 21 | 901 |

Table 11 maintains information regarding posts (social media events taking place) that are linked to a specific event, based, for example, on the location of the post.
MCIC Tables

TABLE 12

MCIC identifier (relational database)

| MCICID | MCIC name | user created |
|---|---|---|
| 88 | ^Rockets | @ user123 |

Table 12 maintains information regarding the MCICs that in the database and assigns ID numbers to those MCICs (MCICID).

TABLE 13

MCIC Attributes (relational)

| MCICID | username/hashtag | Type (1 = username/2 = hashtag) |
|---|---|---|
| 88 | @ user123 | 1 |
| 88 | #funtimes | 2 |
| 79 | #cool | 2 |

Table 13 is an MCIC attributes table, which maintains information regarding social media attributes (specific values, ranges, etc., of social media information associated with the given MCIC, such as hashtags, usernames, and the like) that are linked to each MCIC.

TABLE 14

MCIC Places (relational)

| MCICID | Place Type | (1, 2, 3) | PlaceID |
|---|---|---|---|
| 88 | 1 | | 23 |

Table 14 maintains information regarding the various place(s) linked to the MCICs in the database (also referred to herein as "MCICplaces"). For instance, in this case, for MCICID 88, the place type 1 with placeID23 is linked to that MCIC, which is a city. The place type indicates the geospatial area(s)/volume(s) (also referred to herein as feedplace(s)) to which the given MCICID is linked, such as a place, neighborhood, or city, as represented by the appropriate geographic areas (as described, e.g., in connection with Tables 6, 7, and 8).

TABLE 15

MCIC List (column storage)

| MCICID | Post ID |
|---|---|
| 78 | 21 |
| 78 | 24 |

Table 15 maintains information regarding the posts that are associated with each MCIC (MCICID). This information can be maintained with or without geospatial (e.g., latitude and longitude) information. Because there are a relatively large number of posts stored and maintained in this table, the MCIC map table is stored in column storage.

TABLE 16

MCIC Map (column storage)

| MCIC ID | Post ID |
|---|---|
| 78 | 21 |
| 78 | 24 |

Table 16 maintains information regarding the posts that are associated with an MCIC, with latitude and longitude (in contrast to Table 15). Because there are a relatively large number of posts stored and maintained in this table, the MCIC map table is stored in column storage.

Figure 6A:
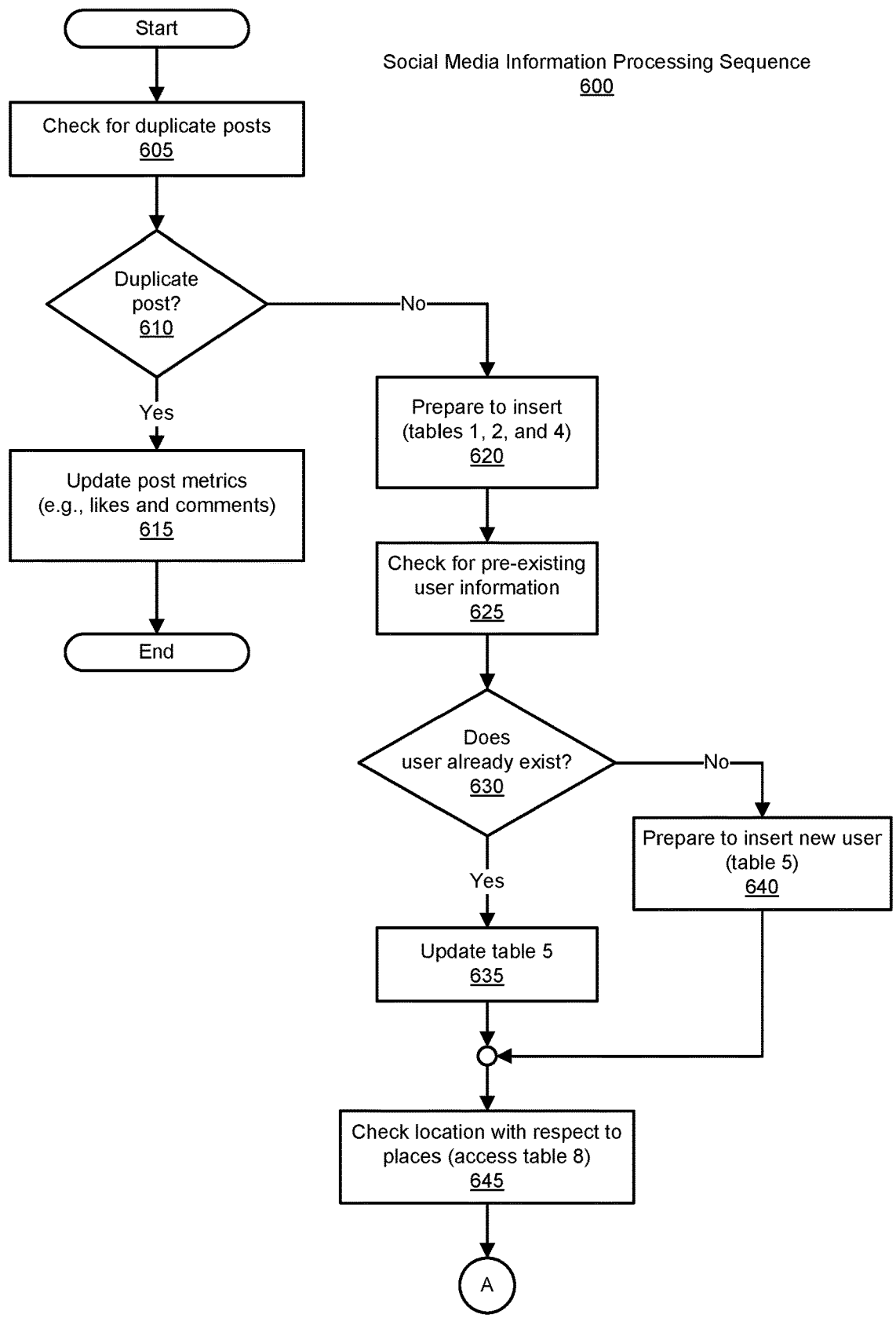
FIGS. 6A and 6B are flow diagrams depicting examples of processes for the processing of social media information, according to embodiments of methods and systems such as those disclosed herein.
Figure 6B:
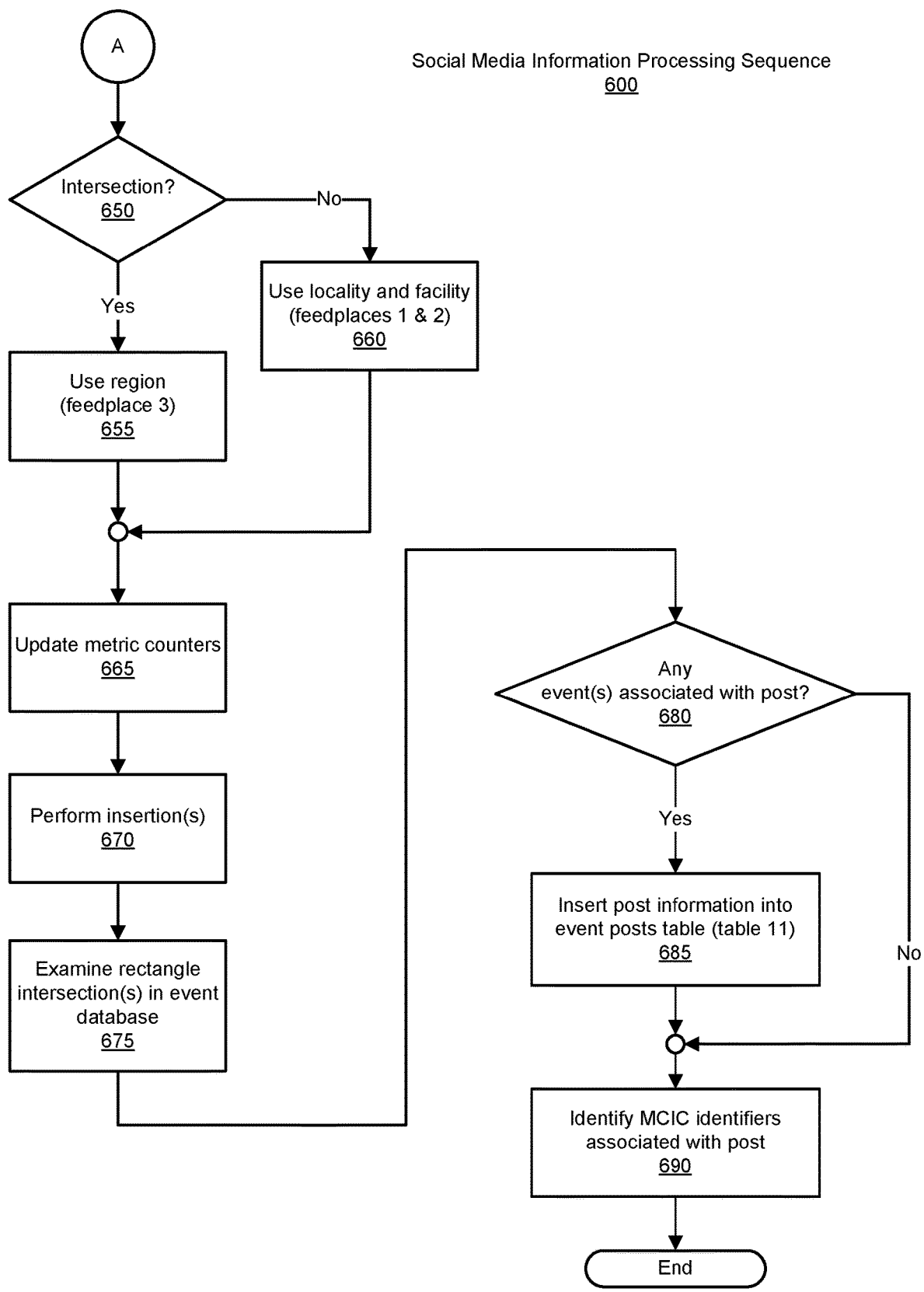

FIGS. 6A and 6B are flow diagrams depicting examples of processes for the processing of social media information, according to embodiments of methods and systems such as those disclosed herein. Illustrated in FIGS. 6A and 6B is a social media information processing sequence 600 according to embodiments of methods and systems such as those described herein. Social media information processing sequence 600 begins with a determination as to whether one or more of the units of social media information (discussed in terms of informational posts, or more simply posts, hereinafter) are duplicates of such posts already processed (605). If the post(s) received is a duplicate (610), information regarding the post (e.g., likes and comments) are updated in the information maintained in the relevant ones of the digital content databases (615). Otherwise, if the post(s) is not a duplicate (610), preparations are made to insert information regarding the post(s) in tables 1, 2, and 4 (post identifier table 520, post metrics table 522, and post tags table 526) (620).

Next, a determination is made as to whether information regarding the user providing such posts already exists (e.g., in table 5 (users table 530)) by checking the user information in question (625). If the user already exists in the databases of the digital content databases (630), bots on the digital content analysis servers update the relevant digital content databases, and more specifically, the information in table 5 (users table 530) (635). Otherwise, if the user effectively does not exist in table 5 (users table 530), preparations are made to insert the user in question as a new user into table 5 (users table 530) (640). Once the user is located in users table 530 (or added to users table 530), the place tables are checked with regard to places that are relevant to the post in question, and so check the user's location with respect to places by accessing table 8 (645).

The process then proceeds to the portion of social media information processing sequence 600 depicted in FIG. 6B. Thus, a determination is made as to whether the relevant locations intersect with any of the places defined in the place tables, and more specifically in the polygon tables (including the region table, the locality table, and the facility table) and the zip code table (650). If an intersection is found between the location(s) in question and the places identified in table 8 (the facility table), the facility(ies) identified in table 8 can be used (i.e., feedplace 3 can be employed, as a result of the table(s) identifying feedplace 3, identifying feedplaces 1 and 2 by definition (655). If no intersection between the location(s) in question and the places identified in table 8 exist (650), the place information maintained in tables 6 and 7 (the region table and the locality table, respectively) are employed (660). Once a determination has been made as to place information from which of the region table, the locality table, the facility table, and the zip code table is to be used, metric counters associated with a post(s) in question are updated (665).

Once the affected metric counters have been updated (665), an insert operation is performed on tables 1, 2, 4, and 5, inserting information regarding the post therein (step 670). Next, the intersection of the rectangles in the event database (table 10; the event table) are examined to determine whether any intersections exist (675). In certain embodiments, events will have associated time periods, which identify the period or periods of time for which the event is valid (the time or times of which the event exists or is occurring). Based on this analysis, a determination can be made as to whether any events are in existence with which the post is associated (680). If the post in question is associated with one or more events, as reflected by this analysis (675), information regarding the post (or posts) is recorded (e.g., by inserting such information into table 11 (the event posts table)) (685). If no events are associated with the post in question (or no such associations exist) (680), MCIC identifiers associated with the post in question are identified (690). Pseudo code reflecting such a process, and the possible resulting updates to tables 4, 10, 11, 13, and 14 are described below.

Programmatically, the foregoing process can be implemented, for example, using the following pseudo-code.
1. Check for duplicate posts
   a. YES: update social media event information (e.g., likes and comments regarding the given post (Table 2)). No need to perform remaining steps.
   b. NO: prepare social media event and relevant information regarding same for insertion into tables 1, 2, and 4 and continue process.
2. Check for pre-existing user information
   a. YES: update table 5 with new location of user and time of update
   b. NO: prepare to insert into table 5 as new user
3. Check for places (Feedplaces 1,2, and 3, and, potentially, zip code)
   a. identify intersection of latitude/longitude with rectangles first, then polygons; this is done for feedplace 3, initially.
      i. If there is intersection, feedplace 1 and 2 are known, because feedplace 3 is within feedplaces 1 and 2, and so already reflects information regarding feedplaces 1 and 2 (table 8); continue process using feedplace 3.
      ii. If there is no intersection, continue process using feedplace 2 and feedplace 1.
4. Update social media event metrics
   a. In addition to inserting the social media event into the appropriate database, the metric counters associated with the social media event are updated (e.g., if a post is in Houston, Houston now has another post during the time period in question)
5. Insert social media event
   a. Once the previous information is obtained, an insert operation can be performed on tables 1, 2, 4, and 5, inserting the social media event information into those tables.
6. Events
   a. Examine the intersection of the rectangles of the events in the event database (which represent the event polygons) (table 10); in certain embodiments, only the event rectangles for the time frame of the events that are occurring during the time of the post are examined.
   b. If there is an event associated with the post, perform an insert operation to insert the information into the event posts table (table 11).
7. Identify MCIC identifiers (MCICIDs) associated with a given post (social media event) (where "fp" denotes "feedplace"):
   select unique MCICID from (
   select MCICID from MCICplaces (table 14)
      where fp1=x or fp2=x or fp3=x
   union
   select MCICID from MCIC users and hashtags (table 13)
      where type=2 AND feed in Post Tags (table 4)
   select MCIC ID from MCIC users and hashtags (table 13)
      where type=1 AND feed=@username
   select MCIC ID from events (table 10)
      where MCICID>0 AND event ID in event posts (table 11)

An MCIC includes information such as hashtags, usernames, events, and polygons, and so, in certain embodiments, the MCIC(s) associated with the post are identified and then inserted into tables 15 and 16 (MCIC list table 576 and MCIC map table 578). The first step of processing such information in this regard is to identify MCICs with region, locality, and facility (feedplaces 1, 2, and 3) that are discovered earlier in the process. The next step is to identify MCICIDs with the hashtags and usernames that are included in the post. Next, events are identified based on their time and location. Once the requisite information has been determined, the relevant MCICIDs are known, and then inserted into tables 15 and 16. In this regard, as will be appreciated in light of the present disclosure, it should be understood that an event (e.g., an activity such as a concert, sports event, a meeting, or other occurrence, whether virtual, real-world, or some combination thereof) is to be distinguished from a social media event (e.g., an electronic posting, text message, upload, comment, tweet, email message, or other such electronic message, communication, or notification).

Figure 7:
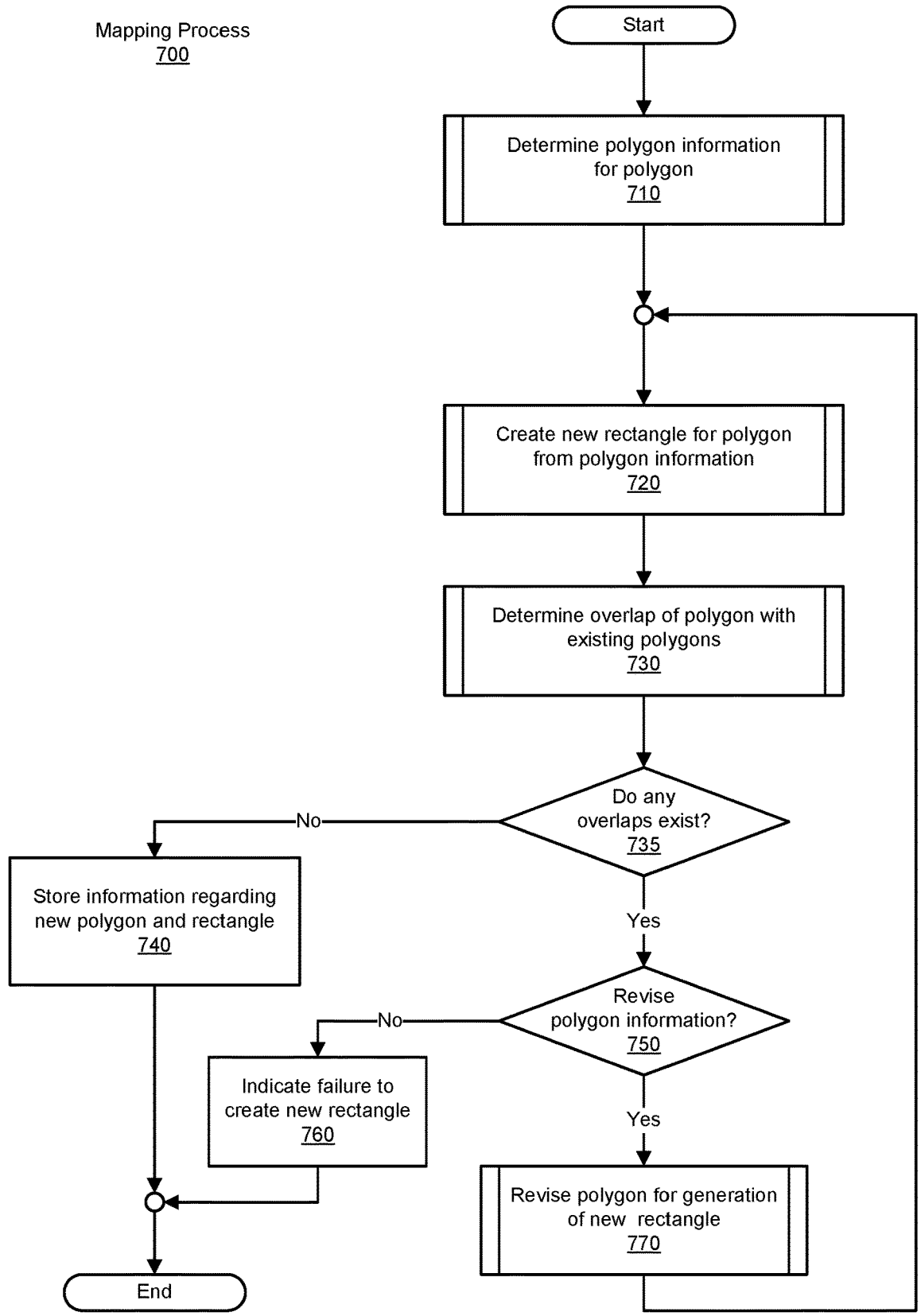
FIG. 7 is a flow diagram depicting an example of a process for mapping sources of social media information, according to embodiments of the methods and systems such as those disclosed herein.

Examples of Automated Social Media Information Distribution Processes and Systems FIG. 7 is a flow diagram depicting an example of a process for mapping sources of social media information, according to embodiments of the methods and systems such as those disclosed herein. To this end, FIG. 7 depicts a mapping process 700. Mapping process 700 begins with a determination as to the polygon information for the polygon in question (710). A process for determining polygon information for a given polygon is described in connection with the process depicted in FIG. 8. Once the polygon information for the given polygon has been determined, a new rectangle representing the polygon is created based on that polygon's polygon information (720). As will be appreciated in light of the present disclosure, while certain of the examples presented herein are described in connection with the use of rectangles as a representation for the polygon being discussed (i.e., the geographic area(s) of interest), a number of alternatives will be apparent and the scope of the present disclosure is intended to comprehend such alternatives. For example, some number of triangle can be used in this regard to good affect where a given area is represented using one or more such triangle, where such triangle overlap and/or above one another. A process for creating a rectangle, for example, is described in connection with FIG. 9 and its description.

Next, the new rectangle representing the polygon having been created (720), a determination is made as to whether the new rectangle overlaps any other rectangle, and whether such overlap involves an overlap of polygons (730). If no overlaps exists (735), information regarding the new polygon and its corresponding rectangle is stored (740). Alternatively, if one or more overlaps do exist (735), a determination is made as to whether the polygon's information can and should be revised (750). Depending on the approach taken, such revision may include changes to the rectangle in question and/or changes to the polygon in question. If the polygon's polygon information is not to be changed (750), an indication is made as to the failure to create the new rectangle for the polygon (760). Alternatively, if the polygon's polygon information can and should be revised (750), a process for revising the polygon's polygon information for generation of a new rectangle is performed (770). At this juncture, the process iterates to the creation of a new rectangle for the (now-revised) polygon information (720). The process then continues as described earlier, until an acceptable rectangle has been created or such a rectangle cannot be created. It will be appreciated that, in other embodiments, overlapping polygons can be allowed to exist (even if not separated by time or other dimensions), which involves (upon the determination of a point of interest (e.g., a user's location) intercepting both polygons in the region of overlap) making a determination as to the import of the point of interest being in the overlapping region.

Figure 8:
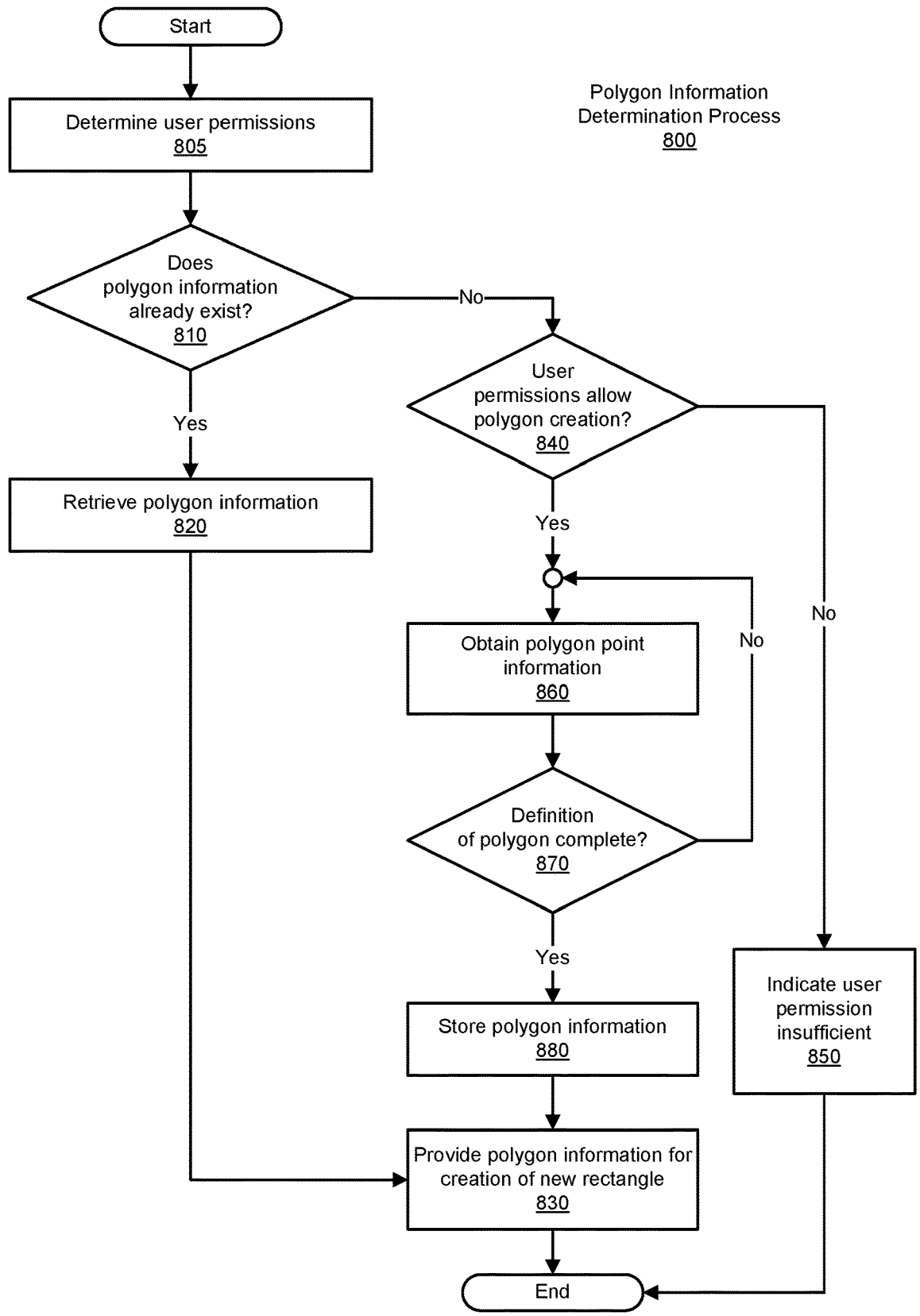
FIG. 8 is a flow diagram depicting an example of a process for the determination of polygon information, according to embodiments of methods and systems such as those disclosed herein.

FIG. 8 is a flow diagram depicting an example of a process for the determination of polygon information, according to embodiments of methods and systems such as those disclosed herein. The process of FIG. 8 begins with a determination as to the user's permissions (800). Once the user's permissions have been determined (800), a determination is made as to whether the polygon information already exists in the databases (e.g., digital content databases 195 and/or digital content databases 350) (810). If the polygon information already exists (810), the relevant polygon information is retrieved from one or more of the digital content databases (820). In that case, the polygon information thus retrieved is provided to, for example, one or more of the digital content analysis servers for the creation of a new rectangle (830).

If the polygon's polygon information does not already exist (810), a determination is made as to whether the user's permissions allow for polygon creation (840). If the user in question does not hold permissions appropriate to the creation of polygons (840), an indication is made as to the user's permissions being insufficient (850). The process then concludes. Alternatively, if the user's permissions allow for polygon creation (840), polygon point information for the polygon is obtained (860). While definition of the polygon in question is not complete (870), the process iterates, obtaining further polygon information (860). Once polygon point information is obtained sufficient to allow for the complete definition of the polygon in question (860 and 870), the polygon information thus obtained is stored (880). This polygon information is now available for use in the creation of a new rectangle corresponding to the polygon in question (830). The process then concludes.

Figure 9:
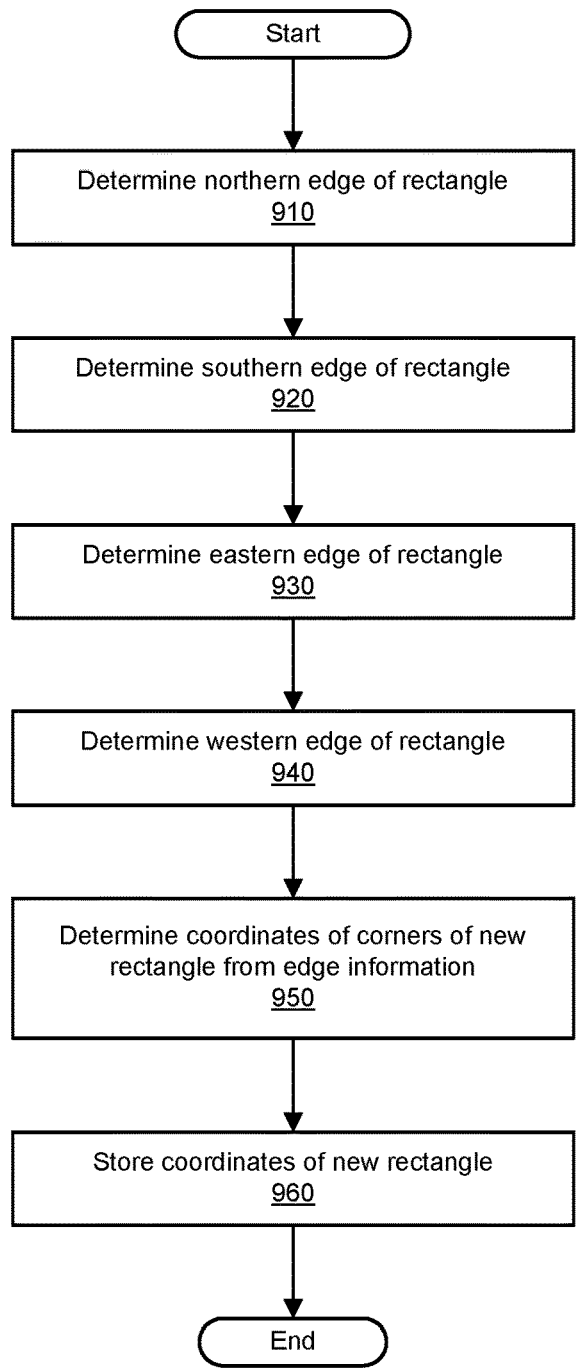
FIG. 9 is a flow diagram depicting an example of a process for the creation of rectangles, according to embodiments of methods and systems such as those disclosed herein.

FIG. 9 is a flow diagram depicting an example of a process for the creation of rectangles, according to embodiments of methods and systems such as those disclosed herein. To that end, FIG. 9 depicts a rectangle creation process 900, which serves to fit a rectangle to the polygon of interest. Such a rectangle can then be used to quickly and efficiently identify whether a given point should be considered for further analysis with respect to its intersection with the polygon corresponding to that rectangle. In so doing, the process of creating and using rectangles (or other such simple geometric shapes/spaces, such as a diamond, rhombus, or other simply-defined shape/spaces, whether by coordinates or formulaic/algebraic means (e.g., a sphere, ellipsoid, or the like)) significantly reduces the number of points to be considered in determining whether such points lie within a given (complex) polygon by allowing the fast and efficient comparison of such points' coordinates to such geometric shapes/spaces (e.g., a comparison of a point's coordinates to a rectangle's borders is much more efficient than doing so with a polygon's potentially-erratic outline). Clearly, a solution according to methods and systems such as those described herein addresses the potential for an exponential problem (e.g., of $O(n^2)$), reducing such problems to problems of manageable complexity (e.g., of $O(2n)$).

Rectangle creation process 900 begins with a determination as to the northern edge of the rectangle in question (910). As will be appreciated in light of the present disclosure, the directional terms used herein correspond to compass directions in a geographical sense. However, it will be appreciated that such directions are used only for convenience and ease of understanding, and that other terminology and frameworks can be used in this regard (e.g., such as vector coordinate systems and the like). In this vein, a determination as to the southern edge of the rectangle in question is then made (920). As will also be appreciated in view of the present disclosure, the order of such determinations need not follow the order in which such determinations are described herein. The eastern edge of the rectangle in question is then determined (930), followed by the determination of the western edge of the rectangle in question (940). Using the edges of the rectangle thus determined, a determination can be made as to coordinates of the corners of the new rectangle (950). These coordinates are then stored (960), and the process concludes.

As will be appreciated, and as noted earlier, other geometric shapes can be employed in a process such as rectangle creation process 900, and in so doing, altered to minimize overlap of the given geometric shape (e.g., in the case of triangles, alternating the direction in which the triangles point). Further, it will be appreciate that, given the proper location information (e.g., spatial coordinates based on physical and/or virtual location (e.g., a physical location of an individual participating in a virtual world)), as well as other parameters that can be treated as dimensions for purposes of meeting criteria indicating "positioning" within an n-dimensional space, methods and systems such as those disclosed herein can be used to quickly and efficiently determine the intersection of such position with an n-dimensional polytope by determining the need for such a determination using a corresponding n-dimensional geometric shape.

Figure 10:
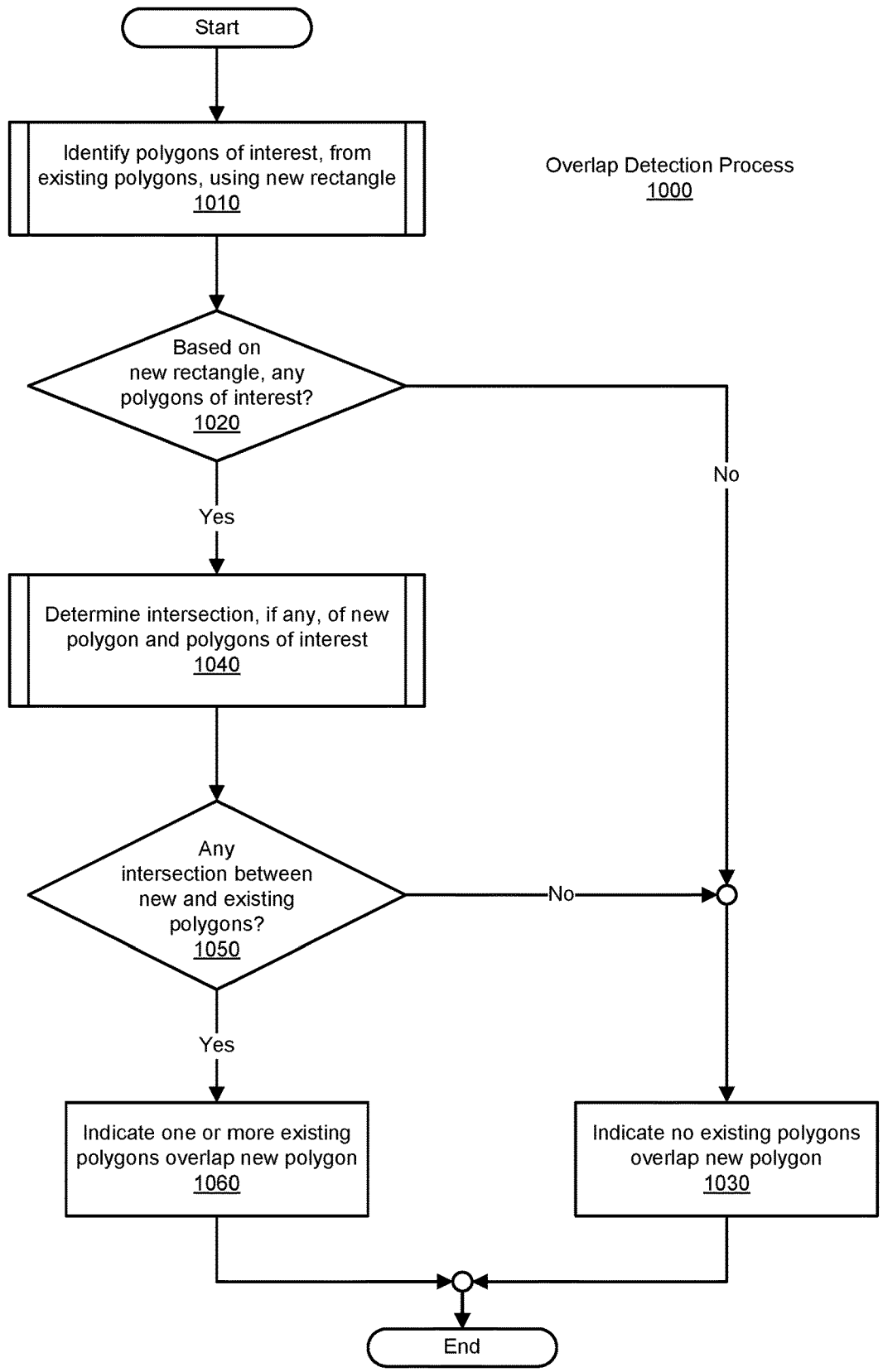
FIG. 10 is a flow diagram depicting an example of a process for determination of overlaps between rectangles and their corresponding polygon, according to embodiments of methods and systems such as those disclosed herein.

FIG. 10 is a flow diagram depicting an example of a process for determination of overlaps between rectangles and their corresponding polygon, according to embodiments of methods and systems such as those disclosed herein. To this end, FIG. 10 illustrates an overlap detection process 1000. Overlap detection process 1000 begins with the identification of polygons of interest from the polygons which presently exist, using the newly-generated rectangle (1010). The identification of polygons of interest from existing polygons is discussed in greater detail in connection with the process shown in FIG. 11. Based on the size and position of the new rectangle, a determination is made as to whether any polygons of interest exist (1020). Operations performed with regard to the determination of intersections between polygons is described in greater detail in connection with the process depicted in FIG. 12 and its associated description. If none of the existing polygons are of interest, based on the relationship of their corresponding rectangles with that of the new rectangle (1020), an indication is made to the effect that no existing polygons overlap the new polygon (1030), and the process concludes. Alternatively, if one or more polygons of interest exist (1020), a determination is made as to the intersection(s), if any, of the new polygon and the existing polygons of interest (1040).

A determination is then made as to whether any intersection(s) exist between the new and the existing polygons (1050). If no such intersections exist, an indication to this effect is made (1030). The process then concludes. Alternatively, if intersections between the new and the existing polygons exist (1050), such intersection is then indicated (1060), after which, the process then concludes. As will be appreciated in light of the present disclosure, searching for overlapping rectangles and/or overlapping polygons can be made more efficient (e.g., the search for such overlaps) by using a data structure that stores information regarding the rectangles and/or polygons by their respective coordinates and/or their respective edge values.

Figure 11:
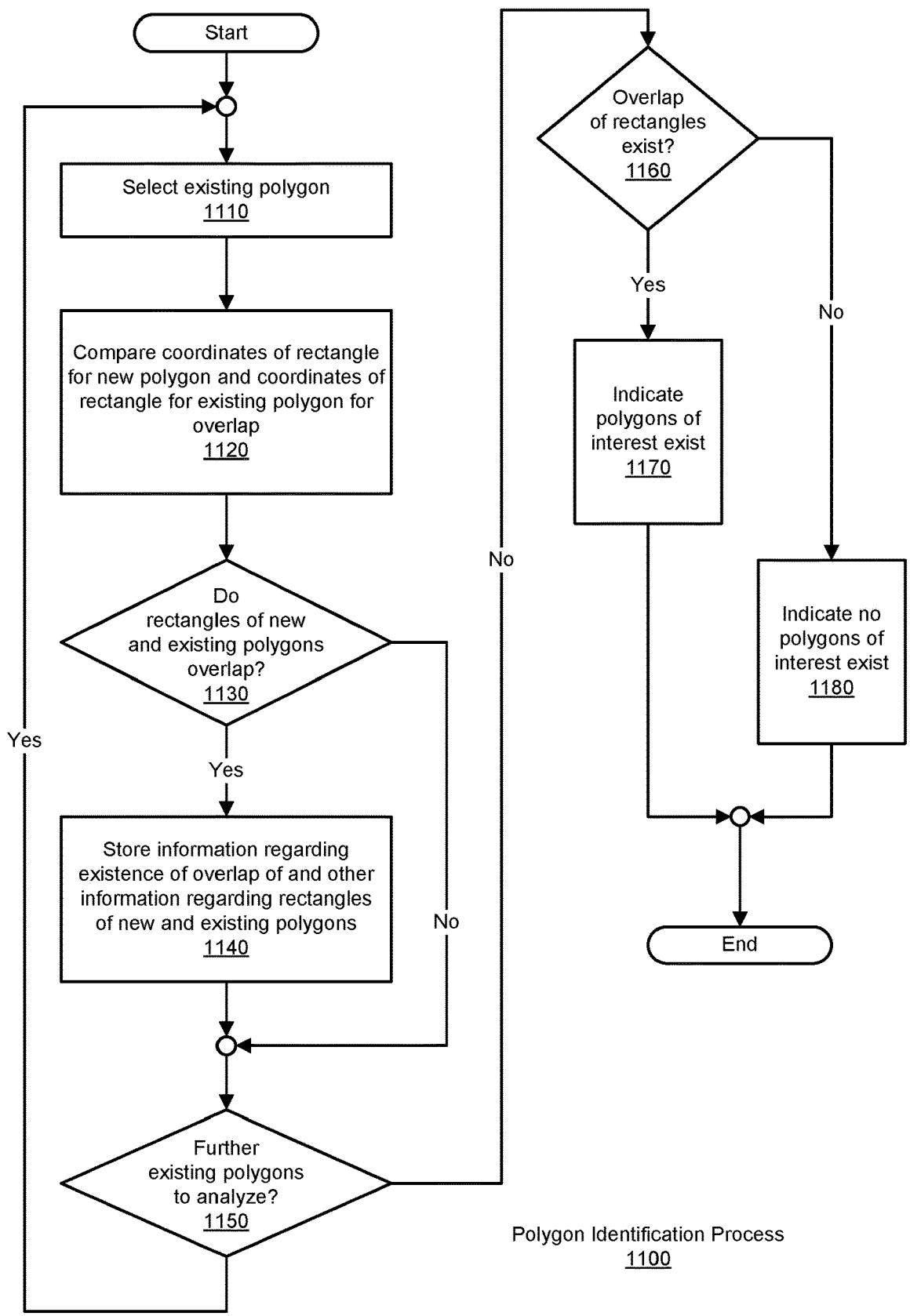
FIG. 11 is a flow diagram depicting an example of a process for the identification of polygons of interest, according to embodiments of methods and systems such as those disclosed herein.

FIG. 11 is a flow diagram depicting an example of a process for the identification of polygons of interest, according to embodiments of methods and systems such as those disclosed herein. To that end, FIG. 11 illustrates a polygon identification process 1100. Polygon identification process 1100 begins with the selection of an existing polygon from a group of one or more relevant polygons (1110). Next, the coordinates of the rectangle for the new polygon and those of the selected existing polygon are compared for overlap (1120). If the coordinates of the rectangles for the new and existing polygons overlap (1130), information regarding the existence of the overlap as well as information regarding the rectangles for the new and existing polygons, is stored (1140). Alternatively, if the rectangle for the new polygon and that of the selected existing polygon do not overlap, no such information is stored. In either event, the process proceeds to a determination as to whether further existing polygons remain to be analyzed (1150). If further existing polygons remain to be analyzed (1150), the next existing polygon is selected (1110) and the process iterates. Alternatively, if no further existing polygons remain to be analyzed (1150), a determination is made as to whether any overlapping rectangles were identified (1160). An appropriate indication is made as to this determination, and thus, whether polygons of interest exist (1170) or no polygons of interest exist (1180). The process then concludes.

Figure 12:
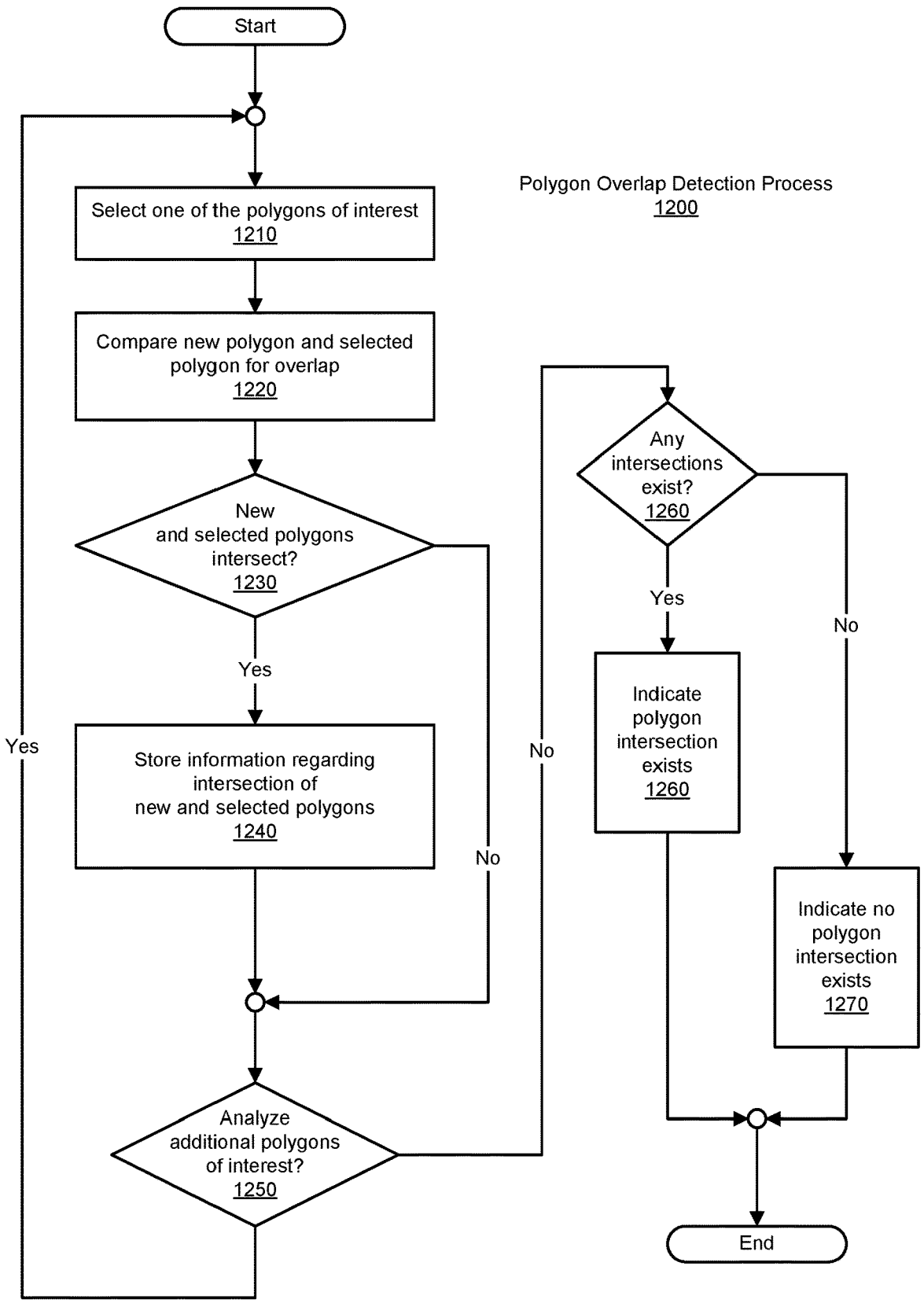
FIG. 12 is a flow diagram depicting an example of a process for the detection of polygon overlap, according to embodiments of methods and systems such as those disclosed herein.

FIG. 12 is a flow diagram depicting an example of a process for the detection of polygon overlap, according to embodiments of methods and systems such as those disclosed herein. To this end, FIG. 12 illustrates a polygon overlap detection process 1200. Polygon overlap detection process 1200 effectively compares the extents of new and existing polygon in order to determine whether or the areas defined thereby overlap one another. Polygon overlap detection process 1200 begins with the selection of one of the polygons of interest (1210). The new polygon and the selected polygon are then compared to determine whether the two polygons overlap one another (1220). If the new and selected polygons overlap one another (1230) (also referred to herein as intersection), information regarding the intersection of the new and selected polygons is stored (1240). Otherwise, no record need be made as between the new and selected polygons. In any event, a determination is made as to whether additional polygons of interest exist that need to be analyzed (1250). If additional polygons of interest exist, the process returns to selecting the next polygon of interest (1210), and performing the subsequent steps described above. Alternatively, if no further polygons of interest need to be analyzed (1250), a determination is made as to whether any intersections were identified (1260). If such intersections were found to exist, an indication to that effect is made (1270), and in the alternative, the lack of polygon intersection is indicated (1280). The process then concludes.

Figure 13:
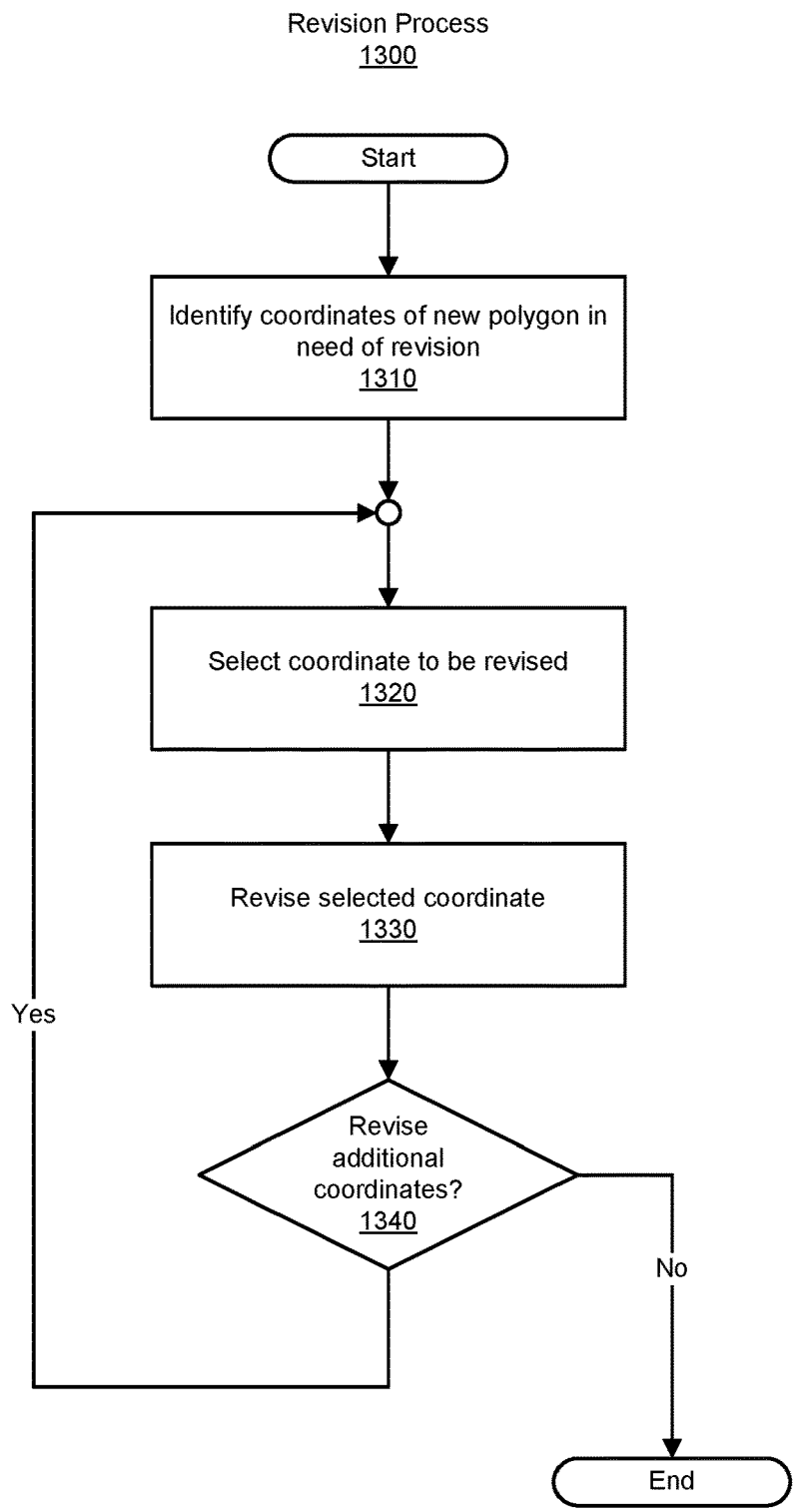
FIG. 13 is a flow diagram depicting an example of a process for the revision of polygon coordinates, according to embodiments of methods and systems such as those disclosed herein.

FIG. 13 is a flow diagram depicting an example of a process for the revision of polygon coordinates, according to embodiments of methods and systems such as those disclosed herein. To that end, FIG. 13 illustrates a revision process 1300. Revision process 1300 begins with the identification of coordinates of the new polygon, which is to be revised (1310). Next, one of the new polygon's coordinates is selected for revision (1320). The selected coordinate is then revised (1330). A determination is then made as to whether additional polygon coordinates of the new polygon need to be revised (1340). If additional coordinates are to be revised (1340), the process proceeds to selecting the next coordinate to be revised (1320) and revising that coordinate (1330). The process continues in this manner until no further coordinate remained to be revised. At this juncture, the process concludes.

Figure 14:
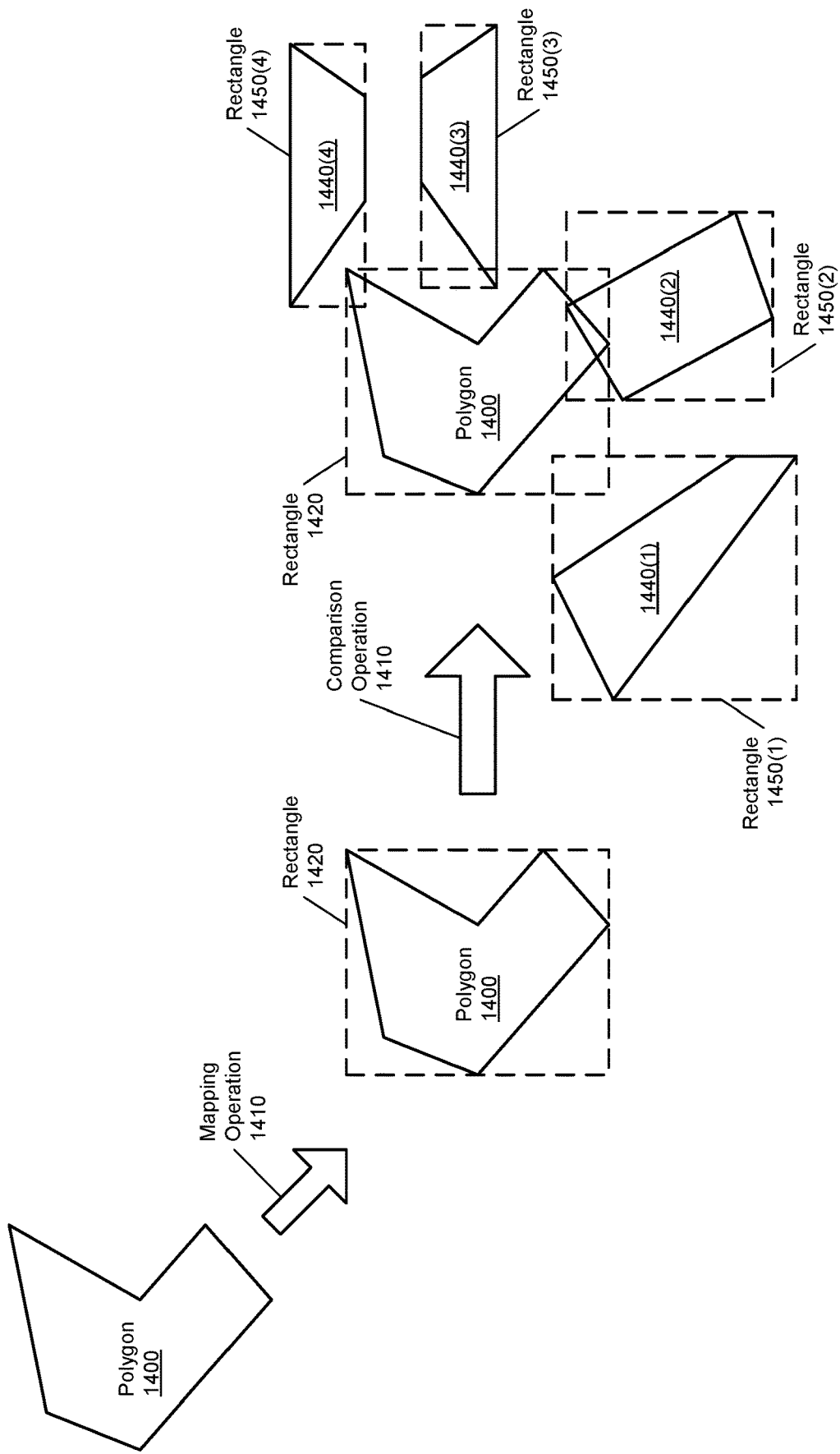
FIG. 14 is a block diagram depicting an example of a conceptual representation of the processes depicted in FIGS. 7-13, according to embodiments of methods and systems such as those disclosed herein.

FIG. 14 is a block diagram depicting an example of a conceptual representation of the processes depicted in FIGS. 7-13, according to embodiments of methods and systems such as those disclosed herein. A conceptual process such as that depicted in FIG. 14 begins with information regarding a polygon 1400, the polygon information for which can be stored, for example, in one or more digital content databases (e.g., such as digital content database 195 and/or 350). Once polygon information for polygons such as polygon 1400 have been saved into the relevant digital content databases, such polygon information can be accessed and retrieved by an application server (e.g., such as application server 260 of FIG. 2). Once the application sever retrieves the polygon information for polygon 1400, a mapping operation can be performed on the polygon information to identify a rectangle that corresponds to polygon 1400 (as is depicted in FIG. 14 as a mapping operation 1410). Such a mapping operation can be effected by calling a library module (e.g., one of library modules 445 of FIG. 4) in the manner of "map (rectangle)" or the like. By performing mapping operations 1410 (and advantageously, using the simplified set of coordinates representing the rectangle), a comparison of the polygon (polygon 1400) using the coordinates of the resulting rectangle (depicted in FIG. 14 as a rectangle 1420) can be performed against both existing polygons (by way of their corresponding rectangles) and social media events occurring in a given multi-dimensional space. Mapping operation 1410 thus represent the first phase of a map-reduce paradigm, which processes the large data sets resulting from the constant stream of social media events received by, for example, a social media aggregation system, by mapping complex spaces to simpler, more easily processed spaces. In so doing, the use of such a paradigm in architecting such systems permits the processing of such large data sets in a parallel, distributed manner, and in a fashion that lends itself to clustered and other multi-processing data analysis schemes.

Having identified a rectangle (or other geometric representation) corresponding to polygon 1400 (i.e., rectangle 1420), a comparison operation can also be performed against existing rectangles, the representation of which (e.g., by rectangle information corresponding to each polygon's polygon information), maintained in one or more of the digital content databases. Such a comparison operation is depicted in FIG. 14 as a comparison operation 1430. Thus, in the example depicted in FIG. 14, a number of existing polygons (depicted in FIG. 14 as existing polygons 1440 (1)-(4)), which have corresponding rectangles (depicted in FIG. 14 as rectangles 1450(1)-(4)). As a result of comparison operation 1430 (and as can be seen in FIG. 14), of the polygons stored in the digital content databases and their associated rectangles), existing polygons 1440(1)-(4) and their associated rectangles (rectangles 1450(1)-(4) are those which overlap polygon 1400 and/or its rectangle (rectangle 1420). As can also be seen in FIG. 14, such overlaps can occur in a variety of ways. For example, with respect to existing polygon 1440(1) and its associated rectangle (rectangle 1450(1)), only rectangle 1420 and rectangle 1450(1) overlap one another, while polygon 1400 and existing polygon 1450(1) overlap neither one another, nor their respective rectangles. By contrast, not only do rectangles 1420 and 1450(2) overlap one another, but polygon 1400 and an existing polygon 1440(2) overlap one another, as well. In between these two extremes, it can be seen in FIG. 14 that while polygon 1400 and existing polygon 1440(3) do not overlap one another, not only do rectangle 1420 and 1450(3) overlap one another, but existing polygon 1440(3) and rectangle 1420 overlap one another. Similarly, while polygon 1400 and existing polygon 1440(4) do not overlap one another, not only do rectangle 1420 and rectangle 1450(4) overlap one another, but in fact, rectangle 1450(4) and polygon 1400 overlap one another. In the processes described in connection with FIGS. 7-13, these various overlapping conditions (with respect to the rectangles in question) simply lead to further analysis as to whether the polygons in question overlap one another. In cases in which polygons do not overlap one another (e.g., polygon 1400 vis-á-vis existing polygons 1440(1), (3), and (4)), the possibility of a social media event occurring in more than one polygon does not arise. However, with respect to polygon 1400 vis-á-vis existing polygon 1440(2), an overlap exists, and appropriate measures should be taken. For example, such measures may result in revisions to polygon 1400, as certain examples discussed in connection with FIGS. 7-13. Alternatively, as noted earlier, overlapping polygons can be allowed to coexist, though additional processing is typically involved in determining the effects of a point of interest (e.g., a user's location) being located in the given overlapping region. Such coexistence can take the form of processing that takes into account such coexistence, the generation of special overlapping region polygons (in the case of the example depicted in FIG. 14, a polygon defined by the overlap between polygon 1400 and existing polygon 1440 (2), a polygon defined by polygon 1400 without the overlapping area, and polygon defined by existing polygon 1440(2) also less this overlapping area) and/or other such approaches. The second of these alternatives is described in connection with FIG. 15 and its description, below.

Figure 15:
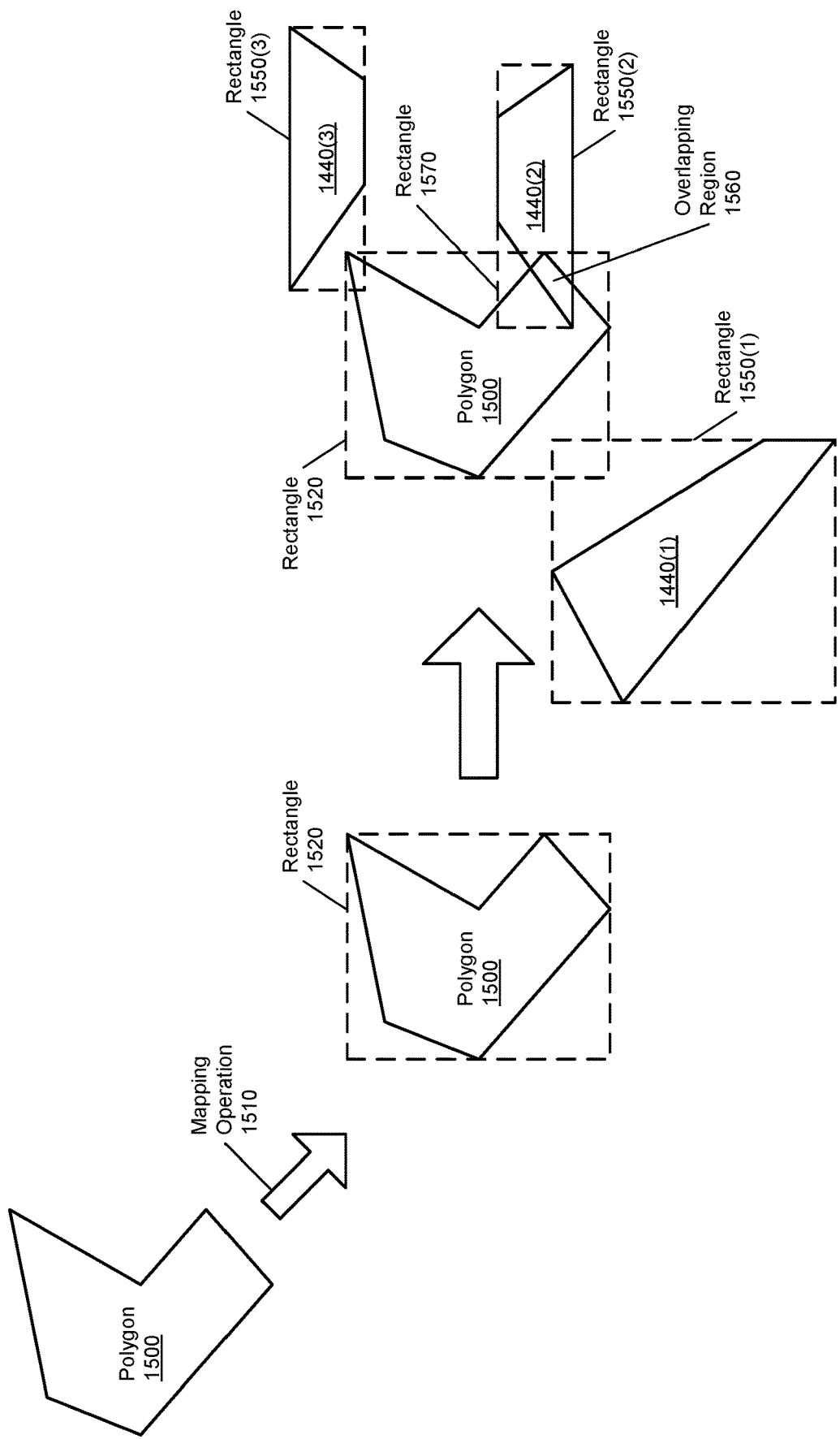
FIG. 15 is a block diagram depicting an example of a conceptual process for defining an overlap polygon, according to embodiments of methods and systems such as those disclosed herein.

FIG. 15 is a block diagram depicting an example of a conceptual process for defining an overlap polygon, according to embodiments of methods and systems such as those disclosed herein. In the manner of FIG. 14, FIG. 15 depicts a polygon 1500 that, via a mapping operation 1510, determines a rectangle corresponding thereto (depicted in FIG. 15 as a rectangle 1520). As before, a comparison operation 1530 is performed to compare rectangle 1520 (and potentially, polygon 1500) to existing polygon (and their corresponding rectangles) in the digital content databases. In the scenario depicted in FIG. 15, three existing polygons (depicted in FIG. 15 as existing polygons 1540(1)-(3) are identified by way of overlap between rectangle 1520 and their corresponding rectangles (depicted in FIG. 15 as rectangles 1550(1)-(3)). Of the alternatives described in connection with FIG. 14, three such situations are shown to exist in FIG. 15. Among these, those situations not presenting the need for any further action include the overlap between rectangle 1520 and rectangle 1550(1), and that between rectangle 1520 and rectangle 1550(3). These situations simply reflect the existence of an overlap between these rectangles, but no overlap between their corresponding polygon. However, an overlap between polygon 1500 and existing polygon 1540(2) can be seen in FIG. 15 (and is depicted in FIG. 15 as an overlapping region 1560). As noted earlier, such a situation can be dealt with in a number of ways. In the scenario depicted in FIG. 15, overlapping region 1560 is used to define its own polygon within the digital content databases. Thus, in such a situation, a new rectangle can be defined corresponding to overlapping region 1560 (and is depicted in FIG. 15 as a rectangle 1570). Polygon information and rectangle information resulting from the use of such an approach (and so defining the new outlines of polygon 1500, existing polygon 1540(2) and overlapping region 1560, as well as the rectangle information for their corresponding rectangles (rectangles 1520, 1550(2), and 1570) can be stored/updated in the digital content databases.

Figure 16:
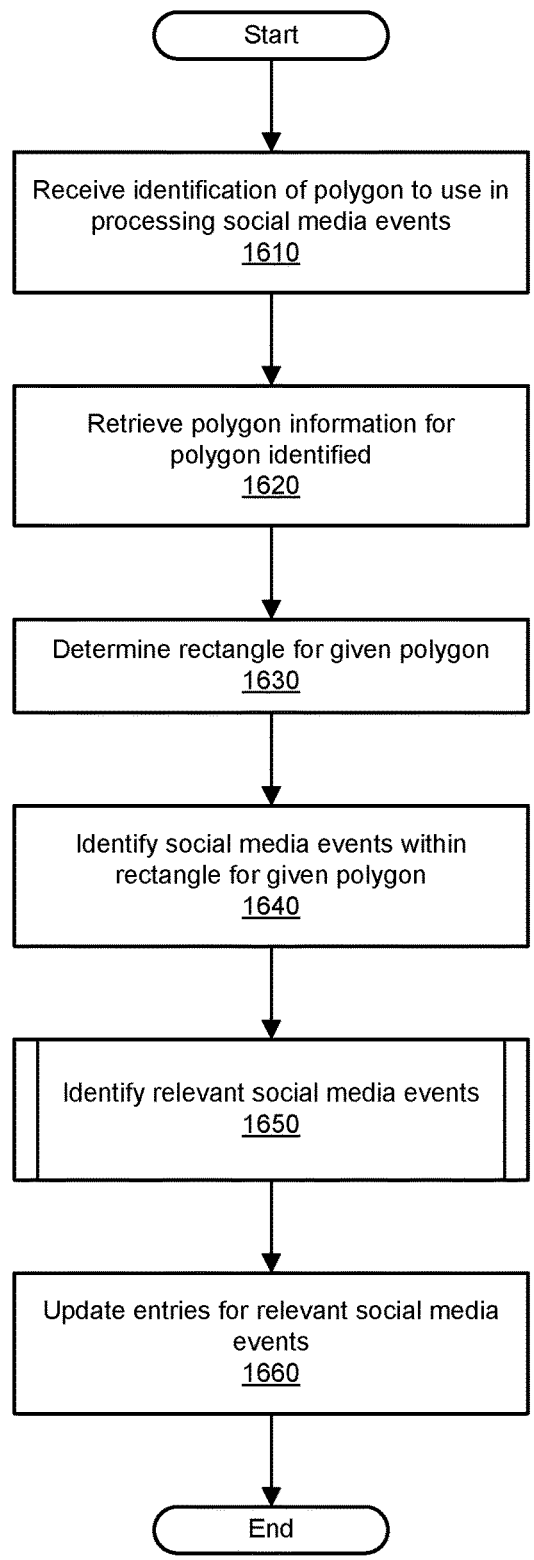
FIG. 16 is a flow diagram depicting an example of a process for the mapping of social events using the given geometric space (e.g., a geometric area), according to embodiments of methods and systems such as those disclosed herein.

FIG. 16 is a flow diagram depicting an example of a process for the mapping of social events using the given geometric space (e.g., a geometric area), according to embodiments of methods and systems such as those disclosed herein. To this end, FIG. 16 depicts a social event mapping process 1600. Social event mapping process 1600 begins with the receipt of polygon identification information, which identifies the polygon that is to be used in processing social media events (1610). Once the polygon of interest has been identified (1610), polygon information for the polygon thus identified is retrieved using the polygon identification information (1620). With the polygon and its associated polygon information now available (1610 and 1620), the rectangle for the given polygon can be determined (1630). Next, having determined the rectangle for the given polygon (1630), social media events occurring within the rectangle for the given polygons are identified (1640). In so doing, the social media events occurring within the given rectangle can be identified, thereby significantly reducing the number of social media events that need to be analyzed with respect to occurrence within the polygon of interest, making such processing more efficient and providing resulting information to users in a timely fashion (e.g., <1 second). Next, relevant social media events are identified (1650). Given that a relatively large number of social media events will exist in the digital content databases, the reduced number of social media events that need to be analyzed and identified as being relevant (i.e., having some relation to the polygon of interest) is greatly simplified. Having identified the social media events of interest (1650), entries for the relevant social media events are then updated (1660).

Social event mapping process 1600 thus retrieves polygon information for the polygon of interest (as well as information regarding the rectangle corresponding to the polygon of interest) from the digital content databases, and performs a mapping operation to determine which of the social media events also maintained in the digital content databases have occurred within the given rectangle, and so may be relevant to the given polygon. As will be appreciated in light of the present disclosure, the ability to identify the social media events of interest is made significantly more efficient by performing a comparison between the coordinates of a given social media event and the given rectangle (as opposed to attempting to make such a comparison with the given polygon for each such social media event). Such efficiency is also provided by the simplicity of the geometric area (as to what is potentially a complex set of coordinates for the given polygon). As noted above, once the social media events within a given rectangle have been identified, a reduced function is performed to winnow down the number of social media events which intersect the given polygon. Once identified, as noted above, the relevant databases of the digital content databases are updated to reflect the polygon(s) to which the social media event(s) correspond. In so doing, information regarding the social media event(s) can be quickly and efficiently recalled by the polygon(s) in which those social media events have occurred.

In general terms, then, once a polygon (or other polytope, as applicable) has been saved into the appropriate ones of the digital content databases, a mapping operation can be performed in order to identify social media events (e.g., posts) that occur within the rectangle that corresponds to the polygon in question (e.g., by calling one or more of the appropriate library modules (e.g., of library modules 445), for example, of the form "map (rectangle)"). In so doing, a comparison can be made between a large number of social media event coordinates (e.g., post location) using the simple set of coordinates representing the given rectangle, instead of its corresponding polygon, which can have a large and complex set of coordinates. Once the set of social media events (e.g., posts) within the given rectangle have been identified, a reduce function is performed to narrow down those posts to find which have "intersection" with the corresponding polygon (e.g., of the form "Reduce (Polygon, intersection)"). Information regarding the relevant posts in the digital content databases are then updated to reflect the polygons to which those posts correspond. This allows such social media events (and their associated social media event information) to be accessed quickly and efficiently, facilitating the quick and efficient recall of which social media events occurred within which polygons.

Figure 17:
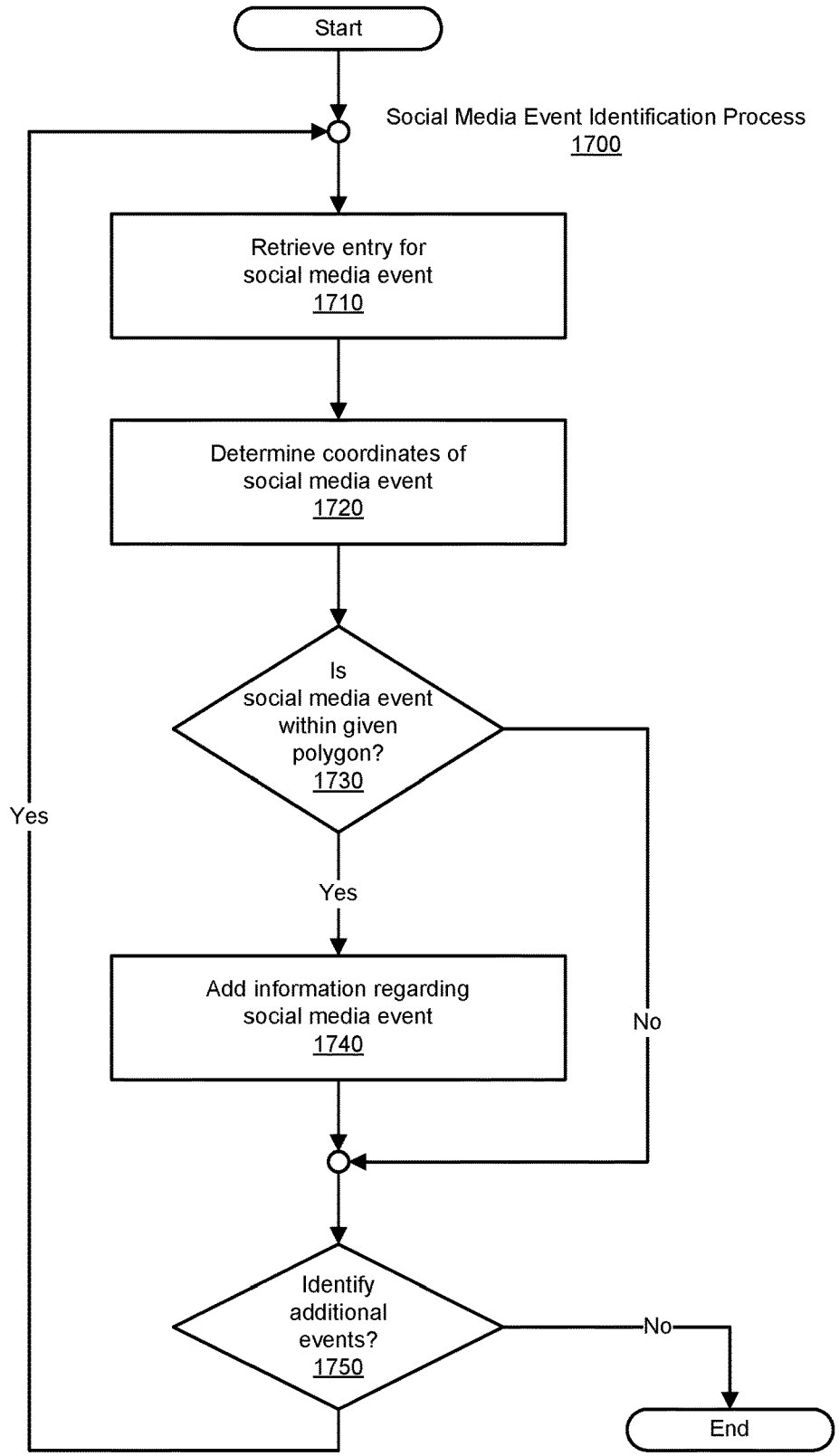
FIG. 17 is a flow diagram depicting an example of the process for identifying relevant social media events, according to embodiments of methods and systems such as those disclosed herein.

FIG. 17 is a flow diagram depicting an example of the process for identifying relevant social media events, according to embodiments of methods and systems such as those disclosed herein. To that end, FIG. 17 depicts a social media event identification process 1700. Social media event identification process 1700 (an example of a process for identifying relevant social media events such as that depicted in FIG. 16) begins with the retrieval of an entry for a social media event (1710). Next, information for the social media event in question having been retrieved (1710), a determination is made as to the coordinates of the social media event (1720). A determination is then made as to whether the social media event has taken place within the given polygon (1730). If the social media event has occurred within the given polygon (as reflected in its coordinates), an indication is made as to the addition of information regarding the social media event (1740). Otherwise, the social media event is ignored. A determination is then made as to whether additional social media events remain to be identified (1750). If additional social media events remain (1750), the process loops to the retrieval of an entry for social media event (1720), and the process repeats. Otherwise, the process concludes.

Figure 18:
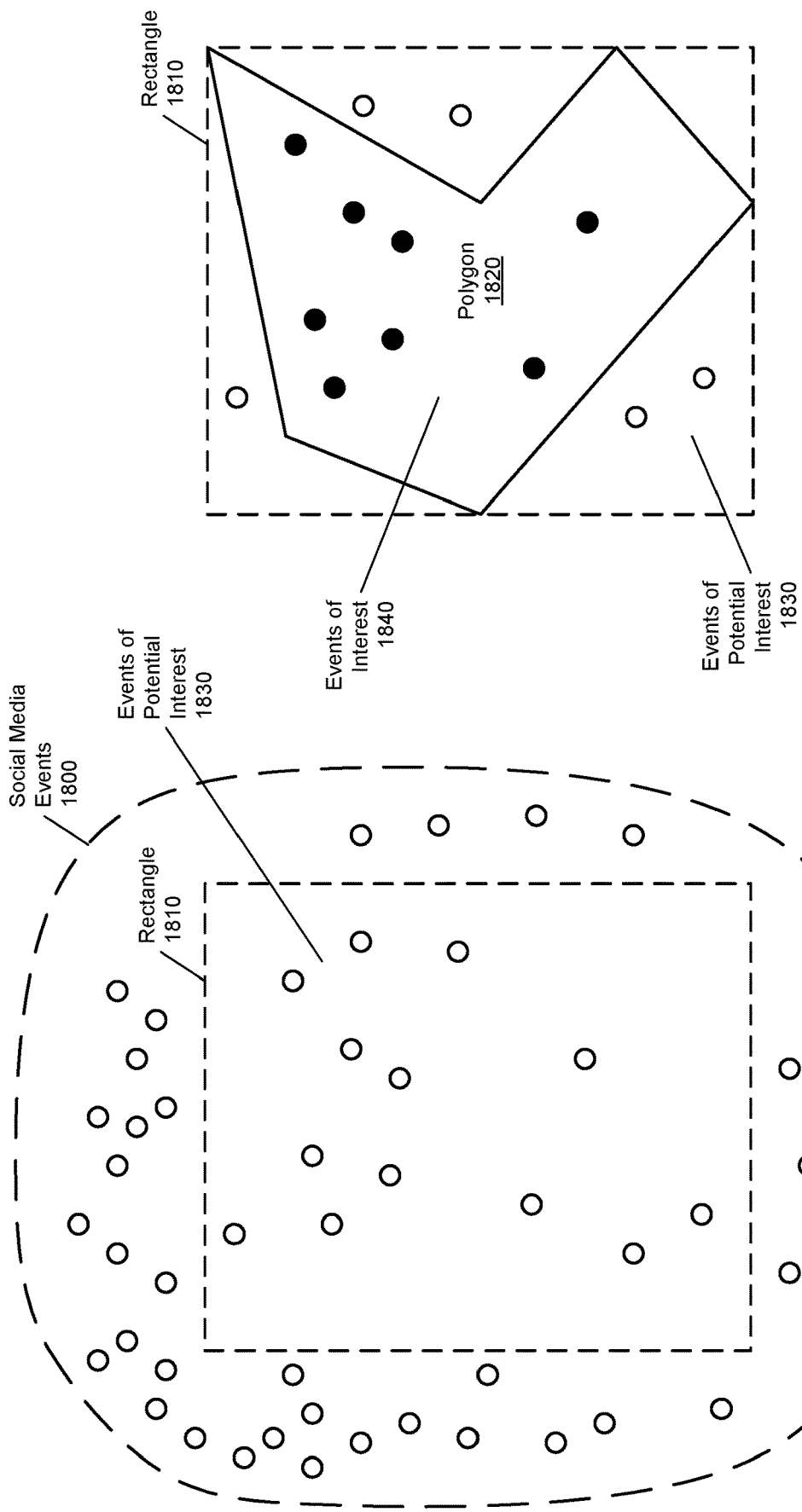
FIG. 18 is a simplified block diagram depicting an example of the social media event mapping and identification processes of FIGS. 16 and 17, according to embodiments of methods and systems such as those disclosed herein.

FIG. 18 is a simplified block diagram depicting an example of the social media event mapping and identification processes of FIGS. 16 and 17, according to embodiments of methods and systems such as those disclosed herein. Depicted in FIG. 18 are a number of social media events 1800 that include (in the aggregate) social media events both inside and outside of a rectangle 1810. Rectangle 1810 corresponds to a polygon 1820, as shown on the right side of FIG. 18. By using the processes described in connection with FIGS. 16 and 17, ones of social media events 1800 that may potentially be of interest can be quickly and efficiently identified (and appear in FIG. 18 as events of potential interest 1830). By using a social media event mapping process such as social media event mapping process 1600, events of potential interest 1830 can be quickly and efficiently distinguished from others of social media events 1800. In the next phase of analysis, as described in connection with FIG. 17, events of potential interest 1830 can then be identified as ones of events of interest 1840 (e.g., by way of comparing the coordinates of ones of events of potential interest 1830 with the coordinates representing polygon 1820).

Figure 19:
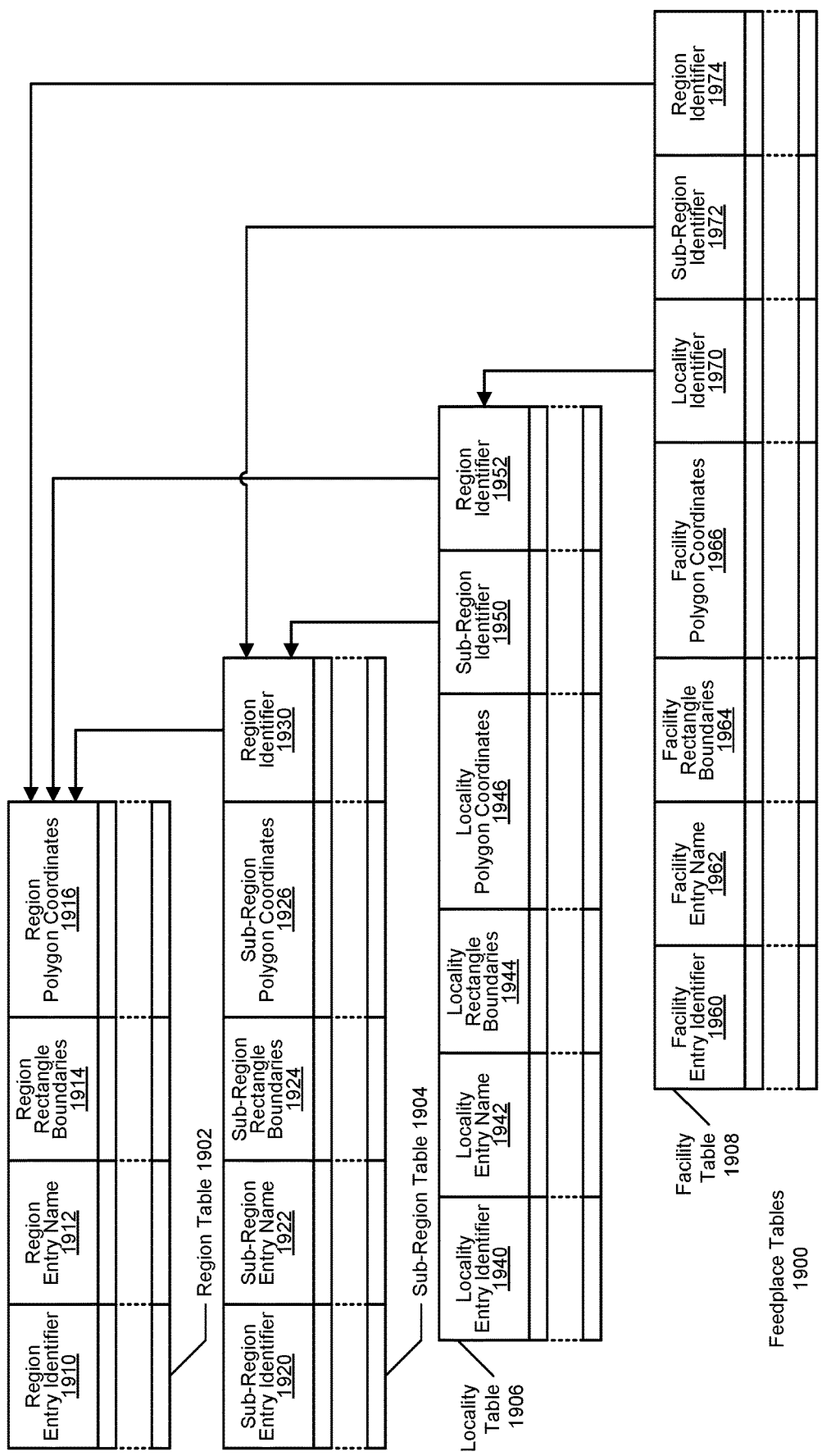
FIG. 19 is a simplified block diagram illustrating an example of a generic database structure that can be used in organizing polygons, according to embodiments of methods and systems such as those disclosed herein.
Figure 20:
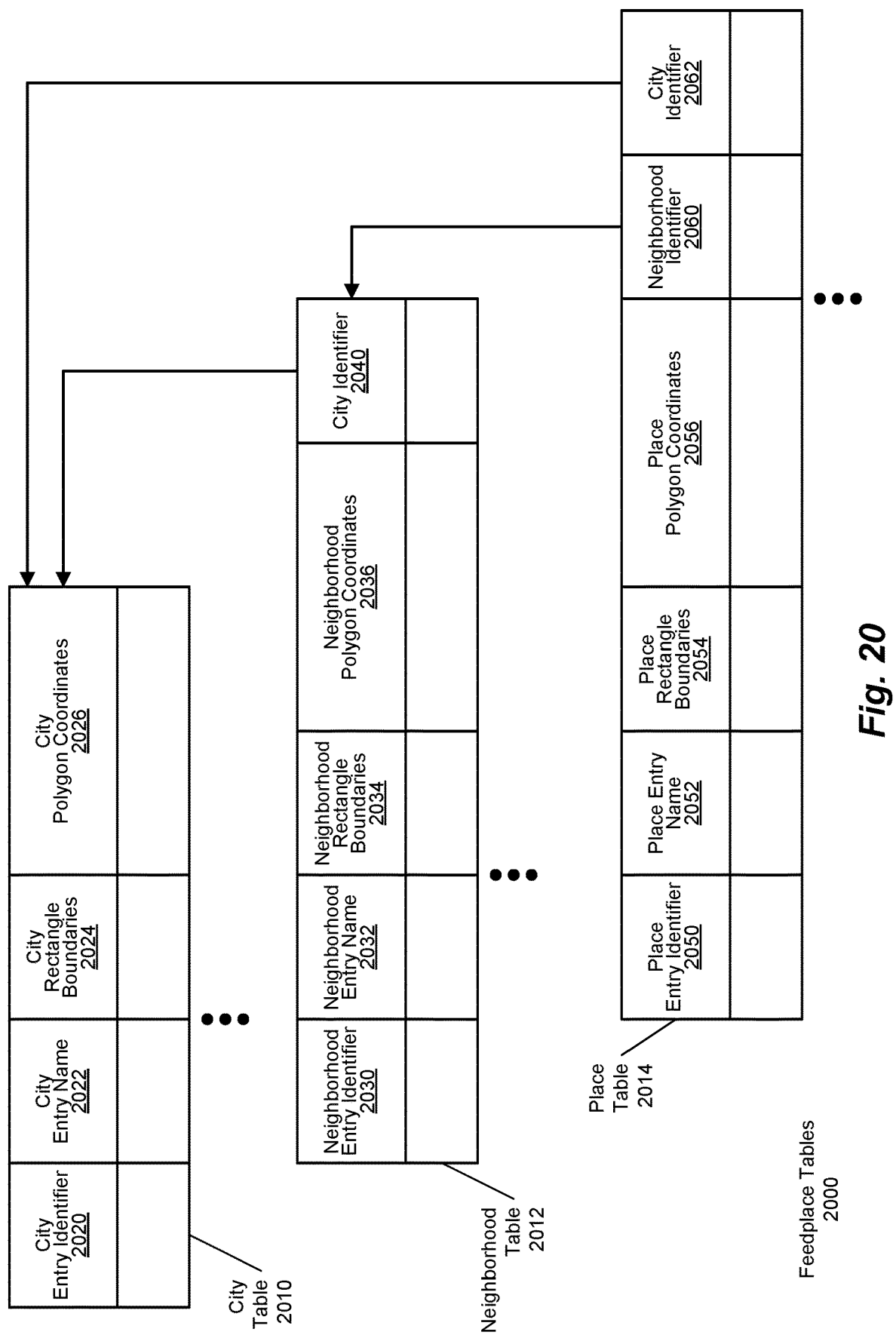
FIG. 20 is a simplified block diagram illustrating an example of a database structure that can be used in organizing polygons, according to embodiments of methods and systems such as those disclosed herein.
Figure 21:
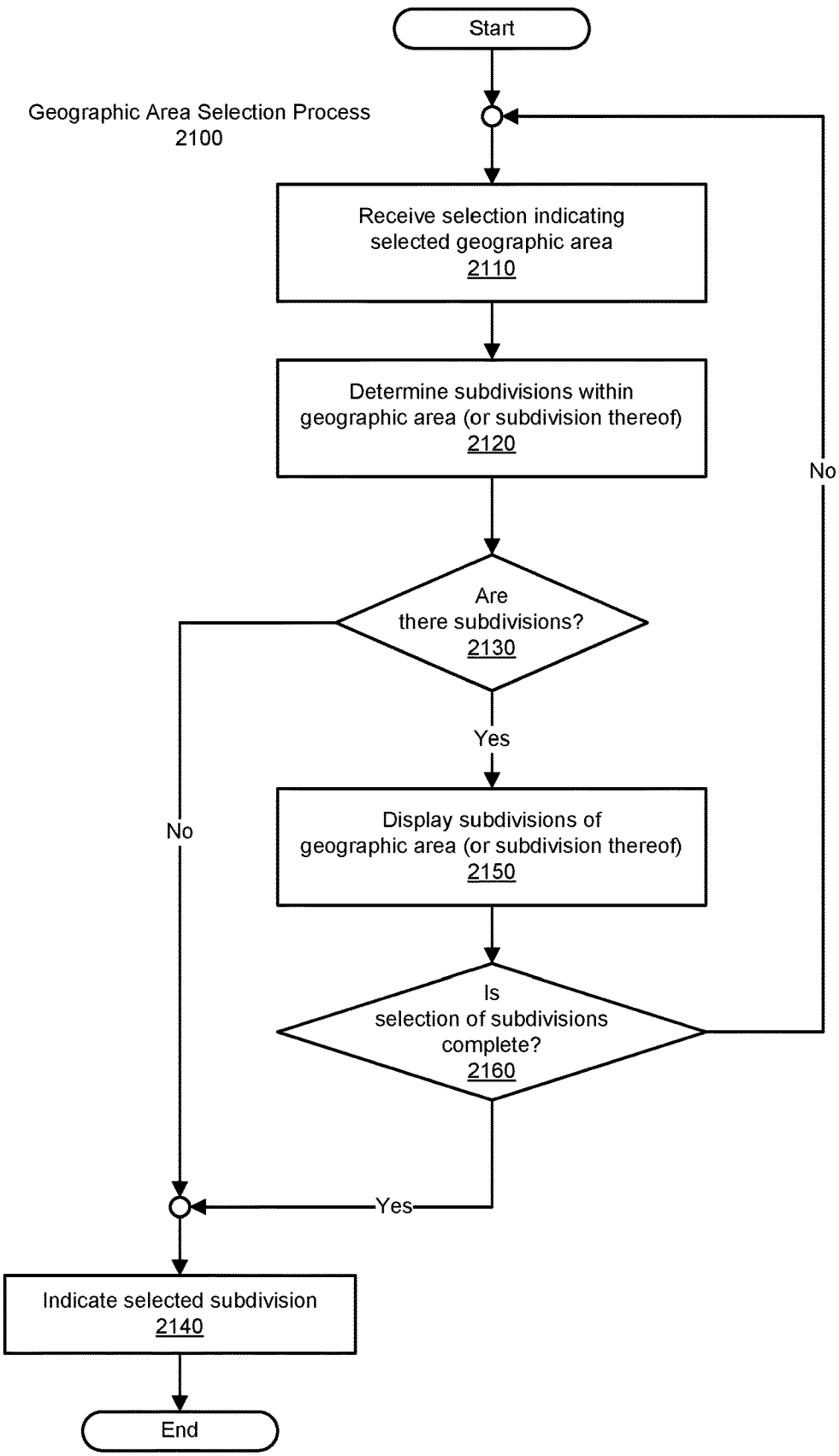
FIG. 21 is a flow diagram depicting an example of a geographic area selection process, according to embodiments of methods and systems such as those disclosed herein.

FIG. 19 is a simplified block diagram illustrating an example of a generic database structure that can be used in organizing polygons, according to embodiments of methods and systems such as those disclosed herein. To this end, FIG. 19 depicts a number of feedplace tables 1900. As will be appreciated in light of the present disclosure, feedplace tables 1900 are merely generically representative of tables of this type that might be used to represent geographic areas (and geographic areas within geographic areas, and so on), in various embodiments of methods and systems such as those disclosed herein. As will be appreciated in light of the present disclosure, such alternatives and varied configurations are intended to come within the scope of the present disclosure. Further, it will be appreciated that, as a result of the ability of methods and systems such as those disclosed herein to function in an arbitrarily large number of dimensions (as may be advantageous to the application at hand), the particular structure of a generic database structure feedplace tables 1900 can be designed to capture the structures and relationships of the polytopes that might exist in such multi-dimensional (i.e., n-dimensional) spaces. As discussed subsequently, the "meta-content identifier construct" concept described herein is directed to the concept of an identifier capable of representing (and to be used in identifying) a set of characteristics that, in turn, represent a "point" (or collection of points, such as the aforementioned polytope) in such a multi-dimensional space. For example, while the database structures presented in FIGS. 20 and 21 are described in terms of geographical (2-dimensional) areas, where one or smaller such areas are contained within a larger such areas, it will be appreciated that altitude could be added as a third dimension, such that the same geographic area (e.g., a facility such as a building) might have a number of sub-areas divided by altitude (e.g., different floors of the building). Moreover, different such altitudes might be divided differently (e.g., one floor might be split into two areas, while the floor above it might be treated as a single area). These and a wide variety of other alternatives are contemplated by the present disclosure, and are intended to be comprehended thereby. Further, such constructs provide for not only the efficient storage of such representations, but also provide for efficient processing by way of the structures thereof and the interconnection of such structures.

As depicted in FIG. 19, feedplace tables 1900 include a region table 1902, a sub-region table 1904, locality table 1906, and a facility table 1908. As will be appreciated in light of the present disclosure, while feedplace tables 1900 reflect four levels of geographic areas, methods and systems such as those disclosed herein are susceptible to the description by and use of fewer than and greater than numbers of such geographic levels, than those described in connection with FIGS. 19 and 20, and elsewhere herein, as noted.

Region table 1902 includes a number of fields including, for example, a region entry identifier 1910, a region entry name 1912, a region rectangle boundaries 1914, and region polygon coordinates 1916. Region entry identifier 1910 serves as an identifier of the region in question. Similarly, region entry name 1912 stores the name of the given region. In the manner noted earlier herein, region rectangle boundaries 1914 maintains information regarding the rectangle corresponding to the region's polygon. Information regarding the region's polygon is maintained, at least in part, in region polygon coordinates 1916.

In the manner noted, one or more sub-regions may exist within a given region. To this end, sub-region table 1904 includes, for example, a sub-region entry identifier 1920, a sub-region entry name 1922, and sub-region rectangle boundaries 1924, and sub-region polygon coordinates 1926. In the manner noted with regard to region table 1902, the various fields of sub-region table 1904 maintain information regarding an identifier for the sub-region (sub-region entry identifier 1920), the sub-region's entry name (sub-region entry name 1922), the rectangle boundaries for the given entry (sub-region rectangle boundary 1924), and polygon coordinates for the sub-region (sub-region polygon coordinates 1926). Sub-region table 1904 also includes, for example, a region identifier 1930. Region identifier 1930, as indicated by the reference from region identifier 1930 to region table 1902, indicates a relationship between the sub-region for which sub-region table 1904 maintains information to the region corresponding to region table 1902, and in so doing, indicates that the sub-region is within the region represented by region table 1902.

In similar fashion, locality table 1906 includes, for example, a locality entry identifier 1940, a locality entry name 1942, a locality rectangle boundaries 1944, and locality polygon coordinates 1946. In a manner similar to the reference within sub-region table 1904 (region identifier 1930), locality table 1906 also includes, for example, a sub-region identifier 1950 and a region identifier 1952. In this manner, sub-region identifier 1950 references sub-region table 1904 and region identifier 1952 references region table 1902. At the next level down in the hierarchy of feedplace tables 1900, facility table 1908 includes, for example, a facility entry identifier 1960, a facility entry name 1962, facility rectangle boundaries 1964, and facility polygon coordinates 1966. In a manner similar to the references in sub-region table 1904 and locality table 1906, facility table 1908 includes, for example, a locality identifier 1970, a sub-region identifier 1972, and a region identified 1974. As will be appreciated in light of the present disclosure, a hierarchy such as that depicted in FIG. 19 can be extended indefinitely, at least within the computing resources available in the given computing environment.

FIG. 20 is a simplified block diagram illustrating an example of a database structure that can be used in organizing polygons, according to embodiments of methods and systems such as those disclosed herein. To that end, FIG. 20 illustrates three feedplace tables, which are depicted as feedplace tables 2000. Feedplace tables 2000 include, for example, a city table 2010, a neighborhood table 2012, and a place table 2014. In the manner noted in connection with FIG. 19, feedplace tables 2000 include comparable fields. Thus, city table 2010 includes, for example, a city entry identifier 2020, an entry name 2022, city rectangle boundaries 2024, and city polygon coordinates 2026. Similarly, neighborhood table 2012 includes, for example, a neighborhood entry identifier 2030, a neighborhood entry name 2032, neighborhood rectangle boundaries 2034, and neighborhood polygon coordinates 2036. In the scenario depicted in FIG. 20 a city can include one or more neighborhoods, as defined in feedplace tables 2000. That being the case, neighborhood table 2012 also includes, for example, a city identifier 2040. In a manner similar to that described in connection with FIG. 19, city identifier 2040 references city table 2010, indicating that the neighborhood corresponding to neighborhood table 2012 is a neighborhood of the city corresponding to city table 2010. In turn, place table 2014 includes, for example, a place entry identifier 2050, a place entry name 2052, place rectangle boundaries 2054, and place polygon coordinates 2056. As with neighborhood table 2012, place table 2014 also includes, for example, a neighborhood identifier 2060 and a city identifier 2062. Neighborhood identifier2060 references neighborhood table 2012, while city identifier 2062 references city table 2010. These references indicated that the place corresponding to place table 2014 is within the neighborhood corresponding to neighborhood table 2012, and also within the city corresponding to city table 2010.

FIG. 21 is a flow diagram depicting an example of a geographic area selection process, according to embodiments of methods and systems such as those disclosed herein. To this end, FIG. 21 depicts a geographic area selection process 2100. Geographic area selection process 2100 being with the receipt of a selection indicating a selected geographic area (2110). Next, a determination is made as to whether subdivisions exist with a geographic area (2120). If no subdivisions exist within the geographic area (or subdivision thereof) (2130), an indication is made as to the subdivision thus selected (2140). Alternatively, if there exists with the geographic area (or subdivision thereof) (2130), subdivisions of the geographic area (of subdivision thereof) is displayed (2150). If selection of subdivisions is complete (2160), an indication is made as to the subdivisions thus selected (2140). Alternatively, if further input is to be received regarding selection of subdivisions (2160), the process returns to await receipt of the selection of a selected subdivision (2110). Once an indication is made as to the selected subdivision (2140), the process concludes.

Figure 22:
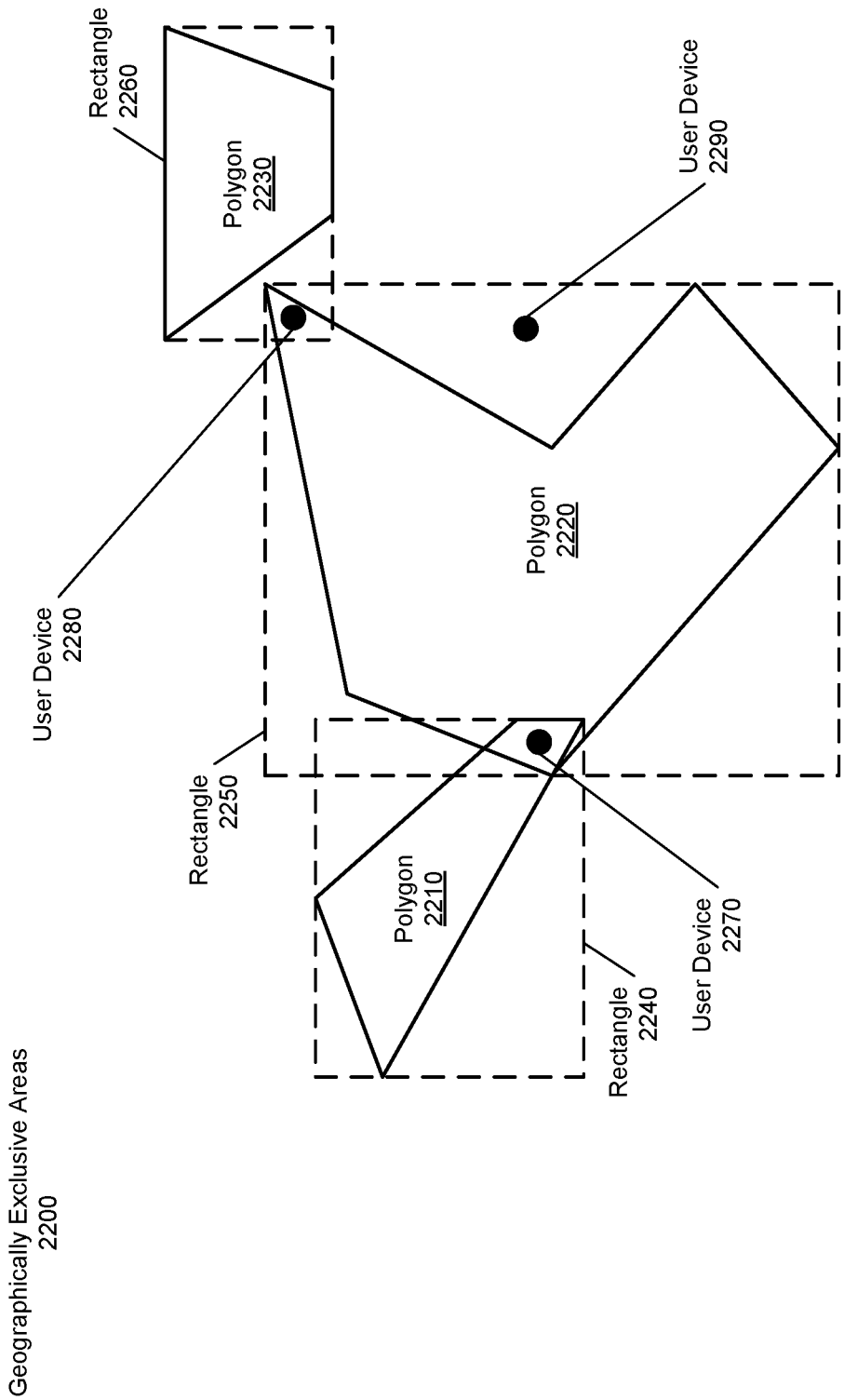
FIG. 22 is a simplified block diagram illustrating an example of conceptual features of geographically exclusive areas, according to embodiments of methods and systems such as those disclosed herein.

FIG. 22 is a simplified block diagram illustrating an example of conceptual features of geographically exclusive areas, according to embodiments of methods and systems such as those disclosed herein. To that end, FIG. 22 depicts a number of geographically exclusive areas (referred to in FIG. 22 as geographically exclusive areas 2200). Geographically exclusive areas 2200 include a polygon 2210, a polygon 2220, and a polygon 2230. Associated therewith are a number of rectangles, which appear in FIG. 22 as a rectangle 2240 (for polygon 2210), a rectangle 2250 (for polygon 2220), and rectangle 2260 (for polygon 2230). In the manner discussed previously, each of the polygons depicted in FIG. 22 has associated therewith a rectangle which allows the quick and efficient identification of social media events user there within. In the scenario depicted in FIG. 22, several users, each with their own user device, are active within one or more of the polygon and/or their corresponding rectangles. For example, a user may be located in polygons 2210 and 2220, an example of which is the user associated with a user device 2270. Alternatively, a user may be situated within a polygon (and so its rectangle), as well as within a rectangle of another polygon (but not within that polygon). Such is the case with respect with a user associated with user device 2280, which is situated within polygon 2220 (and so rectangle 2250), but only within rectangle 2260 (but one polygon 2230). Yet another alternative is the possibility of a user being situated only within the rectangle of a given polygon, but within no other such area. Such is the case with regard to the use of a user device 2290, which is situated within rectangle 2250 alone, but not within its associated polygon (polygon 2220). As will be apparent in light of the present disclosure, users of various user devices may be situated anywhere within rectangles 2240, 2250, and/or 2260, or none of them, at least potentially. By identifying the location of a given user device, embodiments of methods and systems such as those described herein are able to identify whether those user's devises should be allowed to receive certain digital content, as may be associated with one or more of the polygons in question (e.g., one or more of polygons 2210, 2220, and/or 2230). As will be appreciated in light of the present disclosure, such digital content can include a variety of digital information, such as social media information, digital coupons, digital tickets, access to streaming audio/video, digital audio-visual files, virtual currency, software, and/or all manner of virtual/digital items for use in the digital realm (e.g., streaming audio) and/or the physical realm (e.g., physical items received as prizes).

Figure 23:
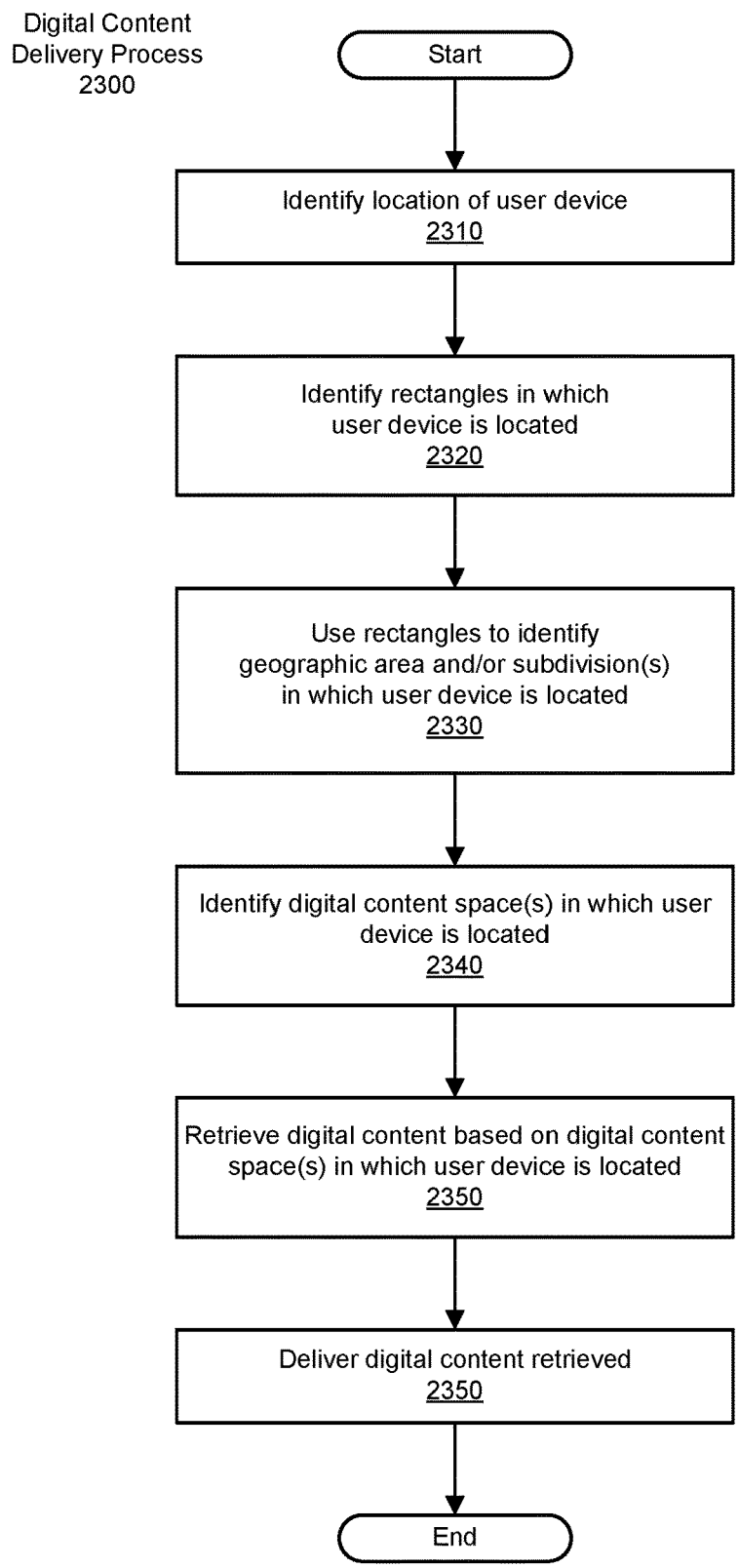
FIG. 23 is a flow diagram depicting an example of a process for the identification and delivery of digital content, according to methods and systems such as those disclosed herein.

FIG. 23 is a flow diagram depicting an example of a process for the identification and delivery of digital content, according to methods and systems such as those disclosed herein. To that end, FIG. 23 depicts a digital content delivery process 2300. Digital content delivery process 2300 begins with the identification of a user device's location (2310). Such location identification can be accomplished in a number of ways, including, for example, the use of global positioning satellite (GPS) technology, cellular location technology, wireless network location technology, and/or the like.

Next, the rectangle or rectangles in which the user device is located are identified (2320). Using the rectangle(s) thus identified, the geographic areas and/or subdivision(s) in which the user device is located are identified using the rectangles corresponding to the polygons representing such areas (2330). As noted earlier, the use of rectangles (or other geometric shapes) corresponding to the polygons of interest provides a quick and efficient mechanism for loosely determining which polygons may be considered when making such determinations. For example, in the scenario depicted in FIG. 22, user device 2280 need be considered only with respect to rectangle 2260 (and so polygon 2230) and rectangle 2250 (and so polygon 2220), and not with respect to rectangle 2240 (for polygon 2210). With respect to user device 2280, then, its location is analyzed with respect to polygon 2230 (with which the location of user device 2280 does not intersect), and polygon 2220 (with which the location of user device 2280 does intersect). In digital content delivery process 2300, a determination as to the location of a given user device within one or more rectangles leads to analysis with respect to the polygons which corresponds to those rectangles, as noted. As will be appreciated in light of the present disclosure, polygons such as polygons 2210, 2220, and 2230, can be used, at least in part, to represent corresponding digital content spaces. When determining the extent of such spaces, a multi-dimensional approach can be used, in which dimensions such as spatial coordinates, temporal attributes (e.g., time of day, time periods, and other such characteristics), social media information characteristics (e.g., hashtags, service identifiers, and other identifying constructs), are used to determine the location of the user device in such a multi-dimensional space.

That being the case, the digital content spaces in which the user device is located can be identified (2340). Once the appropriate digital content space(s) is (are) identified (2340), digital content based on the digital space(s) in which the user device is located can be retrieved (e.g., from one or more servers dedicated for this purpose) (2350). The requisite digital content having been retrieved (2350), such digital content can be then delivered to the user's user device (2360). The process then concludes.

Figure 24:
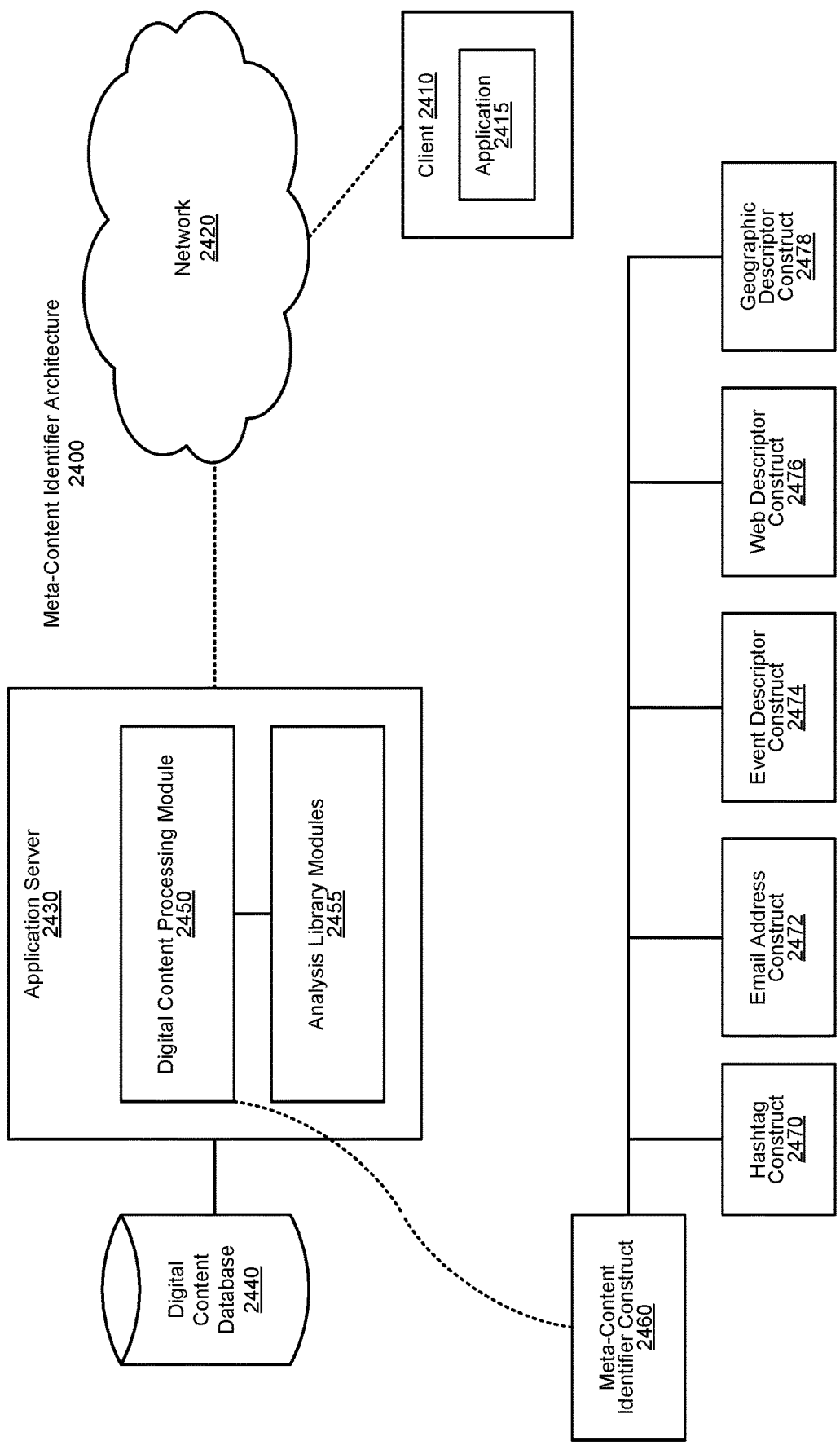
FIG. 24 is a block diagram depicting an example of a meta-content identifier architecture, according to methods and systems such as those described herein.

FIG. 24 is a block diagram depicting an example of a meta-content identifier architecture, according to methods and systems such as those described herein. To that end, FIG. 24 depicts a meta-content identifier architecture 2400. Meta-content identifier architecture 2400 includes a client 2410 (as depicted in FIG. 24 executing an application 2415), a network 2420, an application server 2430, and a digital content database 2440. Application server 2430, in turn, includes a digital content processing module 2450, which is supported by analysis library modules 2455. Digital content processing module 2450 and analysis library modules 2455 employ a meta-content identifier construct 2460 to identify social media information of interest. Meta-content identifier construct 2460 can take into account a number of conceptual dimensions in a multi-dimensional social media information space. Example of dimensions in such a multi-dimensional social media information space include social media information characteristics defined by digital content constructs such as hashtags, email addresses, information regarding an event, universal resource locators (URLs), and the like. Meta-content identifier construct 2460 can also take into account physical parameters such a geographic location and time. Examples of such information are depicted in FIG. 24 as a hashtag construct 2470, an email address construct 2472, an event descriptor construct 2474, a web descriptor construct 2476 and a geographic descriptor construct 2478. In providing such functionality, a meta-content identifier construct such as meta-content identifier construct 2460 maintains information identifying the various constructs identified thereby, and thus allows access to structures such as digital content databases 195, 350, and/or 450 (which, in turn, can include database tables such as digital content databases 500), feedplace tables such as feedplace tables 1900, and other such information useful in identifying and placing social media events of interest.

Figure 25:
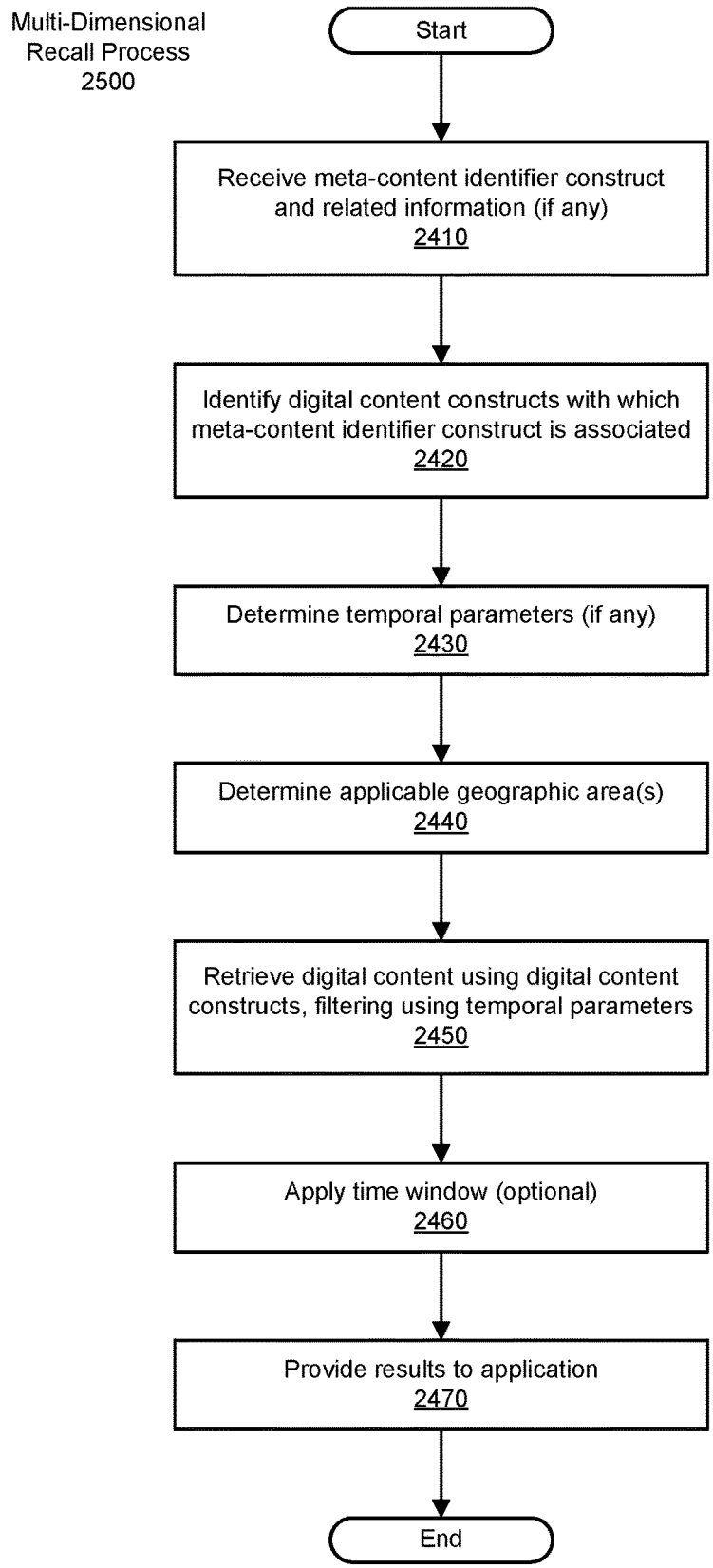
FIG. 25 is a flow diagram depicting an example of a multi-dimensional recall process, according to methods and systems such as those disclosed herein.

FIG. 25 is a flow diagram depicting an example of a multi-dimensional recall process, according to methods and systems such as those disclosed herein. To that end, FIG. 25 depicts a multi-dimensional recall process 2500. Multi-dimensional recall process 2500 begins with the receipt of a meta-content identifier construct and, if any, related information (2410). Next, the digital content constructs with which the meta-content identifier construct is associated are identified (2420). As noted with regard to FIG. 24, the digital content constructs with which the meta-content identifier construct are associated include, for example, digital content constructs such as hashtag construct 2470, email address construct 2472, event descriptor construct 2474, and web descriptor construct 2476. Next, temporal parameters, if any, are determined (2430). Such temporal parameters can include a specific time of day, a period of time, overlapping periods of time, recurring periods of time, and other such temporal parameters. Also determined are geographic constraints and/or geographic areas (e.g., such as those described earlier) (2440). Having determined the applicable digital content constructs, temporal parameters (if any), and applicable geographic areas, the requisite digital content is retrieved using the digital content constructs and geographic areas, and (potentially) filtering using the aforementioned temporal parameters (2450). Further, one or more time windows can be applied to the results of the digital content retrieval, and so further limits the availability of such digital content, optionally (2460). The appropriate digital content having been thus identified and processed, such results are provided to the application executed by the user device (2470).

Figure 26:
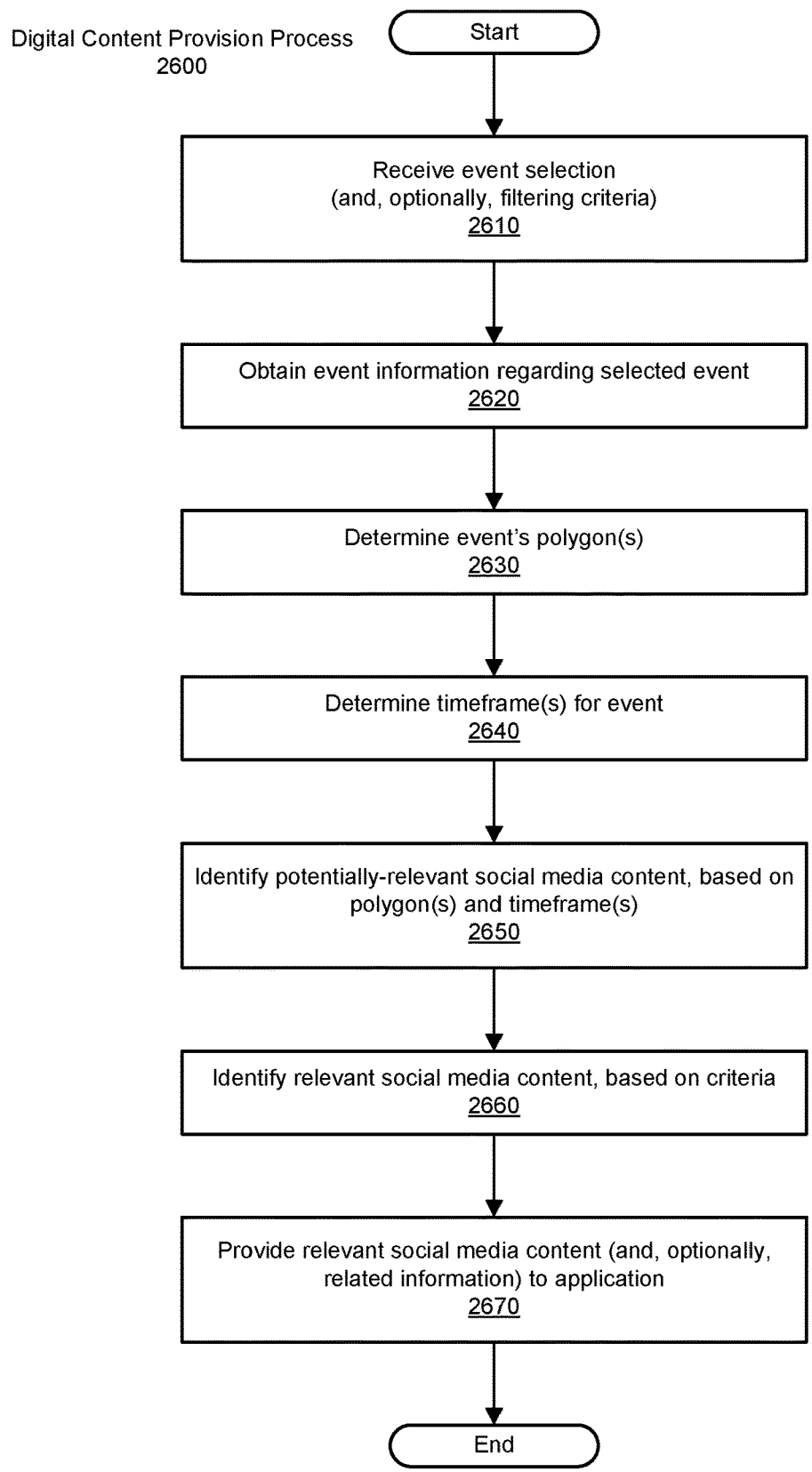
FIG. 26 is a flow diagram depicting an example of a process for the provision of digital content using an event-based approach, according to methods and systems such as those disclosed herein.

FIG. 26 is a flow diagram depicting an example of a process for the provision of digital content using an event-based approach, according to methods and systems such as those disclosed herein. To that end, FIG. 26 depicts a digital content provisional process 2600. Digital content process 2600 begins with the receipt of an event selection (and, optionally, filtering criteria) from an application such as application 2415 (2610). The selected event having been thus identified, event information regarding the selected event is obtained (2620). Using the event information (2620), the event's polygon(s) is determined (2630). Also determined is the timeframe for the event (2640). For example, a given event may be held in a given geographic location for only a predefined duration (e.g., a music concert may be scheduled at a given facility between certain hours on a given date). By determining the timeframe in question for the event, digital content thus provided can be tailored for delivery only during that period of time and/or for certain periods of time before and after such an event. Next, potentially relevant social media content is identified, based, for example, on the event's polygon and timeframe (2650). Further, relevant social media content can be identified based on one or more criteria (e.g., such as the multi-dimensional analysis described previously) (2660). Once the relevant social media content (and, optionally, any related information) has been identified, the relevant social media content (and its related information) is provided to the application (2670). The process then concludes.

Figure 27:
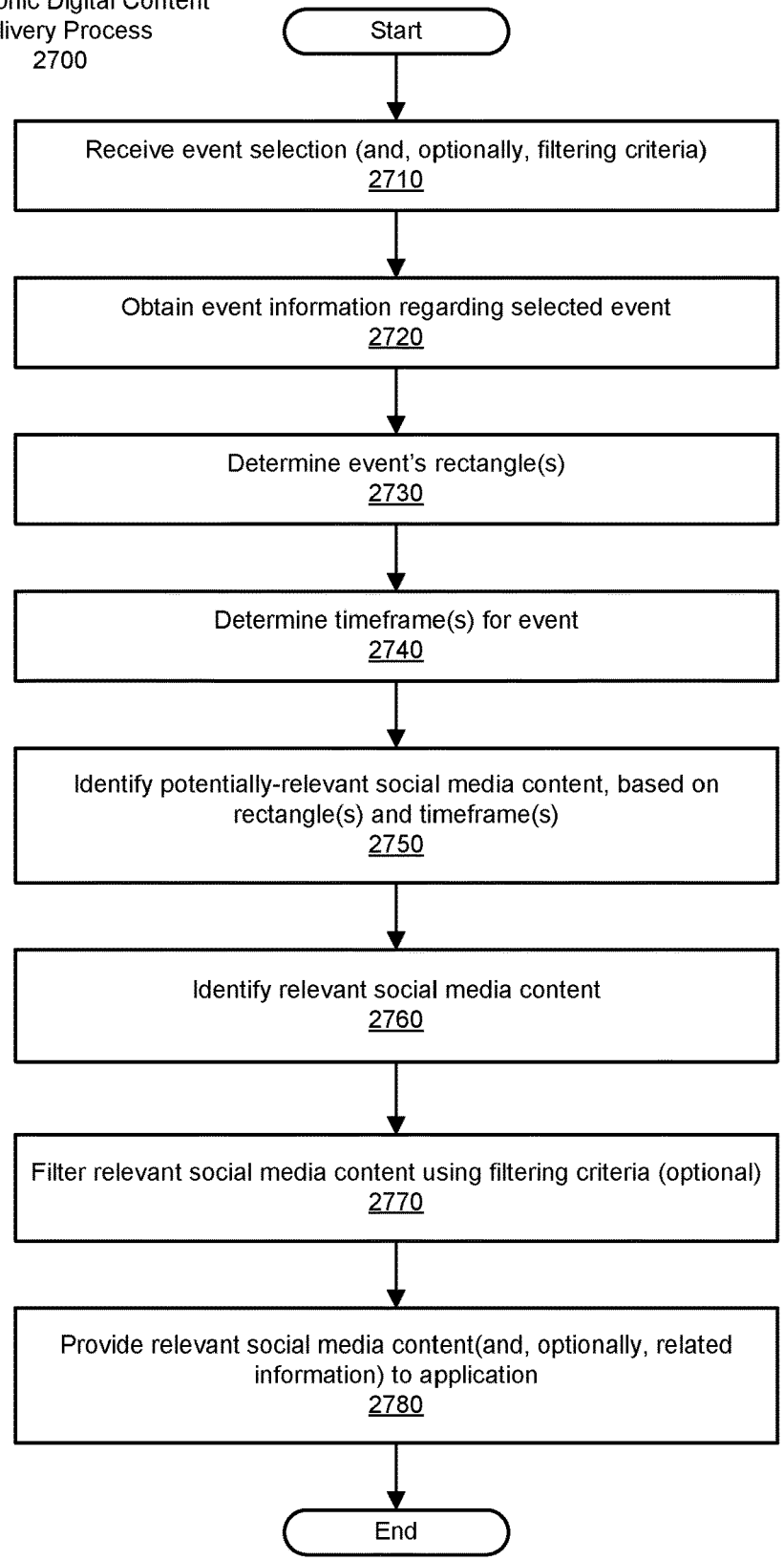
FIG. 27 is a flow diagram of an example of a process for the delivery of digital content, according to methods and systems such as those described herein.

FIG. 27 is a flow diagram of an example of a process for the delivery of digital content, according to methods and systems such as those described herein. That being the case, FIG. 27 depicts a geographic digital content delivery process 2700. Geographic digital content delivery process 2700 begins with the receipt of a selection that identifies a selected event (and, optionally, filtering criteria) (2710). Next, event information regarding the selected event is obtained (2720). Using the event information thus obtained (2720), the event's rectangle is determined (2730). Also determined is the timeframe (or timeframes) during which the event is to occur (and, potentially, periods of time before and after the event) (2740). Based on the rectangle and time frame thus identified (2730 and 2740), potentially relevant social media content is identified (2750). Once the potentially relevant social media content has been thus identified (2750), relevant social media content is identified by reducing the potentially relevant social media content through a determination as to the intersection of such social media content with the event(s) polygon (2760). At this juncture, the social media content that is deemed relevant can be winnowed down further using filtering criteria provided with the event selection (2770). As before, the filtering of social media content based on such filtering criteria is optional. The relevant social media content (and, optionally, any related information) is then provided to the application (2780). The process then concludes.

An Example Computing and Network Environment

As shown above, the systems described herein can be implemented using a variety of computer systems and networks. Examples of such computing and network environments are described below with reference to FIGS. 28 and 29.

Figure 28:
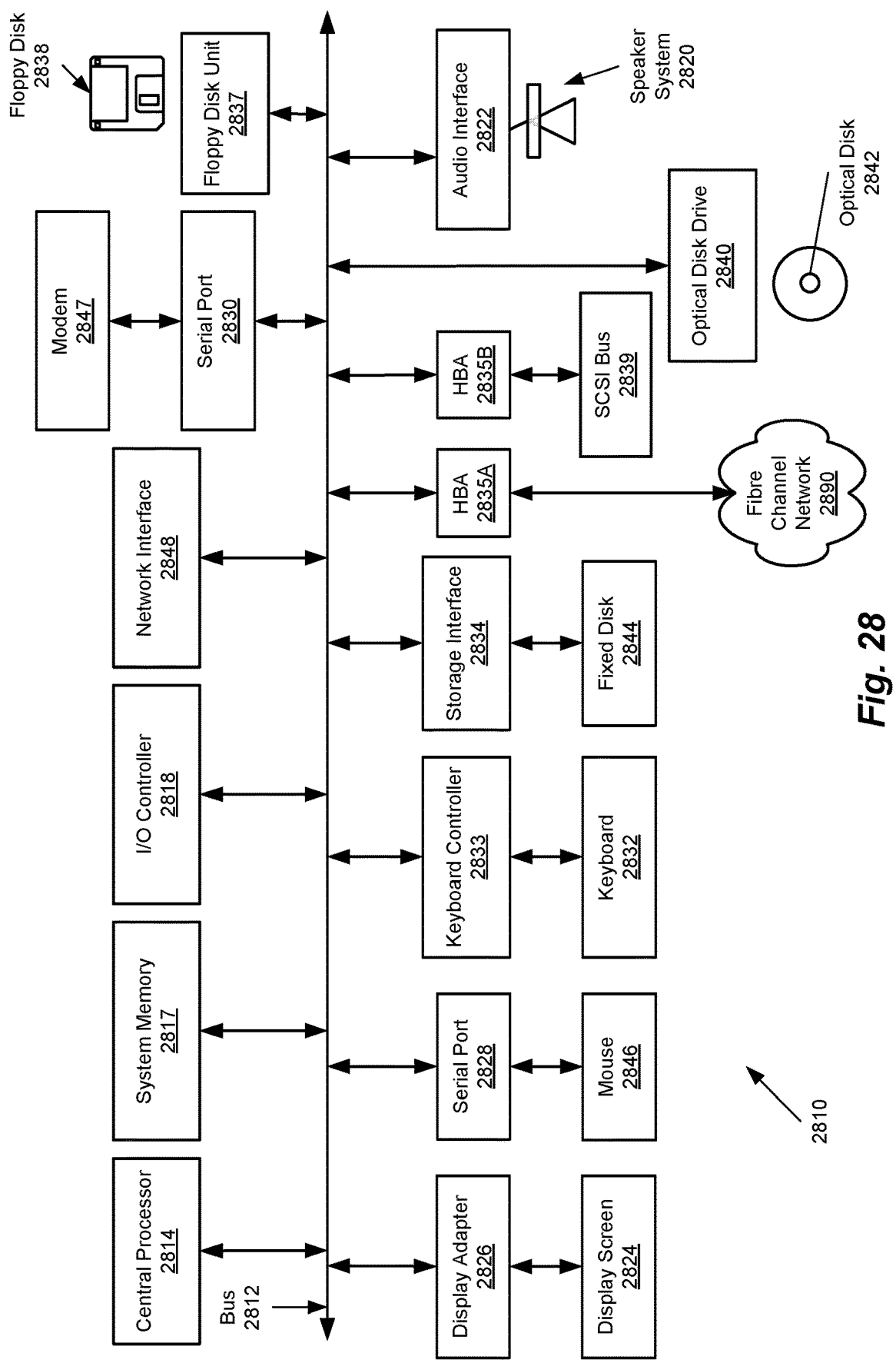
FIG. 28 is a block diagram depicting a computer system suitable for implementing aspects of systems according to embodiments of systems such as those disclosed herein.

FIG. 28 depicts a block diagram of a computer system 2810 suitable for implementing aspects of the systems described herein, and the like. Computer system 2810 includes a bus 2812 which interconnects major subsystems of computer system 2810, such as a central processor 2814, a system memory 2817 (typically RAM, but which may also include ROM, flash RAM, or the like), an input/output controller 2818, an external audio device, such as a speaker system 2820 via an audio output interface 2822, an external device, such as a display screen 2824 via display adapter 2826, serial ports 2828 and 2830, a keyboard 2832 (interfaced with a keyboard controller 2833), a storage interface 2834, a floppy disk drive 2837 operative to receive a floppy disk 2838, a host bus adapter (HBA) interface card 2835A operative to connect with a Fibre Channel network 2890, a host bus adapter (HBA) interface card 2835B operative to connect to a SCSI bus 2839, and an optical disk drive 2840 operative to receive an optical disk 2842. Also included are a mouse 2846 (or other point-and-click device, coupled to bus 2812 via serial port 2828), a modem 2847 (coupled to bus 2812 via serial port 2830), and a network interface 2848 (coupled directly to bus 2812).

Bus 2812 allows data communication between central processor 2814 and system memory 2817, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 2810 are generally stored on and accessed from a computer-readable storage medium, such as a hard disk drive (e.g., fixed disk 2844), an optical drive (e.g., optical drive 2840), a floppy disk unit 2837, or other computer-readable storage medium.

Storage interface 2834, as with the other storage interfaces of computer system 2810, can connect to a standard computer-readable medium for storage and/or retrieval of information, such as a fixed disk drive 2844. Fixed disk drive 2844 may be a part of computer system 2810 or may be separate and accessed through other interface systems. Modem 2847 may provide a direct connection to a remote server via a telephone link or to the Internet via an internet service provider (ISP). Network interface 2848 may provide a direct connection to a remote server via a direct network link to the Internet via a POP (point of presence). Network interface 2848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 28 need not be present to practice the systems described herein. The devices and subsystems can be interconnected in different ways from that shown in FIG. 28. The operation of a computer system such as that shown in FIG. 28 is readily known in the art and is not discussed in detail in this application. Code to implement the modules of the systems described herein can be stored in computer-readable storage media such as one or more of system memory 2817, fixed disk 2844, optical disk 2842, or floppy disk 2838. The operating system provided on computer system 2810 may be MS-WINDOWS®, UNIX®, Linux®, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Further, and as will be appreciated in light of the present disclosure, each of the operations described herein may be executed by a module (e.g., a software module) or a portion of a module, or a computer system user. Thus, the above-described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module.

The software modules described herein may be received by a computer system, for example, from computer-readable storage media. Such computer readable storage media may be permanently, removably or remotely coupled to the computer system. Computer-readable storage media may non-exclusively include, for example, any number of the following: magnetic storage media (including disk and tape storage media); optical storage media such as compact disk media (e.g., CD ROM, CD R, etc.) and digital video disk storage media; nonvolatile memory storage memory including semiconductor-based memory units such as FLASH memory, EEPROM, EPROM, ROM or application specific integrated circuits; and volatile storage media (including registers, buffers or caches, main memory, RAM, etc.). In a UNIX-based embodiment, the software modules may be embodied in a file, which may be a device, a terminal, a local or remote file, a socket, or other such element. Other new and various types of computer-readable storage media may also be used to store the software modules discussed herein.

Many other devices or subsystems (not shown) may be connected in a similar manner (e.g., bar code readers, document scanners, digital cameras and so on). Conversely, it is not necessary for all of the devices shown in FIG. 28 to be present to practice the present invention. The devices and subsystems may be interconnected in different ways from that shown in FIG. 28. The operation of a computer system such as that shown in FIG. 28 is readily known in the art and is not discussed in detail in this application. Code to implement the present invention may be stored in computer-readable storage media such as one or more of system memory 2816, fixed disk 2844, CD-ROM 2842, or floppy disk 2838. Additionally, computer system 2810 may be any kind of computing device, and so includes personal data assistants (PDAs), network appliance, X-window terminal or other such computing device. The operating system provided on computer system 2810 may be MS-DOS®, MS-WINDOWS®, UNIX®, Linux® or other known operating system. Computer system 2810 also supports a number of Internet access tools, including, for example, an HTTP-compliant web browser having a JavaScript interpreter, such as Netscape Navigator®, Microsoft Internet Explorer® and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 29:
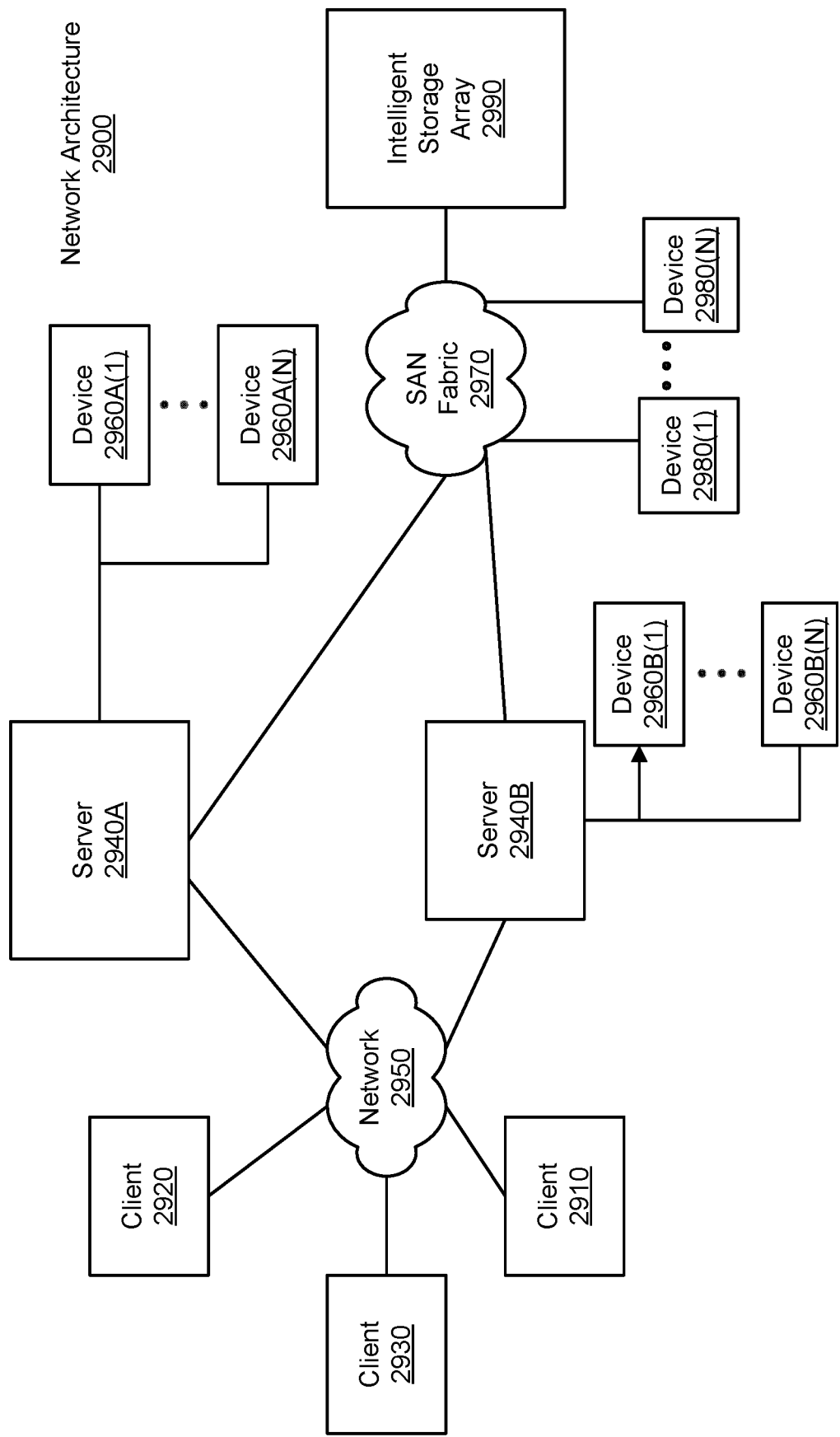
FIG. 29 is a block diagram depicting a network architecture suitable for implementing aspects of systems according to embodiments of systems such as those disclosed herein.

FIG. 29 is a block diagram depicting a network architecture 2900 in which client systems 2910, 2920 and 2930, as well as storage servers 2940A and 2940B (any of which can be implemented using computer system 2910), are coupled to a network 2950. Storage server 2940A is further depicted as having storage devices 2960A(1)-(N) directly attached, and storage server 2940B is depicted with storage devices 2960B(1)-(N) directly attached. Storage servers 2940A and 2940B are also connected to a SAN fabric 2970, although connection to a storage area network is not required for operation. SAN fabric 2970 supports access to storage devices 2980(1)-(N) by storage servers 2940A and 2940B, and so by client systems 2910, 2920 and 2930 via network 2950. Intelligent storage array 2990 is also shown as an example of a specific storage device accessible via SAN fabric 2970.

With reference to computer system 2810, modem 2847, network interface 2848 or some other method can be used to provide connectivity from each of client computer systems 2910, 2920 and 2930 to network 2950. Client systems 2910, 2920 and 2930 are able to access information on storage server 2940A or 2940B using, for example, a web browser or other client software (not shown). Such a client allows client systems 2910, 2920 and 2930 to access data hosted by storage server 2940A or 2940B or one of storage devices 2960A(1)-(N), 2960B(1)-(N), 2980(1)-(N) or intelligent storage array 2990. FIG. 18 depicts the use of a network such as the Internet for exchanging data, but the systems described herein are not limited to the Internet or any particular network-based environment.

The foregoing described embodiments wherein the different components are contained within different other components (e.g., the various elements shown as components of computer system 2810, discussed subsequently). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Other Embodiments

The systems described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:

1. A computer-implemented method, implemented in a computer system, comprising:
receiving a request, wherein
the request is received from a software application executed by a mobile device, and
position information is associated with the request;
retrieving a plurality of boundaries from a database, wherein
the plurality of boundaries define one or more geospatial regions in an n-dimensional space,
the database comprises a plurality of feedplace tables,
each feedplace table of the plurality of feedplace tables stores a plurality of coordinates for each of the one or more geospatial regions, and the plurality of coordinates for the each of the one or more geospatial regions define a boundary defining the each of the one or more geospatial regions;
producing one or more results, comprising
determining geospatial boundary information, wherein
the geospatial boundary information defines a boundary of a geometric shape in the n-dimensional space,
the geospatial boundary information is determined such that a geospatial region of the one or more geospatial regions is within the boundary and a size of the geometric shape is dependent on a size of the geospatial region, and
the geospatial region is determined based, at least in part, on
the position information, and
one or more of the plurality of boundaries,
identifying one or more digital content constructs of a plurality of digital content constructs, wherein
each digital content construct of the plurality of digital content constructs is associated with corresponding position information that describes a corresponding position of a plurality of positions of a corresponding point of a plurality of points in the n-dimensional space, for the each digital content construct, and
each digital content construct of the one or more digital content constructs is identified based, at least in part, on at least the corresponding position information of the each digital content construct of the plurality of digital content constructs and the geometric shape, such that the corresponding point associated with the each digital content construct of the one or more digital content constructs is within the geometric shape,
identifying at least one digital content construct of the one or more digital content constructs, wherein
each digital content construct of the at least one digital content construct is identified based, at least in part, on at least the corresponding position information of the each digital content construct of the one or more digital content constructs and the geospatial region, such that a point associated with the each digital content construct of the at least one digital content construct is within the geospatial region, and
retrieving digital content, wherein
the digital content is associated with the at least one digital content construct, and
the one or more results comprise the digital content; and
sending the one or more results to the software application.

2. The computer-implemented method of claim 1, wherein
the one or more geospatial regions are comprised in a plurality of geospatial regions,
each feedplace table of the plurality of feedplace tables corresponds to a geospatial region of the plurality of geospatial regions,
boundary information defines each boundary of the plurality of boundaries of the plurality of geospatial regions,
the boundary information for the each boundary is stored in a corresponding feedplace table of the plurality of feedplace tables, a first boundary of the plurality of boundaries, corresponding to a first geospatial region of the plurality of geospatial regions, is within a second boundary of the plurality of boundaries, corresponding to a second geospatial region of the plurality of geospatial regions, and
the method further comprises
producing a second one or more results by performing the producing the one or more results for the second geospatial region; and
producing a first one or more results by performing the producing the one or more results for the first geospatial region, wherein
the first one or more results are a subset of the second one or more results.

3. The computer-implemented method of claim 2, wherein
the plurality of feedplace tables comprise
a region table,
a locality table, and
a facility table.

4. The computer-implemented method of claim 2, wherein
the position information comprises geographic location information,
the geospatial boundary information comprises geographic boundary information,
the geospatial region is a geographic area, and
the corresponding position is a geographic location.

5. The computer-implemented method of claim 1, wherein the geospatial region is one of a plurality of geospatial regions, each geospatial region of the plurality of geospatial regions is defined at a level of a plurality of levels, and the method further comprises:
identifying a selected level of the plurality of levels, wherein
a first geospatial region of the plurality of geospatial regions is at a first level,
a second geospatial region of the plurality of geospatial regions is at a second level,
the first level is above the second level as a result of the second geospatial region being within the first geospatial region,
the first level or the second level is the selected level, and
performing the producing the one or more results for a geospatial region at the selected level, wherein
the digital content comprises a social media event occurring in the geospatial region,
the social media event is one of a plurality of social media events, and
the plurality of social media events are one or more posts to one or more social media platforms.

6. The computer-implemented method of claim 4, further comprising:
determining one or more values of at least one parameter of a plurality of parameters, wherein
one or more parameters of the plurality of parameters are associated with the geographic area; and
filtering the digital content based, at least in part, on the at least one parameter.

7. The computer-implemented method of claim 6, wherein the plurality of parameters comprise a geospatial parameter and a temporal parameter, and the at least one parameter is one of the geospatial parameter or the temporal parameter.

8. The computer-implemented method of claim 6, wherein the filtering comprises:
    determining an intersection of the corresponding position information of the each of the one or more digital content constructs with an n-dimensional polytope, wherein
        each of the plurality of parameters is a dimension of a plurality of dimensions within the n-dimensional space, and
        the determining the intersection comprises
            determining whether the determining the intersection is needed, using a corresponding n-dimensional geometric shape.

9. The computer-implemented method of claim 4, further comprising:
    determining one or more values of at least one parameter of a plurality of parameters, wherein
        one or more parameters of the plurality of parameters are associated with the geographic area; and
    filtering the digital content based, at least in part, on the at least one parameter, wherein
        each of the plurality of parameters is a dimension of a plurality of dimensions within the n-dimensional space, and
        the filtering comprises a determination as to whether the corresponding position information of the each of the one or more digital content constructs meets each criteria of a plurality of criteria within the n-dimensional space.

10. The computer-implemented method of claim 1, wherein
    the boundary is determined such that the geospatial region is within the boundary,
    the geometric shape is a simple n-dimensional geometric shape, and
    the geospatial region is defined by a complex n-dimensional polytope.

11. The computer-implemented method of claim 1, further comprising:
    applying a time window to the digital content, wherein
        the each of the one or more digital content constructs is associated with an event, and
        the time window is applied to the digital content prior to producing the one or more results.

12. The computer-implemented method of claim 11, further comprising:
    receiving an event selection, wherein
        the event selection identifies an event;
    obtaining event information for the event;
    determining a polygon for the event;
    identifying potentially-relevant social media content, wherein
        the potentially-relevant social media content is identified based, at least in part, on the polygon; and
    identifying relevant social media content, wherein
        the relevant social media content is identified from the potentially-relevant social media content using one or more criteria, and
        the digital content comprises the relevant social media content.

13. The computer-implemented method of claim 12, further comprising:
    determining a timeframe for the event, wherein
        the potentially-relevant social media content is identified further based, at least in part, on the timeframe.

14. The computer-implemented method of claim 1, further comprising:
    determining the plurality of boundaries;
    defining the geospatial region based, at least in part, on the one or more of the plurality of boundaries, wherein
        the determining, the identifying, and the producing are performed by the computer system; and
    storing the one or more of the plurality of boundaries in the database, as part of storing the plurality of boundaries in the database.

15. A non-transitory computer-readable storage medium, comprising program instructions, which, when executed by one or more processors of a computing system, perform a method comprising:
    receiving a request, wherein
        the request is received from a software application executed by a mobile device, and
        position information is associated with the request;
    retrieving a plurality of boundaries from a database, wherein
        the plurality of boundaries define one or more geospatial regions in an n-dimensional space,
        the database comprises a plurality of feedplace tables,
        each feedplace table of the plurality of feedplace tables stores a plurality of coordinates for each of the one or more geospatial regions, and
        the plurality of coordinates for the each of the one or more geospatial regions define a boundary defining the each of the one or more geospatial regions;
    producing one or more results, comprising
        determining geospatial boundary information, wherein
            the geospatial boundary information defines a boundary of a geometric shape in the n-dimensional space,
            the geospatial boundary information is determined such that a geospatial region of the one or more geospatial regions is within the boundary and a size of the geometric shape is dependent on a size of the geospatial region, and
            the geospatial region is determined based, at least in part, on
                the position information, and
                one or more of the plurality of boundaries,
        identifying one or more digital content constructs of a plurality of digital content constructs, wherein
            each digital content construct of the plurality of digital content constructs is associated with corresponding position information that describes a corresponding position of a plurality of positions of a corresponding point of a plurality of points in the n-dimensional space, for the each digital content construct, and
            each digital content construct of the one or more digital content constructs is identified based, at least in part, on at least the corresponding position information of the each digital content construct of the plurality of digital content constructs and the geometric shape, such that the corresponding point associated with the each digital content construct of the one or more digital content constructs is within the geometric shape,
        identifying at least one digital content construct of the one or more digital content constructs, wherein
            each digital content construct of the at least one digital content construct is identified based, at least in part, on at least the corresponding position information of the each digital content construct of the one or more digital content constructs and the geospatial region, such that a point associated with the each digital content construct of the at least one digital content construct is within the geospatial region, and
retrieving digital content, wherein
the digital content is associated with the at least one digital content construct, and
the one or more results comprise the digital content; and
sending the one or more results to the software application.

16. The non-transitory computer-readable storage medium of claim 15, wherein
the one or more geospatial regions are comprised in a plurality of geospatial regions,
each feedplace table of the plurality of feedplace tables corresponds to a geospatial region of the plurality of geospatial regions,
boundary information defines each boundary of the plurality of boundaries of the plurality of geospatial regions,
the boundary information for the each boundary is stored in a corresponding feedplace table of the plurality of feedplace tables,
a first boundary of the plurality of boundaries, corresponding to a first geospatial region of the plurality of geospatial regions, is within a second boundary of the plurality of boundaries, corresponding to a second geospatial region of the plurality of geospatial regions, and
the method further comprises
producing a second one or more results by performing the producing the one or more results for the second geospatial region; and
producing a first one or more results by performing the producing the one or more results for the first geospatial region, wherein the first one or more results are a subset of the second one or more results.

17. The non-transitory computer-readable storage medium of claim 15, wherein the position information comprises geographic location information, the geospatial boundary information comprises geographic boundary information, the geospatial region is a geographic area, the corresponding position is a geographic location, and the method further comprises:
determining one or more values of at least one parameter of a plurality of parameters, wherein
one or more parameters of the plurality of parameters are associated with the geographic area; and
filtering the digital content based, at least in part, on the at least one parameter, wherein
the plurality of parameters comprise a geospatial parameter and a temporal parameter, and
the at least one parameter is one of the geospatial parameter or the temporal parameter.

18. The non-transitory computer-readable storage medium of claim 17, wherein the geographic area is defined at a level of a plurality of levels, and the method further comprises:
identifying a selected level of the plurality of levels, wherein
a first geospatial region of the plurality of geospatial regions is at a first level,
a second geospatial region of the plurality of geospatial regions is at a second level,
the first level is above the second level as a result of the second geospatial region being within the first geospatial region,
the first level or the second level is the selected level, and
performing the producing the one or more results for a geospatial region at the selected level, wherein
the digital content comprises a social media event occurring in the geospatial region,
the social media event is one of a plurality of social media events, and
the plurality of social media events are one or more posts to one or more social media platforms.

19. The non-transitory computer-readable storage medium of claim 17, wherein the filtering comprises:
determining an intersection of the corresponding position information of the each of the one or more digital content constructs with an n-dimensional polytope, wherein
each of the plurality of parameters is a dimension of a plurality of dimensions within the n-dimensional space, and
the determining the intersection comprises
determining whether the determining the intersection is needed, using a corresponding n-dimensional geometric shape.

20. A computing system comprising:
one or more processors; and
a computer-readable storage medium coupled to the one or more processors, comprising program instructions, which, when executed by the one or more processors, perform a method comprising
receiving a request, wherein
the request is received from a software application executed by a mobile device, and
position information is associated with the request,
retrieving a plurality of boundaries from a database, wherein
the plurality of boundaries define one or more geospatial regions in an n-dimensional space,
the database comprises a plurality of feedplace tables,
each feedplace table of the plurality of feedplace tables stores a plurality of coordinates for each of the one or more geospatial regions, and
the plurality of coordinates for the each of the one or more geospatial regions define a boundary defining the each of the one or more geospatial regions,
producing one or more results, comprising
determining geospatial boundary information, wherein
the geospatial boundary information defines a boundary of a geometric shape in the n-dimensional space,
the geospatial boundary information is determined such that a geospatial region of the one or more geospatial regions is within the boundary and a size of the geometric shape is dependent on a size of the geospatial region, and
the geospatial region is determined based, at least in part, on
the position information, and
one or more of the plurality of boundaries,
identifying one or more digital content constructs of a plurality of digital content constructs, wherein
each digital content construct of the plurality of digital content constructs is associated with corresponding position information that describes a corresponding position of a plurality of positions of a corresponding point of a plurality of points in the n-dimensional space, for the each digital content construct, and each digital content construct of the one or more digital content constructs is identified based, at least in part, on at least the corresponding position information of the each digital content construct of the plurality of digital content constructs and the geometric shape, such that the corresponding point associated with the each digital content construct of the one or more digital content constructs is within the geometric shape, identifying at least one digital content construct of the one or more digital content constructs, wherein each digital content construct of the at least one digital content construct is identified based, at least in part, on at least the corresponding position information of the each digital content construct of the one or more digital content constructs and the geospatial region, such that a point associated with the each digital content construct of the at least one digital content construct is within the geospatial region, and retrieving digital content, wherein the digital content is associated with the at least one digital content construct, and the one or more results comprise the digital content, and sending the one or more results to the software application.

* * * * *